United States Patent
Koury et al.

(10) Patent No.: US 10,967,776 B2
(45) Date of Patent: Apr. 6, 2021

(54) CONDIMENT HOLDER

(71) Applicant: MILKMEN DESIGN, LLC, Akron, OH (US)

(72) Inventors: Michael Koury, Medina, OH (US); William Moujaes, Akron, OH (US); Tony Lahood, Hinckley, OH (US)

(73) Assignee: Milkmen Design, LLC, Akron, OH (US)

( * ) Notice: Subject to any disclaimer, the term of this patent is extended or adjusted under 35 U.S.C. 154(b) by 0 days.

(21) Appl. No.: 16/299,677

(22) Filed: Mar. 12, 2019

(65) Prior Publication Data

US 2019/0283646 A1 Sep. 19, 2019

Related U.S. Application Data

(60) Provisional application No. 62/642,306, filed on Mar. 13, 2018.

(51) Int. Cl.
*B60N 3/10* (2006.01)

(52) U.S. Cl.
CPC ............ *B60N 3/103* (2013.01); *B60N 3/107* (2013.01)

(58) Field of Classification Search
CPC ..... B60R 2011/0059; B60R 2011/0008; B60R 2011/0042; Y10S 224/926; Y10S 229/904; B60N 3/103; B60N 3/108
See application file for complete search history.

(56) References Cited

U.S. PATENT DOCUMENTS

| | | | |
|---|---|---|---|
| 3,866,873 A | 2/1975 | Bohli | |
| 4,339,033 A * | 7/1982 | Cillario | B65D 21/0206 206/216 |
| 4,854,466 A * | 8/1989 | Lane, Jr. | B65D 25/22 220/23.83 |
| 5,108,059 A * | 4/1992 | Curtis | A47G 23/0225 248/146 |
| 5,667,119 A | 9/1997 | Florence | |

(Continued)

OTHER PUBLICATIONS

XxNiceThingsxX, Etsy.com, SauceBoss Dip Holder for Car | DipClip | McDonalds Dip Holder | Dip Clip UK | Sauce Boss | Hot Item!—UK SELLER, https://www.etsy.com/listing/560494888/sauceboss-dip-holder-for-car-dipclip?ga_order=most_relevant&ga_search_type=all&ga_view_type=gallery&ga_search_query=dipclip&ref=sr_gallery_1, publication was accessible on Nov. 28, 2017, 4 pages.

(Continued)

*Primary Examiner* — Brian D Nash

(74) *Attorney, Agent, or Firm* — Sand, Sebolt & Wernow Co., LPA

(57) ABSTRACT

A condiment holder for supporting a condiment container, said condiment holder including a body having a top surface and a bottom surface. An aperture is defined by an interior peripheral wall of the body. The aperture extends between the top and bottom surfaces of the body. The peripheral wall includes a plurality of sets of opposed wall sections and each set of opposed wall sections is configured to engage one of a plurality of differently shaped condiment containers. The peripheral wall includes at least three sets of opposed wall sections and the body is thereby able to selectively engage at least three differently shaped condiment containers. A clip extends outwardly from the body and is utilized to engage a fin of a vehicle air vent to secure the condiment holder thereto.

32 Claims, 40 Drawing Sheets

(56) References Cited

U.S. PATENT DOCUMENTS

| | | | |
|---|---|---|---|
| 5,702,041 A * | 12/1997 | Sun | B60N 3/101 224/539 |
| 5,979,724 A * | 11/1999 | Loewenthal, Jr. | B60R 11/0241 224/483 |
| 6,152,302 A * | 11/2000 | Miller | B65D 1/36 206/549 |
| 6,189,489 B1 * | 2/2001 | Pearce | A01K 1/0356 119/454 |
| 6,193,201 B1 * | 2/2001 | Babcock | B65D 5/44 220/737 |
| 6,196,434 B1 * | 3/2001 | Angran | B60N 3/103 224/549 |
| D447,012 S | 8/2001 | Owens et al. | |
| 6,364,112 B1 * | 4/2002 | Pitschka | B65D 33/14 206/460 |
| 6,682,034 B1 | 1/2004 | Vial | |
| 8,109,235 B2 * | 2/2012 | Lipscomb | A01K 5/01 119/61.57 |
| 8,459,481 B2 * | 6/2013 | Arkin | G09F 21/04 220/6 |
| 9,199,584 B2 | 12/2015 | Mango | |
| 9,296,324 B2 | 3/2016 | Mango | |
| D780,168 S * | 2/2017 | Du | D14/253 |
| D783,593 S * | 4/2017 | Chen | D14/253 |
| 2010/0003375 A1 * | 1/2010 | Shecter | A23G 3/50 426/104 |
| 2012/0138648 A1 | 6/2012 | Moceo, II | |
| 2013/0119103 A1 | 5/2013 | Mango | |
| 2013/0200124 A1 | 8/2013 | Burwinkel et al. | |
| 2014/0021233 A1 | 1/2014 | Strole | |
| 2014/0103087 A1 * | 4/2014 | Fan | B60R 11/02 224/544 |
| 2014/0138418 A1 * | 5/2014 | Dunn | B60R 11/02 224/483 |
| 2014/0138419 A1 * | 5/2014 | Minn | F16B 2/065 224/567 |
| 2014/0183238 A1 * | 7/2014 | Lin | F16M 11/041 224/483 |
| 2014/0326768 A1 | 11/2014 | Mango | |
| 2015/0217697 A1 | 8/2015 | Peters | |
| 2015/0366388 A1 * | 12/2015 | Goldstein | B65D 85/72 220/737 |

OTHER PUBLICATIONS

ImproperEngineering, Etsy.com, Sauce Buddy Dip Clip Adjustable the Original || Car Vent Holder Car Vent Sauce Holder Car Vent Clip Air Vent Sauce Holder DipClip, https://www.etsy.com/listing/573887405/sauce-buddy-dip-clip-the-original-sauce?ga_order=most_relevant&ga_search_type=all&ga_view_type=gallery&ga_search_query=dipclip&ref=sr_gallery_2, publication was accessible on Nov. 28, 2017, 4 pages.

PrintinTime3D, Etsy.com, Little Dipper || Dip Clip || Sauce Holder || Car Accessories || Dipclip || Car Vent Holder, https://www.etsy.com/listing/575082339/little-dipper-dip-clip-sauce-holder-car?ga_order=most_relevant&ga_search_type=all&ga_view_type=gallery&ga_search_query=dipclip&ref=sr_gallery_3, publication was accessible Nov. 28, 2017, 3 pages.

Thingiverse, CAR DipClip by darookee, https://www.thingiverse.com/thing:2662748, publication was accessible Nov. 28, 2017, 3 pages.

Thingiverse, CAR DipClip, Sauce holder for a car, Clips into air vent Vo.02 by JuXas, https://www.thingiverse.com/thing:2660990, publication was accessible Nov. 28, 2017, 3 pages.

12 WBOY.com, 'Fast Food Buddy' Invention Makes Eating On-the-Go Easier for Consumers, http://www.wvalways.com/story/26388108/fast-food-buddy-invention-makes-eating-on-the-go-easier-for-consumers, Posted Aug. 27, 2014, 2 pages.

FFB, Amazon.com, Bright Red Fast Food Buddy Dipping Sauce and Cup Holder, https://www.amazon.com/Bright-Buddy-Dipping-Sauce-Holder/dp/B01C9RPI4E, May 5, 2016, 4 pages.

Prepworks Dip Clip Set (Set of 4), Assorted Colors, https://www.walmart.com/ip/Prepworks-Dip-Clip-Set-Set-of-4-Assorted-Colors/28491881?wmlspartner=wlpa&selectedSellerId=0&adid=22222222227019047513&wl0=&wl1=g&wl2=c&wl3=52360689975&wl4=pla-79465779735&wl5=9015314&wl6=&wl7=&wl8=&wl9=pla_with_promotion&wl10=8175035&wl11=online&wl12=28491881&wl13=&veh=sem, publication was accessible Nov. 28, 2017, 4 pages.

* cited by examiner

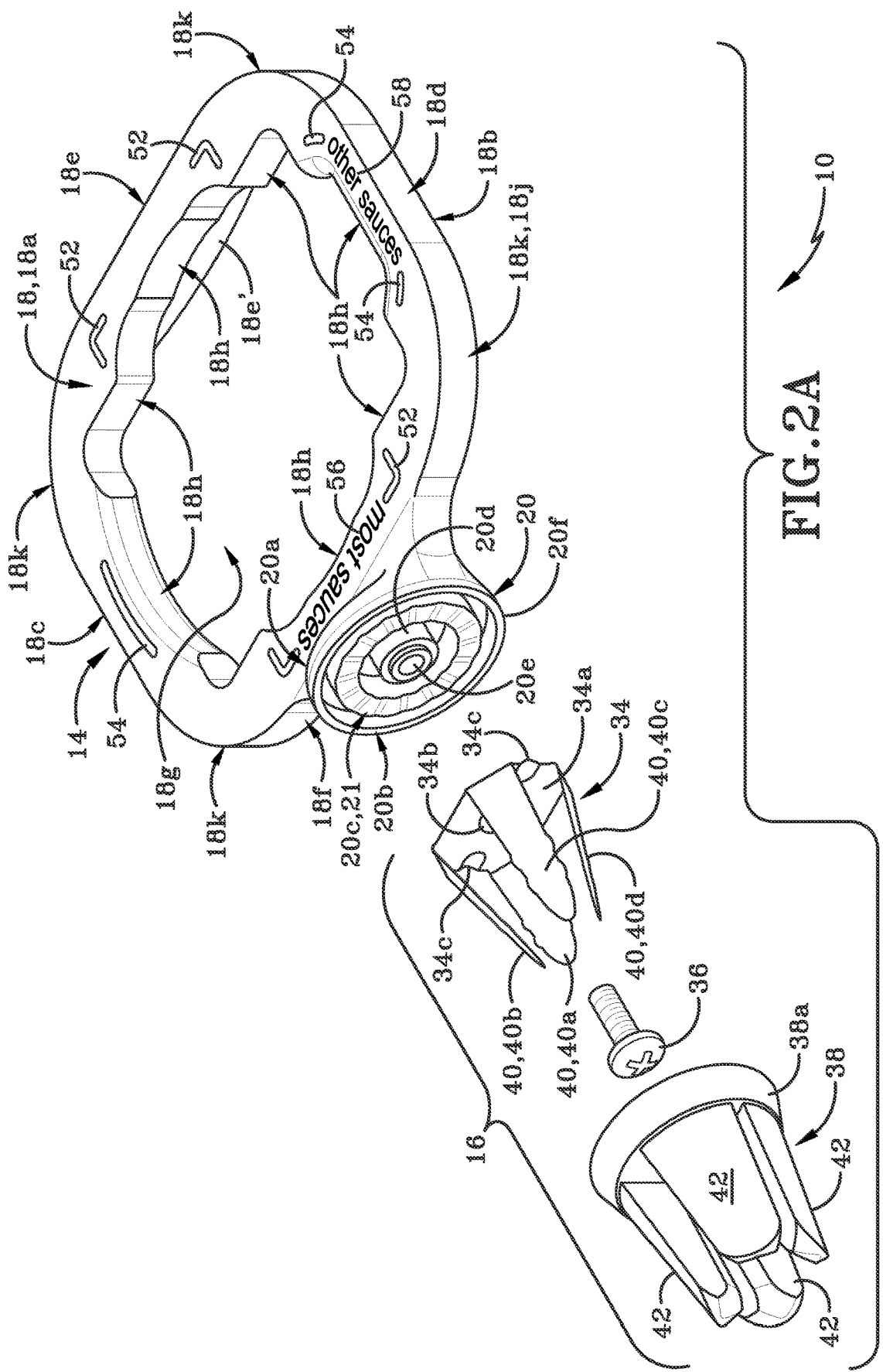

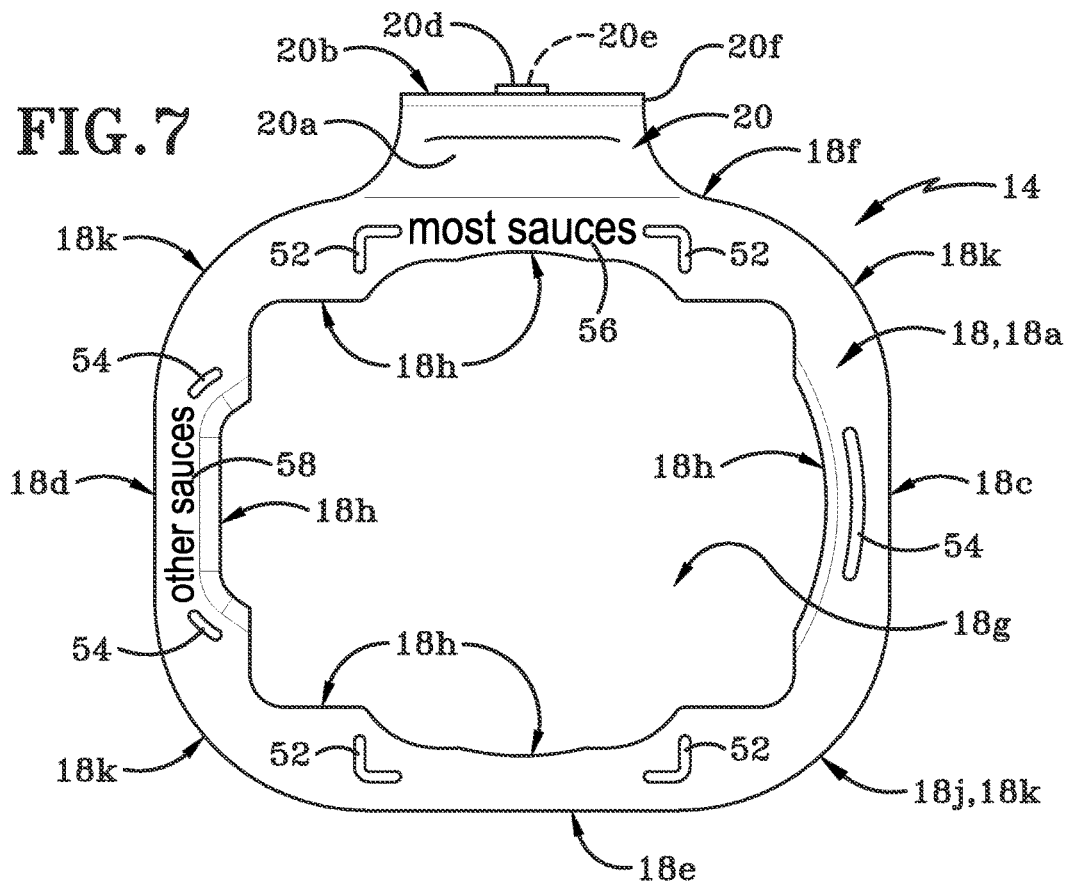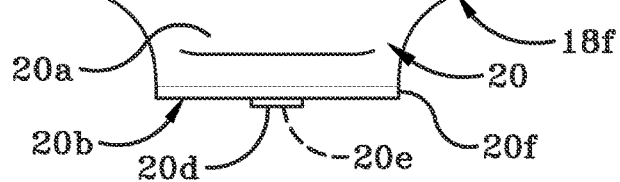

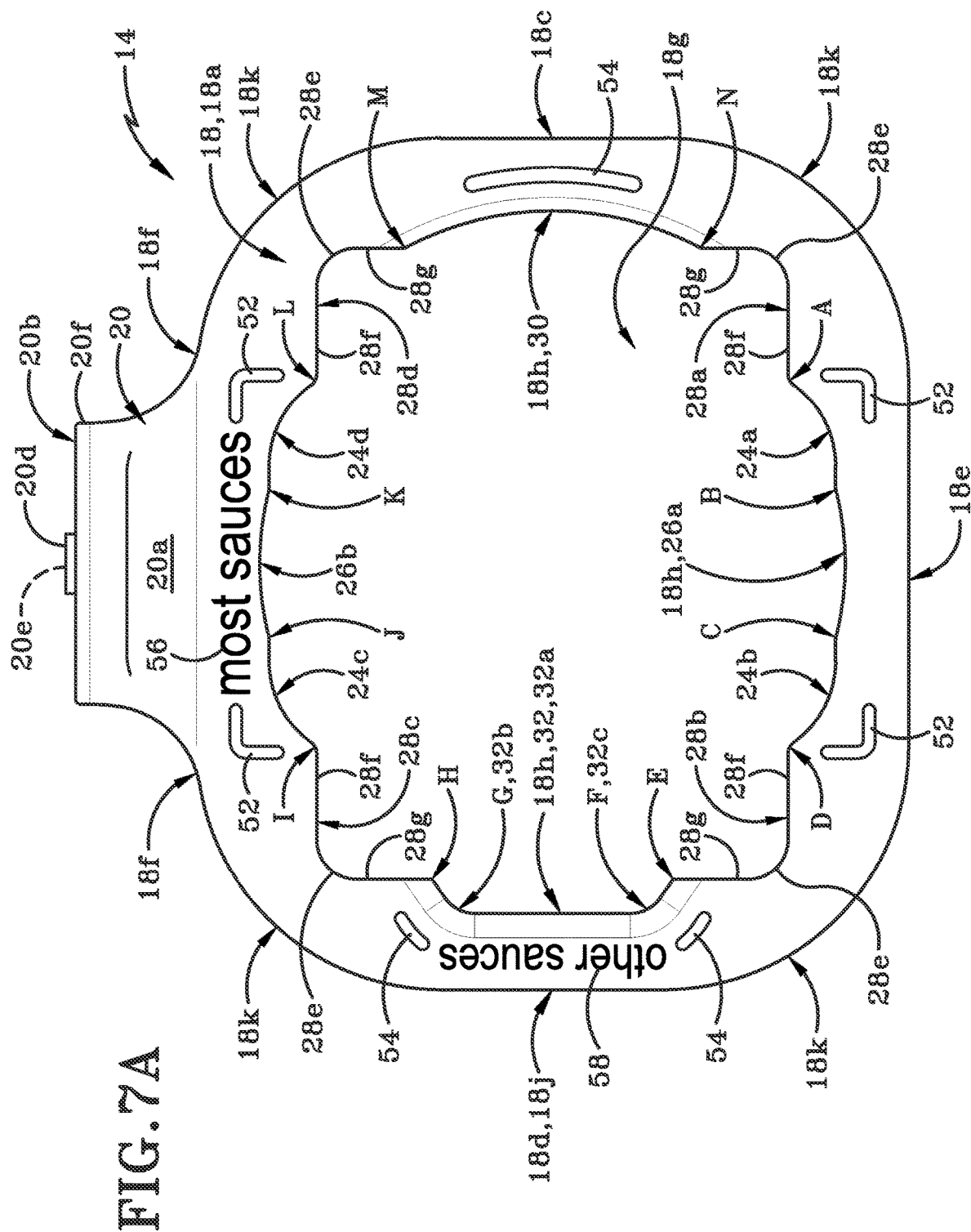

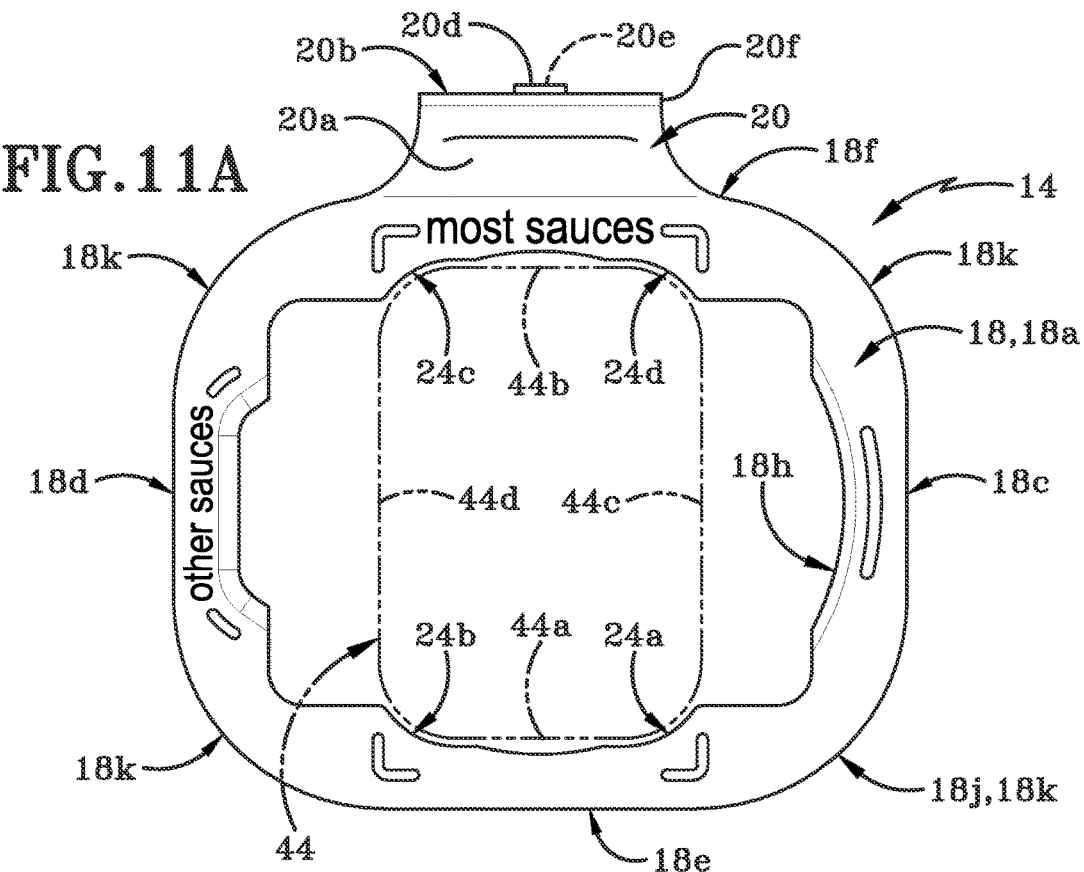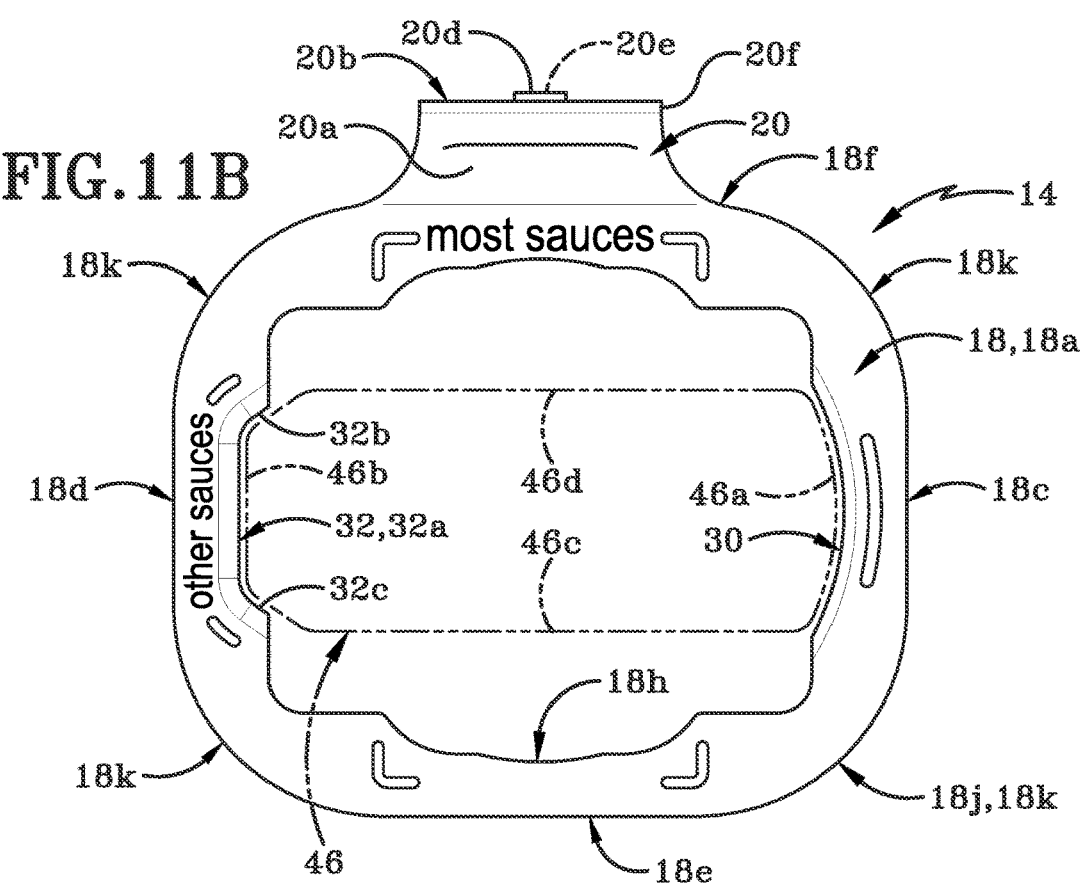

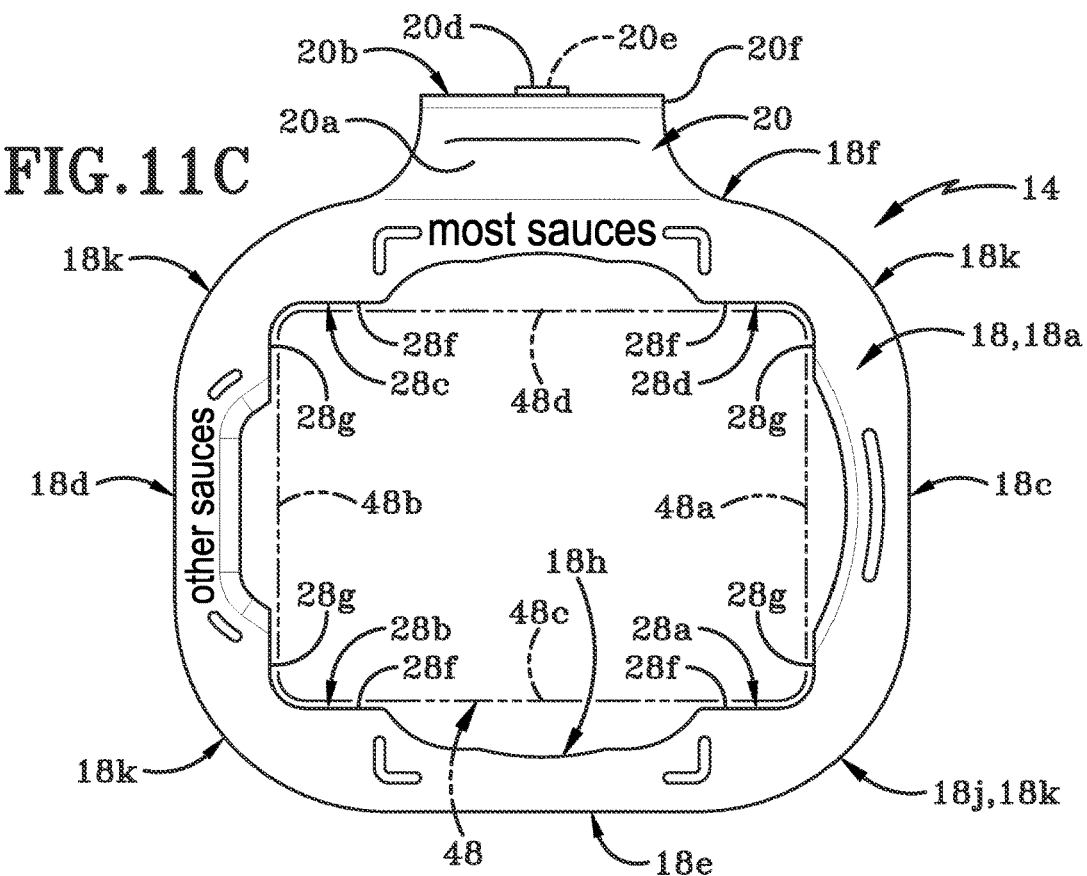
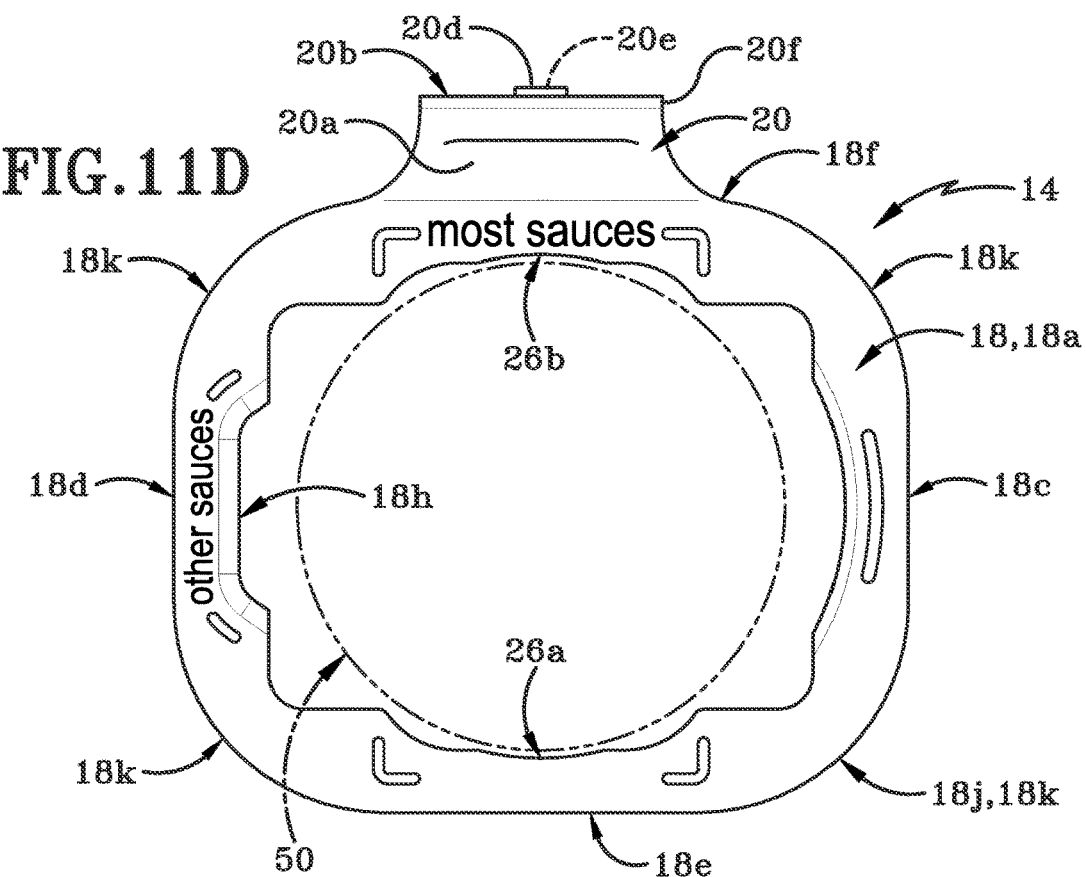

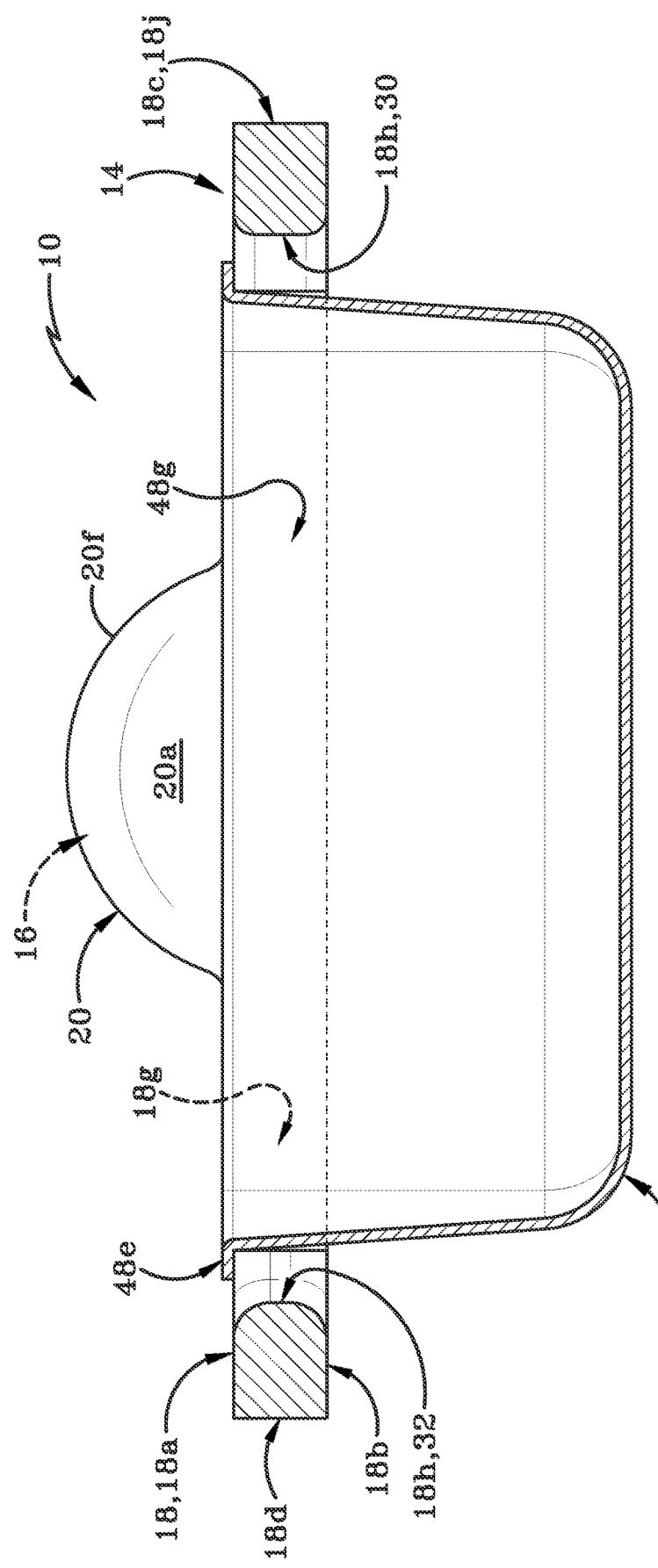

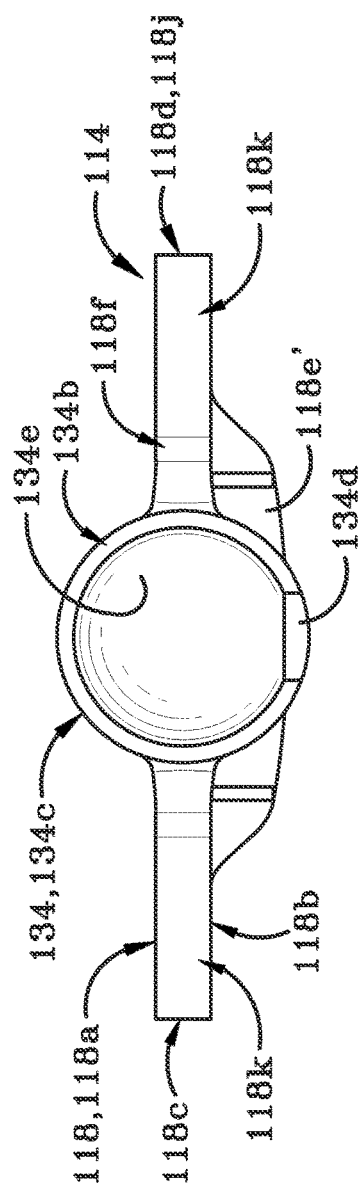
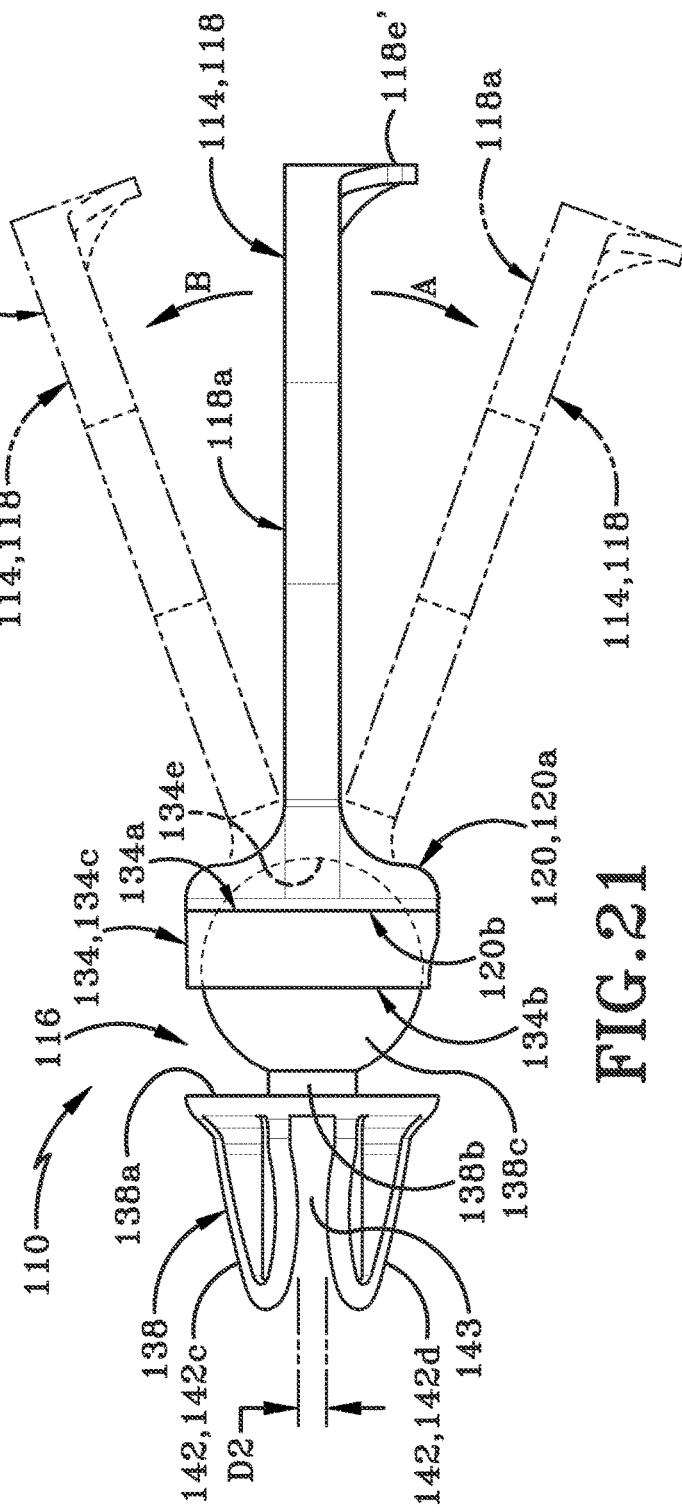
FIG. 20
FIG. 21

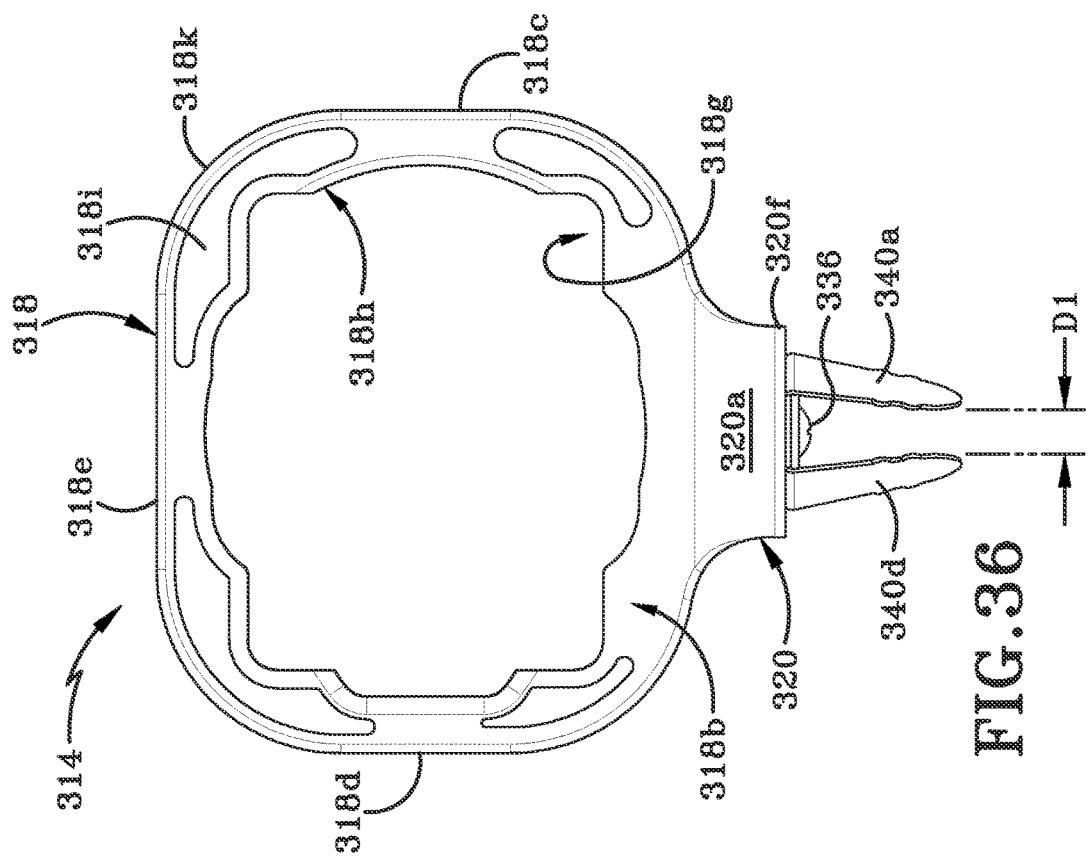
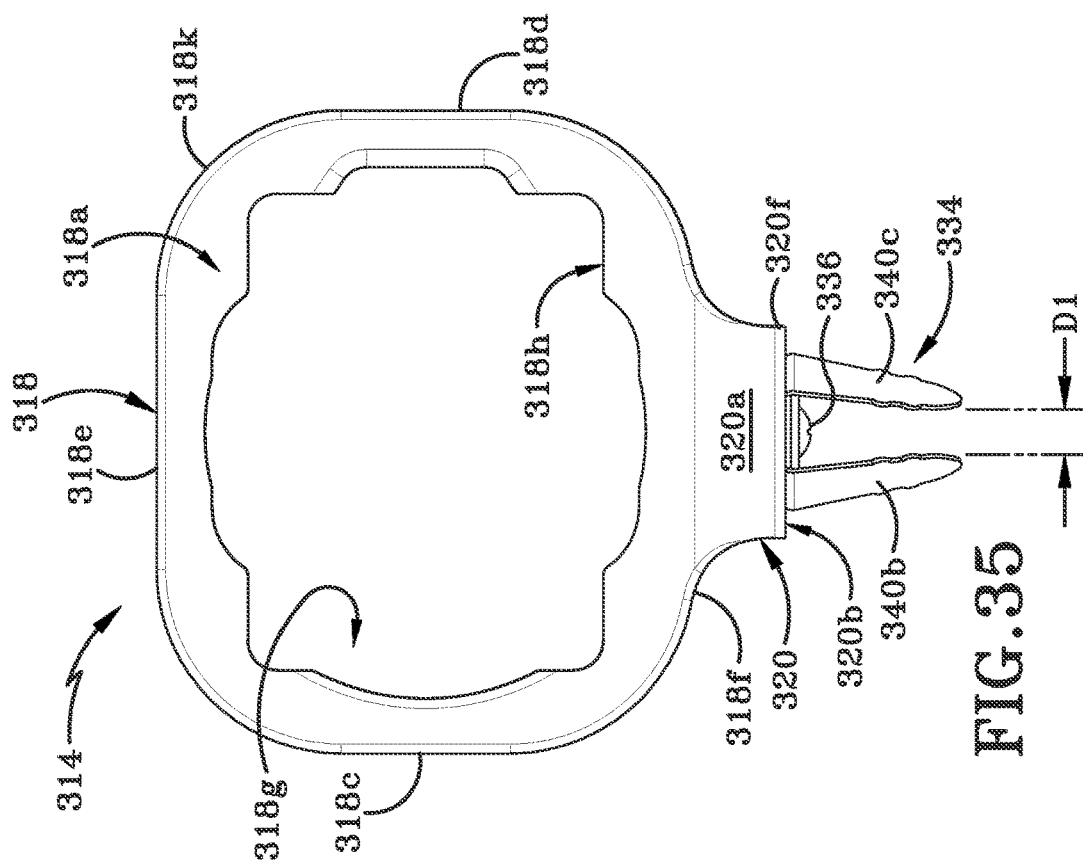

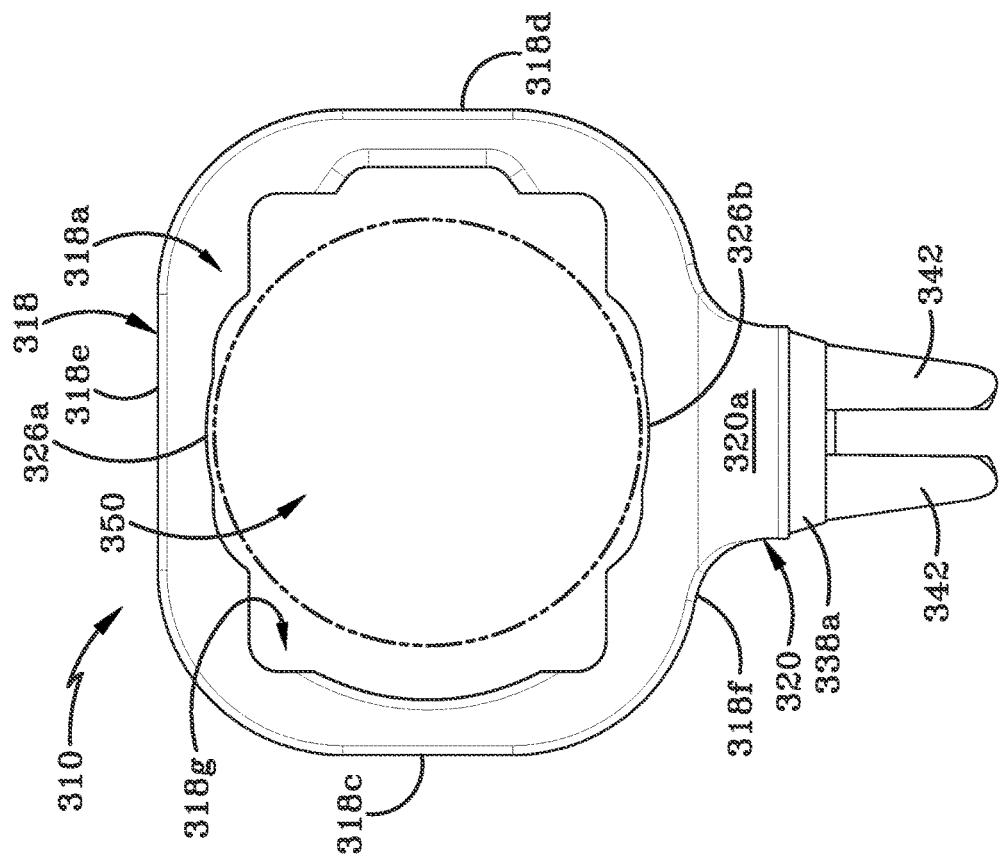
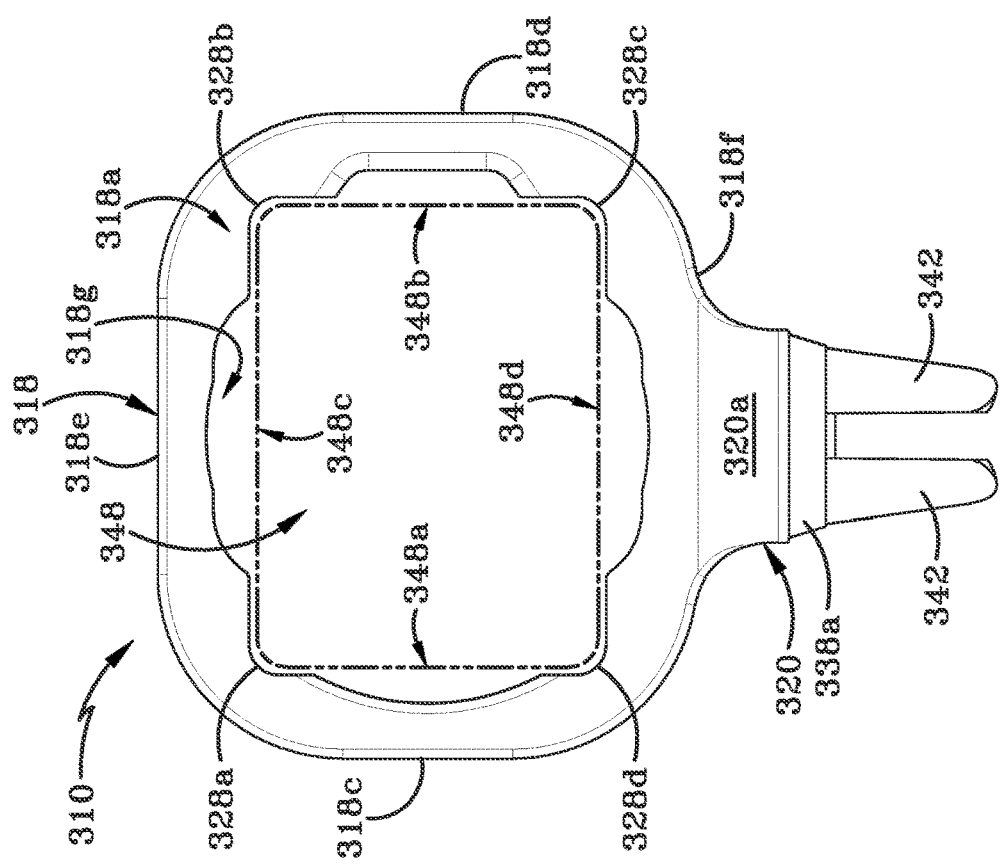

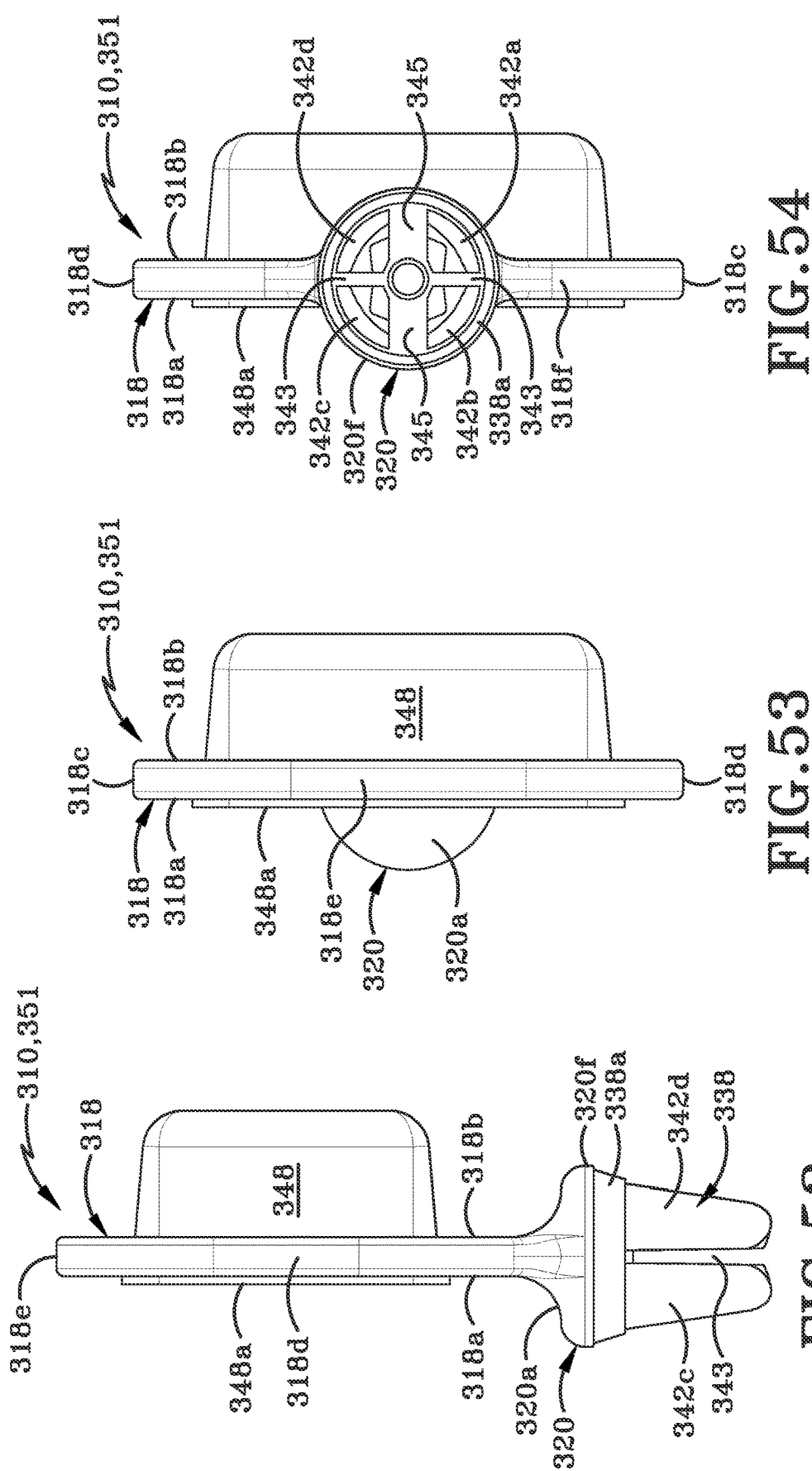

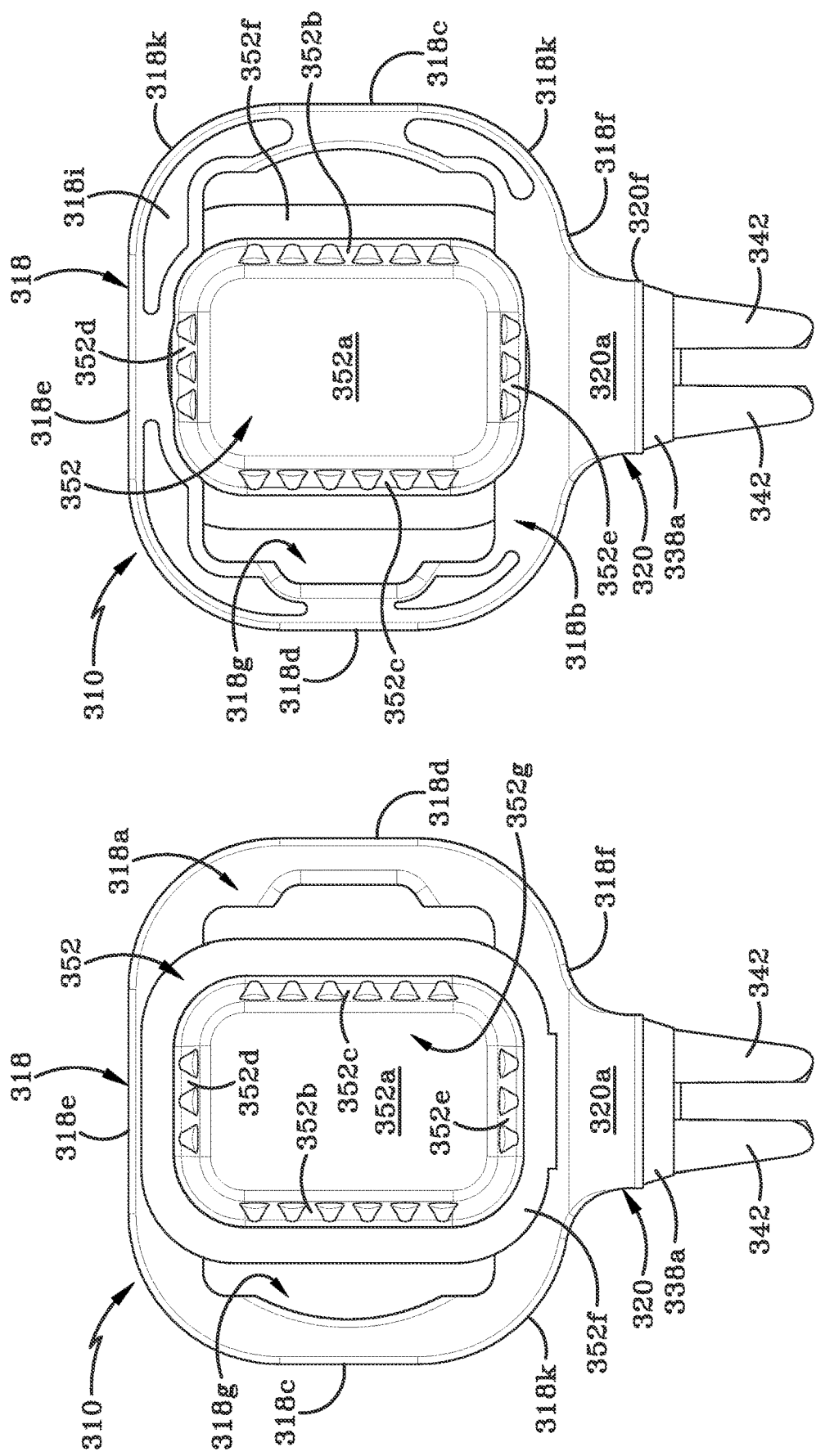

CONDIMENT HOLDER

CROSS REFERENCE TO RELATED APPLICATIONS

This application claims the benefit of U.S. Provisional Patent Application Ser. No. 62/642,306, filed Mar. 13, 2018, the entire disclosure of which is incorporated herein by reference.

BACKGROUND

Technical Field

This present application is generally directed to holding devices. More particularly, this application relates to a device suitable for holding condiment containers provided by fast-food restaurants. Specifically, the application is directed to a condiment holder that is engageable with an air vent fin of a vehicle and which includes a retaining aperture configured to be capable of selectively receiving and retaining any one of a plurality of differently shaped condiment containers therein and to a method of using the condiment holder.

BACKGROUND INFORMATION

People frequently stop at fast-food restaurants while traveling and, instead of eating in the restaurant, take the food back to their vehicle for consumption while driving. It is common for fast-food meals to be accompanied by a variety of condiments such as ketchup or dipping sauces that come in small flexible pouches or rigid condiment containers. Some of these condiment containers comprise a plastic base that defines a recess which holds the condiment. A peelable cover is engaged with the base and must be removed in order to access the condiment retained within the recess. These condiment containers are quite small, typically being around one inch long, one inch or less wide, and one inch or less deep.

Once the consumer has removed the cover, the condiment container may be tilted so that the condiment in the recess may be poured over the consumer's food. In other instances, the consumer may want to dip their food, such as fries or chicken nuggets for example, into the condiment held in the recess of the container in order to smother their food in the condiment. Holding a small condiment container and trying to dip food into the same can become a very messy experience.

As indicated above, other types of condiment container are simply a small plastic pouch that has to be torn open to access the quantity of condiment retained inside the pouch. Attempting to use these flexible pouches for dipping purposes or attempting to pour condiment from a flexible pouch onto food can, again, create quite a mess.

A number of solutions to this problem have been proposed in the prior art. U.S. Pat. Nos. 9,199,584 and 9,296,324 (Mango) disclose a holder for condiment packets, where the holder may be engaged in a vehicle cup holder or air vent. The holder comprises a planar body that includes a cylindrical portion that defines an aperture therein and in which a condiment container may be suspended. The body is between 3.5 inches and about 4.5 inches in size to make it suitable to rest on a flange surrounding a cup holder. The holder further includes an extension that protrudes from the cylindrical portion. The extension defines a slot therein and this slot is configured to receive a fin of a vehicle air vent therein and thereby hold the holder on the air vent. In some instances, the extension includes a projection to help retain the extension on a vehicle air vent. The condiment packet is held under slight compression within the aperture. U.S. Pat. No. 9,199,584 discloses separate holders for each of a plurality of differently-configured condiment packets. For example, for rectangularly-shaped condiment packets, the aperture defined in the cylindrical body of a first holder is rectangular in configuration. For square-shaped condiment packets, the aperture defined in the cylindrical body of a second holder is square in configuration. U.S. Pat. No. 9,296,324 discloses an embodiment of a condiment holder that is capable of selectively retaining each of two separate condiment packet shapes. A first condiment packet will be retained in a first orientation within the holder and a second differently-configured packet will be retained in a second orientation within the same holder.

SUMMARY

There remains a need in the art for an improved condiment holder that is relatively easy for a consumer to use and access. The condiment holder and method disclosed herein addresses many of the shortcomings of the prior art.

A condiment holder for supporting a condiment container is disclosed herein. The condiment holder including a body having a top surface and a bottom surface. An aperture is defined by an interior peripheral wall of the body. The aperture extends between the top and bottom surfaces of the body. The peripheral wall includes a plurality of sets of opposed wall sections and each set of opposed wall sections is configured to engage one of a plurality of differently shaped condiment containers. The peripheral wall includes at least three sets of opposed wall sections and the body is thereby able to selectively engage at least three differently shaped condiment containers. A clip extends outwardly from the body and is utilized to engage a fin of a vehicle air vent. Engaging the fin secures the condiment holder to the air vent.

In one aspect, the present disclosure may provide a condiment holder for supporting a condiment container, said condiment holder comprising a body having a top surface and a bottom surface; and an aperture defined by an interior peripheral wall of the body, said aperture extending between the top and bottom surfaces; wherein the peripheral wall includes a plurality of sets of opposed wall sections and each set of opposed wall sections is adapted to engage one of a plurality of differently-configured condiment containers; and wherein the peripheral wall comprises at least three sets of opposed wall sections and the body is thereby adapted to selectively engage at least three differently-configured condiment containers.

In one example, the body is one of substantially square and substantially rectangular in shape when viewed from above. In one example, the body has a length measured between a front end and a rear end of around 2⅞ inches and a width measured between a left side and a right side of around 2⅞ inches. In one example, the condiment holder further includes a clip extending outwardly from the body; said clip being adapted to engage at least one fin of a vehicle air vent. In one example, the body further comprises a second aperture defined by a portion of the interior peripheral wall of the body, said second aperture extending between the top and bottom surfaces. The second aperture is adapted to receive a condiment container therein. The portion of the interior peripheral wall that defines the second aperture includes a plurality of sets of opposed wall sections and each set of opposed wall sections is adapted to engage one of a plurality of differently-configured condiment containers therein.

In one example, the clip is selectively rotatable about an axis oriented at right angles to a rear end of the body. In one example, the body further comprises a neck extending rearwardly from a rear end of the body; and wherein the clip is operatively engaged with the neck. In one example a base plate that operatively engages the clip to the neck. In one example, the condiment holder includes a ball-and-socket joint that operatively engages the clip to the neck. The neck (or another portion of the body) defines a socket of the ball-and-socket joint and the clip includes a ball of the ball-and-socket joint and the ball extends outwardly from the clip and is frictionally received in the socket. The ball-and-socket joint allows the body to selectively pivot in a first direction or in a second direction relative to a horizontally-oriented plane. In one example, the clip comprises at least two tines separated by a space; wherein the tines are adapted to be received in gaps defined between adjacent air vent fins; and the space is adapted to receive at least one air vent fin therein. In one example, the peripheral wall is oriented at an angle other than 90 degrees relative to the top surface of the body. The condiment holder further comprises a flange region extending downwardly from a front end of the body.

In another aspect, the present disclosure may provide a kit for holding condiments; said kit comprising a condiment holder comprising a body having a top surface and a bottom surface; and an aperture defined by an interior peripheral wall of the body and extending between the top and bottom surfaces; wherein the peripheral wall includes a plurality of sets of opposed wall sections and each set of opposed wall sections is adapted to engage one of a plurality of differently-configured condiment containers; and wherein the peripheral wall comprises at least three sets of opposed wall sections and the body is thereby adapted to selectively engage at least three differently-configured condiment containers; and the kit further includes a fastener mechanism provided on the body; said fastener mechanism being adapted to secure the body to a vehicle air vent; and at least one condiment container sized to be received in the aperture defined by the body of the condiment holder.

In one example, the fastener mechanism includes clip having a first pair of tines spaced a first distance apart and a second pair of tines spaced a second distance apart; wherein the first pair of tines is adapted to selectively receive a first fin of the vehicle air vent therein and the first fin is of a first thickness; and the second pair of tines is adapted to selectively receive a second fin of the vehicle air vent therein, wherein the second fin is of a second thickness. The first pair of tines and the second pair of tines are oriented at right angles to each other. In one example, the kit further comprises a ball-and-socket joint interposed between the clip and the body. In one example, the body is rotatable relative to the fastener mechanism.

In another aspect, the present disclosure may provide a method of presenting condiments for use while seated in a vehicle; said method comprising providing a condiment holder comprising a body having a top surface and a bottom surface; an aperture defined by an interior peripheral wall of the body, said aperture extending between the top and bottom surfaces; wherein the peripheral wall includes a plurality of sets of opposed wall sections; and a clip extends outwardly from the body; engaging the clip of the condiment holder with an air vent of the vehicle; selecting one of the plurality of sets of opposed wall sections for engagement of a condiment container; wherein the step of selecting comprises selecting a set of first wall sections if the condiment container has a first exterior shape; selecting a set of second wall sections if the condiment container has a second exterior shape; selecting a set of third wall sections if the condiment container has a third exterior shape; and orienting the condiment container to engage the selected set of the first, second, or third wall sections; placing a flange of the condiment container on the top surface of the body; engaging the condiment container with the selected set of first, second, third or additional wall sections; and retaining the condiment container in the aperture. In one example, the method further comprises pivoting the body relative to the clip and orienting the top surface of the body so that a condiment container received therein is kept level.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 2A is an exploded top, rear, left side, isometric perspective view of the condiment holder;

FIG. 7 is a top plan view of the body of the condiment holder;

FIG. 7A is an enlarged top plan view of the body of the condiment holder identifying the various surfaces that bound and define the central aperture defined by the body;

FIG. 8 is a bottom plan view of the body of the condiment holder;

FIG. 11A is a top plan view of the condiment holder with a dashed outline of a portion of a first condiment container engaged therewith;

FIG. 11B is a top plan view of the condiment holder with a dashed outline of a portion of a second condiment container engaged therewith;

FIG. 11C is a top plan view of the condiment holder with a dashed outline of a portion of a third condiment container engaged therewith;

FIG. 11D is a top plan view of the condiment holder with a dashed outline of a portion of a fourth condiment container engaged therewith;

FIG. 12A is a cross-section of the condiment holder kit taken along line 12A-12A of FIG. 12;

FIG. 20 is a rear elevation view of the condiment holder taken along line 20-20 of FIG. 18;

FIG. 21 is a left side elevation view of the condiment holder of FIG. 17 showing in phantom that the body of the condiment holder is selectively tiltable upwardly or downwardly relative to a horizontally-oriented plane;

FIG. 35 is a top plan view of the condiment holder with the tines of clip exposed;

FIG. 36 is a bottom plan view thereof;

FIG. 48 is a top plan view of the condiment holder with a dashed outline of a portion of a third condiment container being engaged therewith;

FIG. 49 is a top plan view of the condiment holder with a dashed outline of a portion of a fourth condiment container being engaged therewith;

FIG. 52 is a right side elevation view thereof (the unshown left side elevation view is a mirror image thereof);

FIG. 53 is a front elevation view of the kit of FIG. 50;

FIG. 54 is a rear elevation view thereof;

FIG. 56 is a top plan view thereof;

FIG. 57 is a bottom plan view thereof;

Similar numbers refer to similar parts throughout the drawings.

DETAILED DESCRIPTION

Referring to FIGS. 1-16, a first embodiment of a condiment holder in accordance with the present disclosure is disclosed herein and is generally indicated by the reference number 10. Condiment holder 10 may be referred to herein by the terms "condiment holder 10" or "holder 10".

Figure 1:
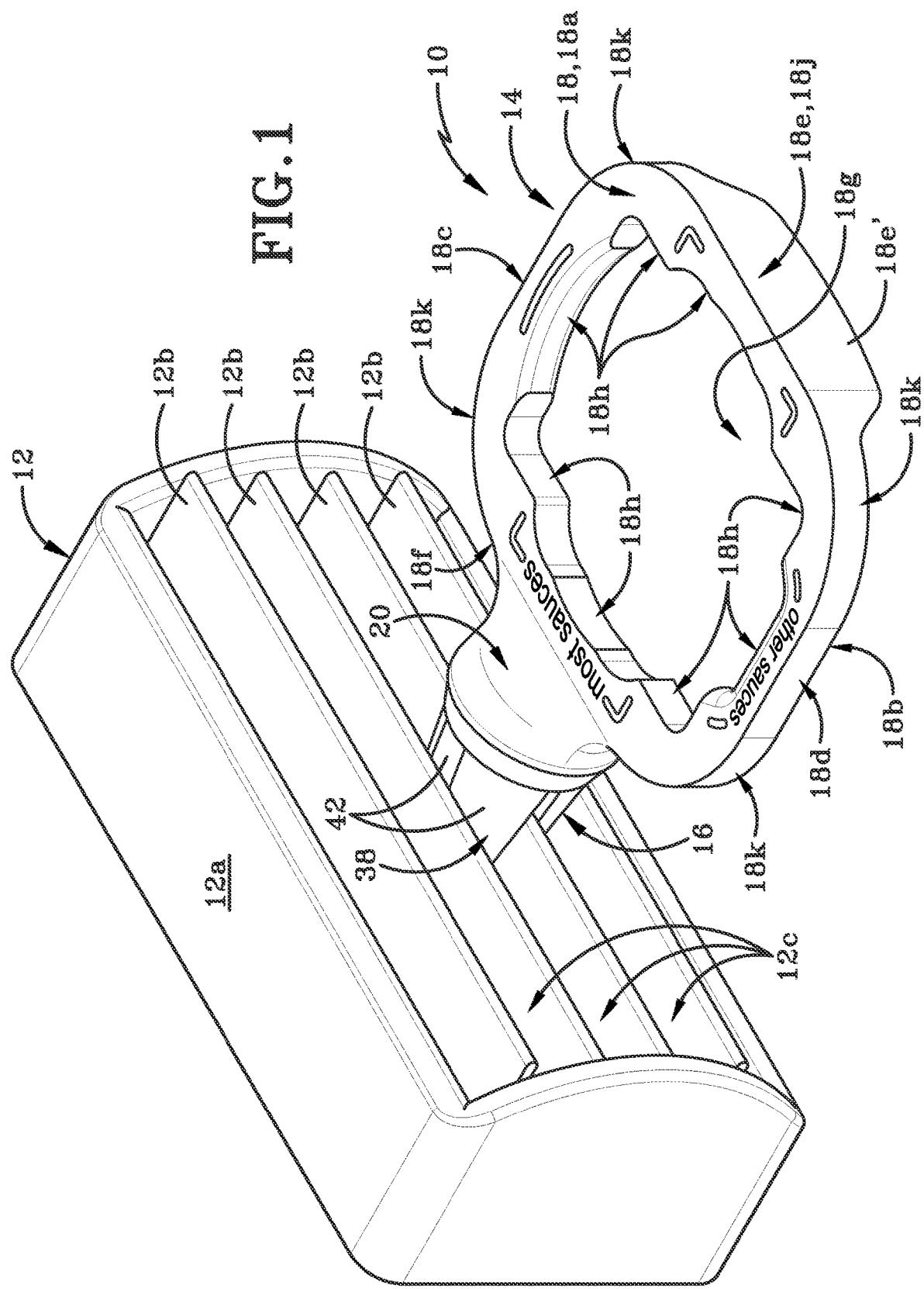
FIG. 1 is a top, front, left side, isometric perspective view of a first embodiment of a condiment holder in accordance with the present disclosure, with the condiment holder shown engaged with a vehicle air vent.
Figure 2:
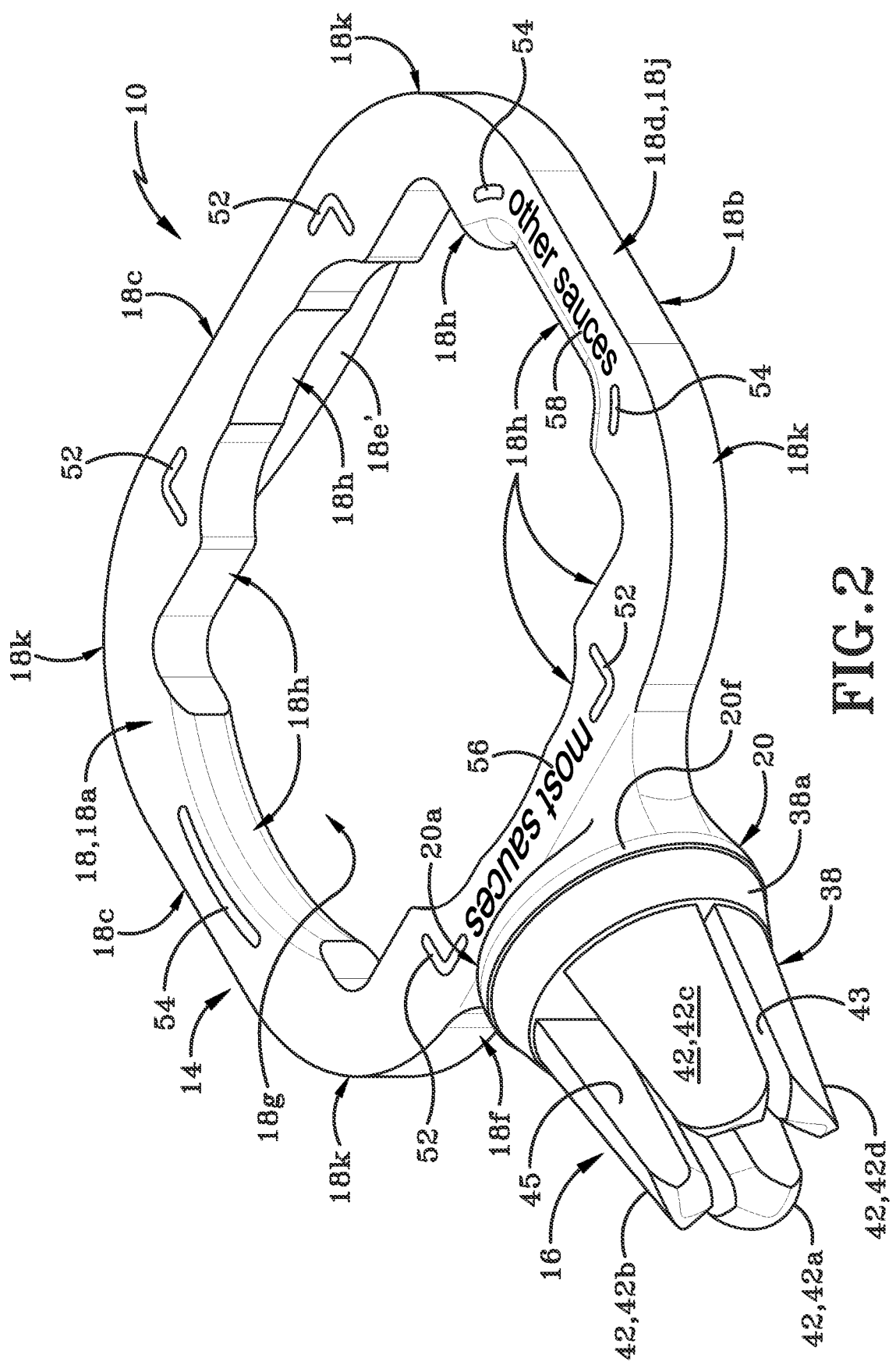
FIG. 2 is a top, rear, left side, isometric perspective view of the condiment holder of FIG. 1 shown on its own.

Holder 10 is illustrated in FIG. 1 engaged with a vehicle air vent 12. Air vent 12 comprises a housing 12a in which are mounted a plurality of spaced apart, movable fins 12b.

Adjacent fins 12*b* are separated from each other by a gap 12*c*. In particular, holder 10 is shown engaged with one of the fins 12*b* of air vent 12. A portion of condiment holder 10 extends outwardly from a front region of air vent 12 and condiment holder 10 is oriented so as to be ready to receive a condiment container or receptacle therein.

Still referring to FIGS. 1-16, holder 10 is comprised of a body 14 and a clip 16. Body 14 includes a base 18 and a neck 20, where neck 20 extends rearwardly outwardly from base 18. Base 18 and neck 20 may be molded from any suitable plastic material as a single, monolithic, unitary component. (In other instances, base 18 and neck 20 may be separately formed and may be secured together by any suitable means such as heat welding.) Base 18 is generally rectangular in shape when viewed from above (FIG. 7) and includes a top surface 18*a*, a bottom surface 18*b* (FIG. 8), a left side 18*c*, a right side 18*d*, a front end 18*e*, and a rear end 18*f*. Top surface 18*a* and bottom surface 18*b* define a vertical direction therebetween, left side 18*c* and right side 18*d* define a lateral or transverse direction therebetween, and front end 18*e* and rear end 18*f* define a longitudinal direction therebetween. FIG. 1 shows that front end 18*e* includes a downwardly extending flange region 18*e*' that extends downwardly for a distance beyond bottom surface 18*b*. Flange region 18*e*' provides a location for an advertising logo to be placed on condiment holder 10.

An aperture 18*g* is bounded and defined by an interior peripheral wall 18*h* of base 18. Aperture 18*g* may be generally centrally located in base 18 and extend from top surface 18*a* through to bottom surface 18*b*. Aperture 18*g* is configured to receive any one of a plurality of differently-shaped condiment containers or receptacles therein. Top surface 18*a* forms a frame that circumscribes aperture 18*g* and, as will be described later herein, a portion of each of the plurality of differently-shaped condiment containers rests on and is supported by this frame (i.e., top surface 18*a*). It will be understood that only one of condiment container is able to be engaged in aperture 18*g* at any one time. In particular, aperture 18*g* is configured to be able to selectively receive at least three differently-configured or differently-shaped condiment containers therein. Specifically, peripheral wall 18*h* and therefore aperture 18*g*, is configured so that at least four differently-shaped condiment containers are able to be selectively, individually engaged with base 18. The particulars of the differently-configured or shaped condiment containers will be discussed later herein. It will be understood that the ability to engage a plurality of differently-configured condiment containers in aperture 18*g* is made possible by the specific shape of the peripheral wall 18*h* that bounds and defines aperture 18*g*. The exterior surfaces of left side wall 18*c*, front end 18*e*, right side wall 18*d* and rear wall 18*f* form an exterior perimeter wall 18*j* (FIGS. 1 and 7) of base 18. Perimeter wall 18*j* is located radially outwardly from peripheral wall 18*h* and includes rounded corners 18*k*. The rounded corners 18*k* help to ensure that condiment holder 10 does not present any sharp edges that could cause a minor injury to a consumer during use.

Peripheral wall 18*h* includes a plurality of different sets of wall sections that are selectively configured to engage variously shaped condiment containers, such as those provided by major fast-food restaurant chains. It should be noted that peripheral wall 18*h* is not configured to substantially conform to the exterior shape of any of the variously shaped condiment containers. Instead, each of the various sets of opposed wall sections discussed hereafter are designed to only contact discrete regions of the exterior shape of one of the plurality of variously shaped condiment containers provided by fast-food chains. This arrangement ensures that more than only one or two shapes of condiment container may be engaged with condiment holder 10.

Figure 7B:
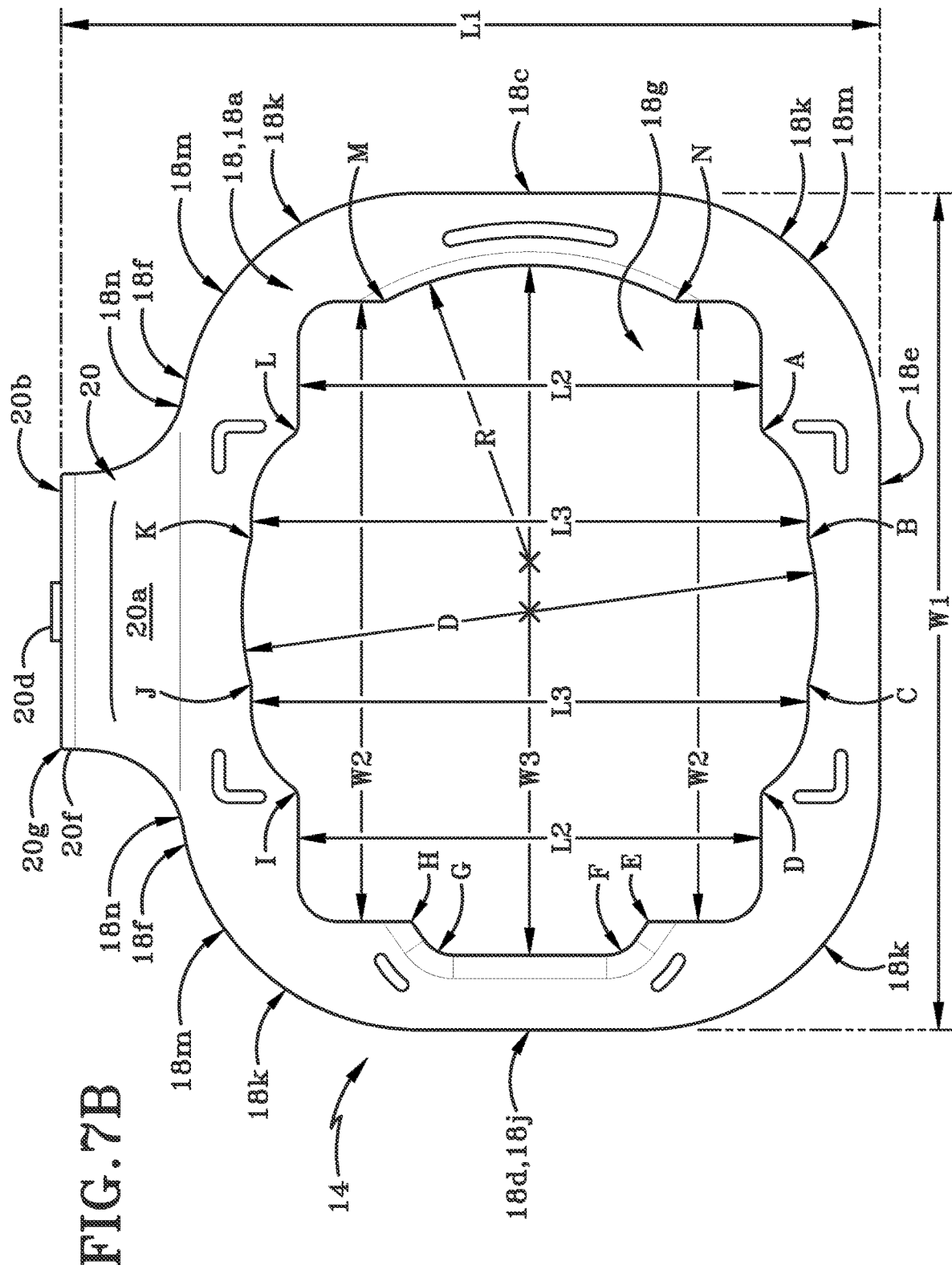
FIG. 7B is an enlarged top plan view of the body of the condiment holder identifying the various dimensions of the components on the body (some details on the top surface of the body being omitted for clarity of illustration.

FIGS. 7A and 7B show body 14 enlarged for easier reference. These figures show that the peripheral wall 18*h* changes direction and curvature in a number of locations. A different letter of the alphabet identifies each of these locations. FIG. 7A identifies fourteen changes in direction in peripheral wall 18*h* using the letters "A" through "N". FIG. 7A also identifies a plurality of different sets of wall sections that together form peripheral wall 18*h*. A set of first wall sections, having a radius of curvature of R8.00 mm, is identified in FIG. 7A by the reference numbers 24*a*, 24*b*, 24*c*, and 24*d*. First wall section 24*a* extends between location "A" and location "B" on peripheral wall 18*h*. First wall section 24*b* extends between location "C" and location "D" on peripheral wall 18*h*. First wall section 24*c* extends between location "I" and location "J" on peripheral wall 18*h*. First wall section 24*d* extends between location "K" and location "L" on peripheral wall 18*h*. First and second wall sections 24*a*, 24*b* are located proximate front end 18*e* of body 14. Third and fourth wall sections 24*c*, 24*d* are located proximate rear end 18*f* of body 14. First and second wall sections 24*a*, 24*b* are spaced laterally relative to each other and third and fourth wall sections 24*c*, 24*d* are spaced laterally from each other. First wall section 24*a* is located longitudinally a distance away from and opposite fourth wall section 24*d*.

FIG. 7B shows the dimensions of various parts of base 18. Second wall section 24*b* is located a distance longitudinally away from and opposite third wall section 24*c*. Locations "A" and "L" are spaced longitudinally a distance of about 38.55 mm (about 1½ inches) from each other and locations "D" and ""I" are also spaced longitudinally a distance of about 38.55 mm (about 1½ inches) from each other. Locations "B" and "K" are spaced longitudinally a distance of about 46.32 mm (about 1⅞ inches) from each other and locations ""C" and "J" are spaced longitudinally a distance of about 46.32 mm (about 1⅞ inches) from each other.

A set of second wall sections 26*a*, 26*b* is provided as part of peripheral wall 18*h*. Second wall section 26*a* originates at location "B" and terminates at location "C". In other words, second wall section 26*a* is located between first wall section 24*a* and first wall section 24*b*. Second wall section 26*a* has a radius of curvature that differs from the radius of curvature of first wall sections 24*a* to 24*d*. Second wall section 26*a* and second wall section 26*b* are sections of the circumference of a circle having a diameter of 47.87 mm (i.e., between 1⅞ and 2 inches). Second wall section 26*b* originates at location "J" and terminates at location "K". In other words, second wall section 26*b* is located between first wall section 24*c* and first wall section 24*d*. Second wall section 26*a* is spaced a distance longitudinally from second wall section 26*b* and is opposed to second wall section 26*b*.

A set of third wall sections 28*a*, 28*b*, 28*c*, and 28*d* is provided as part of peripheral wall 18*h*. Third wall section 28*a* originates at location "N" and terminates at location "A". First wall section 24*a* is located between third wall section 28*a* and second wall section 26*a*. Third wall section 28*b* originates at location "D" and terminates at location "E". First wall section 24*b* is located between third wall section 28*b* and second wall section 26*a*. Third wall section 28*c* originates at location "H" and terminates at location "I". First wall section 24*c* is located between third wall section 28*c* and second wall section 26*b*. Third wall section 28*d* originates at location "L" and terminates at location "M". First wall section 24*d* is located between third wall section 28d and second wall section 26b. Each of the third wall sections 28a-28d includes a curved central region 28e and two straight regions 28f and 28g that extends outwardly from the curved central region. The straight regions 28f and 28g are oriented generally at right angles relative to each other. The curved central region 28e has a radius of curvature of R3.20 mm. Third section 28a is spaced laterally from third section 28b and longitudinally from third section 28d. Third section 28b is spaced laterally from third section 28a and longitudinally from third section 28c. Third section 28c and third section 28d are spaced laterally from each other.

The straight regions 28f, 28f of third section 28a and third section 28d are located a longitudinal distance of about 38.55 mm (about 1½ inches) away from each other. (Similarly, the straight sections 28f, 28f of third sections 28b and 28c are located a longitudinal distance of about 38.55 mm (about 1½ inches) away from each other.) The straight sections 28g of third section 28a and third section 28b are located a lateral distance of about 51.72 mm (about 2 inches) away from each other. (Similarly, the straight sections 28g, 28g of third sections 28c and 28d are located a lateral distance of about 51.72 mm (about 2 inches) away from each other.)

Peripheral wall 18h also includes a fourth wall section 30 that originates at location "M" and terminates at location "N". Fourth wall section 30 is located between third wall section 28a and third wall section 28d. Fourth wall section 30 has a radius of curvature of about R25.94 mm.

Peripheral wall 18 also includes a fifth wall section 32 that originates at location "E" and terminates at location "H" and is located a spaced distance laterally from and opposite to fourth wall section 30. Fifth wall section 32 includes a straight region 32a that extends between location "G" and location "F" and has a length of about 12.75 mm (about ½ inch). Fifth wall section 32 includes a first curved region 32b and a second curved region 32c that are located on opposite sides of straight region 32a from each other. First and second curved regions 32b, 32c each have a radius of curvature of R3.00. First curved region 32b is located between third wall section 28c and straight region 32a. Second curved region 32c is located between third wall section 28b and straight region 32a. Straight region 32a is located about 57.70 mm (about 2¼ inches) laterally away from a midpoint of fourth wall section 30. The midpoint is located midway between location "F" and location "G".

A midpoint of second wall section 26b is located from about 5.0 mm up to about 5.5 mm (about ¼ inch) away from a first region of neck 20 (or rear end 18f of body 14). (The midpoint of second wall section 26b is located midway between location "J" and location "K".) Similarly, a midpoint of second wall section 26a is located from about 5.0 mm up to about 5.5 mm (about ¼ inch) away from front end 18e of body 14. (The midpoint of second wall section 26a is located midway between location "B" and location "C".) The interior surface of straight region 32a of fifth wall section 32 is about 5.83 mm up to about 6.43 mm (about ¼ inch) from right side 18d of body 14. Similarly, the midpoint of fourth wall section 30 is located about 5.83 mm up to about 6.43 mm (about ¼ inch) from left side 18c of body 14. (The midpoint of fourth wall section 30 is located midway between location "M" and location "N".)

In accordance with an aspect of the present disclosure, peripheral wall 18h may not be oriented exactly at ninety degrees relative to top surface 18a. Instead, peripheral wall 18h may be slightly offset from ninety degrees. In particular, peripheral wall 18h may be angled so that the interior perimeter of peripheral wall 18h at top surface 18a is either slightly larger or slightly smaller than the interior perimeter of peripheral wall 18h at bottom surface 18b. The difference between the interior perimeters of peripheral wall 18h at top surface 18a and at bottom surface 18b is sufficient to enable peripheral wall 18h capture to and retain a condiment container relatively tightly within aperture 18g.

Neck 20, which extends rearwardly from rear end 18f of base 18, includes a circumferential wall 20a (FIGS. 3 and 6) which originates in rear end 18f of base 18 and terminates in a rear end 20b. FIG. 7B shows that the region of exterior perimeter wall 18j extending from each of the rear corners 18k to circumferential wall 20a of neck 20 changes curvature at locations 18m and 18n. The radius of curvature at location 18m is R20.0 mm±0.5 mm and the radius of curvature at location 18n is R8.0 mm±0.5 mm. The radius of curvature at location 20g on neck is R0.25 mm. Neck 20 has a diameter of about 23.00 mm (i.e., just under 1 inch).

Figure 4:
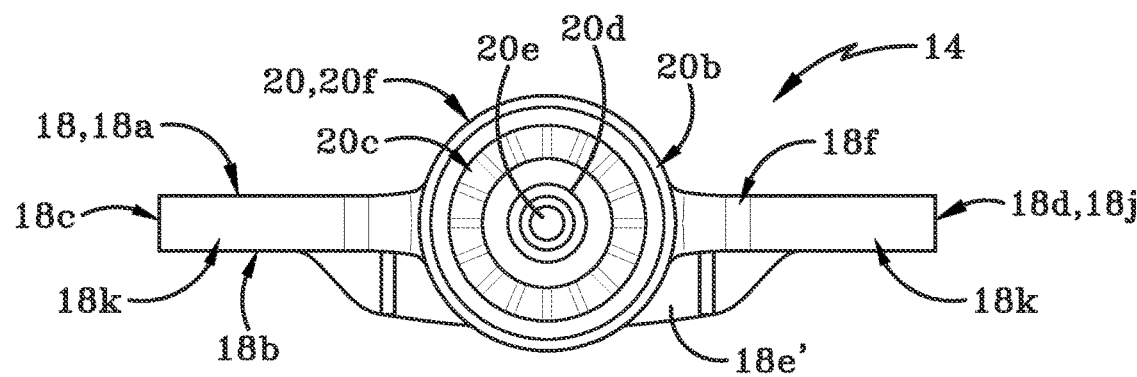
FIG. 4 is a rear elevation view of the body of the condiment holder.
Figure 5:
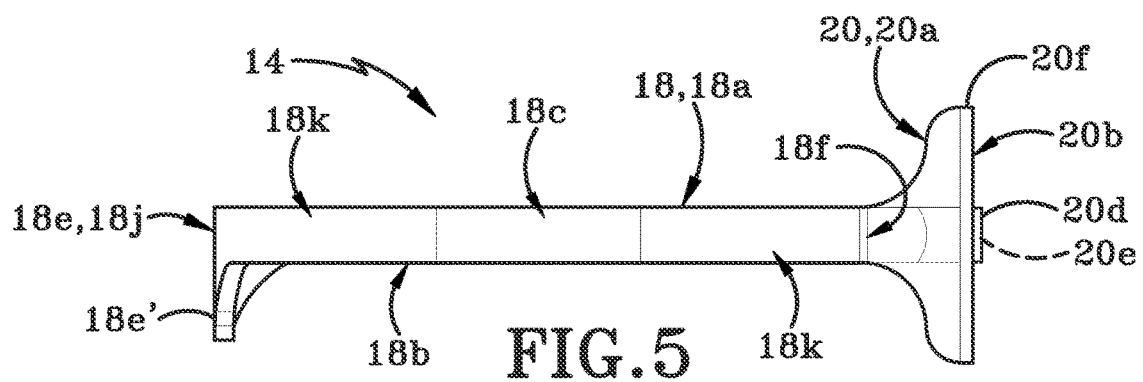
FIG. 5 is a right side elevation view of the body of the condiment holder.
Figure 6:
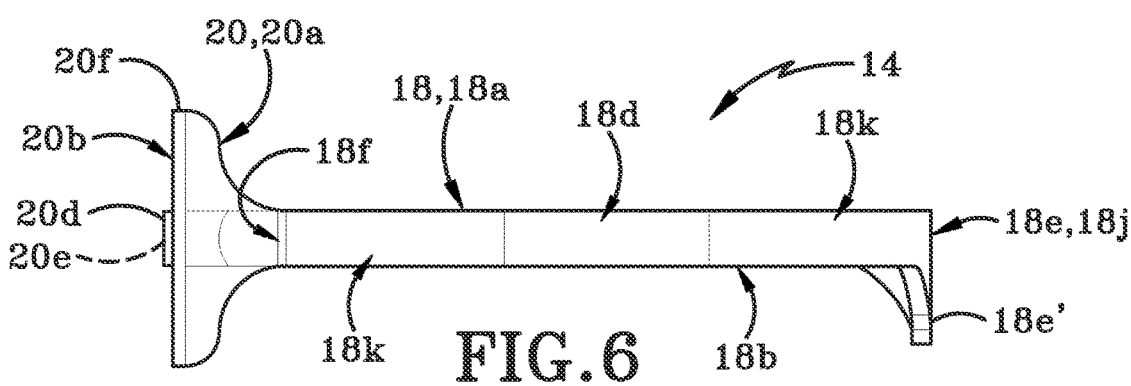
FIG. 6 is a left side elevation view of the body of the condiment holder.

Circumferential wall 20a is oriented generally at right angles to top surface 18a of base 18 and wall 20a extends partially above top surface 18a and partially below bottom surface 18b. As best seen in FIGS. 2A and 4, an annular ring 20c and a tubular sleeve 20d are molded into rear end 20b of neck 20. Annular ring 20c circumscribes sleeve 20d and a portion of sleeve 20d projects outwardly beyond rear end 20b (see FIG. 5). Ring 20c may include a plurality of waves 21 or ridges thereon. Sleeve 20d defines a bore 20e therein. An annular rim 20f is provided around an exterior surface of neck 20 adjacent rear end 20b.

Figure 3:
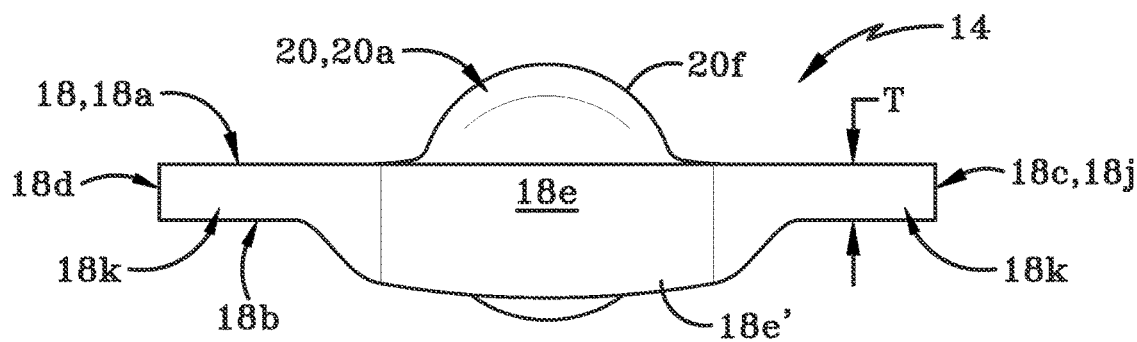
FIG. 3 is a front elevation view of the body of the condiment holder shown on its own.

Referring to FIG. 3, base 18 may be of a substantially constant thickness "T" where that thickness is measured between top surface 18a and bottom surface 18b. Body 14 may be of a length "L1" (FIG. 7B) measured from front end 18e of base 18 to rear end 20b of neck 20. Length "L1" may be from about 68.5 mm up to about 69.5 mm and preferably is about 69.0 mm. In other words, length "L1" is from about 2.69 inches up to about 2.74 inches long; and preferably is about 2.71 inches or 2⅔ inches long. Body 14 may be of a width "W1" (FIG. 7B) measured from left side 18c to right side 18d of base 18. Width "W1" may be from about 69.4 mm up to about 70.4 mm wide; and preferably is about 69.9 mm wide. In other words, width "W1" is from about 2.73 inches up to about 2.77 inches, and preferably is about 2.75 inches (about 2¾ inches).

The dimensions of body 14 are therefore generally around 2¾% inches long by 2⅔ inches wide. It should be noted that body 14 is not of a size sufficient to permit condiment holder 10 to rest on an upper rim of a vehicle cup-holder. In order for condiment holder 10 to be of a sufficient size to be supported by the upper rim of a vehicle cup-holder, the condiment holder 10 would have to be fabricated in a larger size. In particular, the condiment holder 10 would have to be between 3.5 inches and 4.5 inches in diameter or from at least 3.5 by 3.5 inches long and wide up to about 4.5 by 4.5 inches long and wide. As indicated above, condiment holder 10 is not this larger size but is, instead, smaller than the size required to be supported by on a rim of a cup-holder. If condiment holder 10 were placed onto a cup-holder rim, holder 10 would simply drop into the interior of the cup-holder. Clip 16 extends outwardly from body 14 and therefore increases the overall size of condiment holder 10. Resting clip 16 on a first part of a rim of a cup-holder and resting the body 14 on a second part of the rim of a cup-holder might enable condiment holder 10 to be used with the cup-holder. However, utilizing condiment holder 10 in this manner may not provide the most stable way of supporting a condiment container.

As indicated earlier herein, condiment holder 10 includes a clip 16 that is engaged with body 14 and is utilized to secure body 14 to any selected fin 12b of air vent 12. (In other instances, clip 16 may be utilized to selectively secure body 14 to more than one fin 12b of an air vent 12.) FIGS. 2, 2A, 9, and 10 show details of clip 16. Clip 16 comprises a base 34, a fastener 36 and a rubber cover 38. Base 34 includes a base plate 34a and a plurality of tines 40 that extend outwardly from base plate 34a. Base plate 34a is shaped and sized to be engaged with rear end 20b of neck 20. In particular, base plate 34a is positioned over annular ring 20c on neck 20 and defines an aperture 34b (FIG. 2A) therein that is sized to receive a portion of sleeve 20d therethrough, thus enabling fastener 46 to be inserted into bore 20e to secure base plate 34a to neck 20. Alternatively, fastener 46 may be inserted through aperture 34b and into the bore 20e of sleeve 20d in order to secure base plate 34a to neck 20. Plate 34a includes protruded regions 34c that engage the wavy regions 21 of annular ring 20c.

Tines 40 include a first tine 40a, a second tine 40b, a third tine 40c, and a fourth tine 40d. Tines 40a and 40c are located diametrically opposite each other and tines 40b and 40d are located diametrically opposite each other. Each tine 40 originates in base plate 34a and terminates in a free end remote from base plate 34a. Each tine 40 tapers in width from base plate 34a to the free end thereof. Adjacent tines, such as tine 40a and 40b, or 40b and 40c, for example, are positioned on base plate 34a in such a way that they are angled relative to each other. Tines 40 also angle slightly inwardly moving away from base plate 34a and towards a center point located intermediate the free ends of the four tines.

Figure 9:
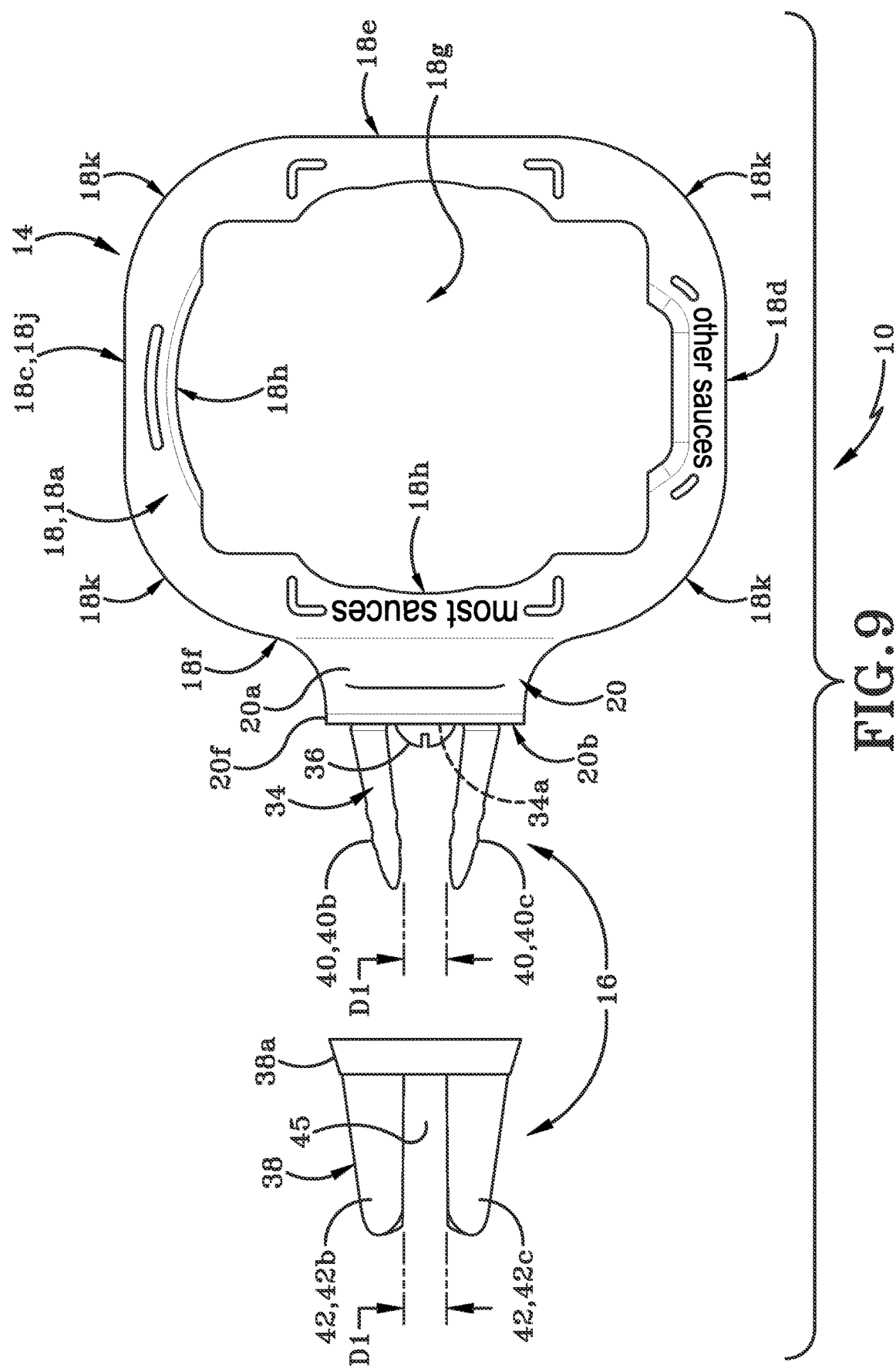
FIG. 9 is a top plan view of the condiment holder with the tines of the vent clip exposed.
Figure 10:
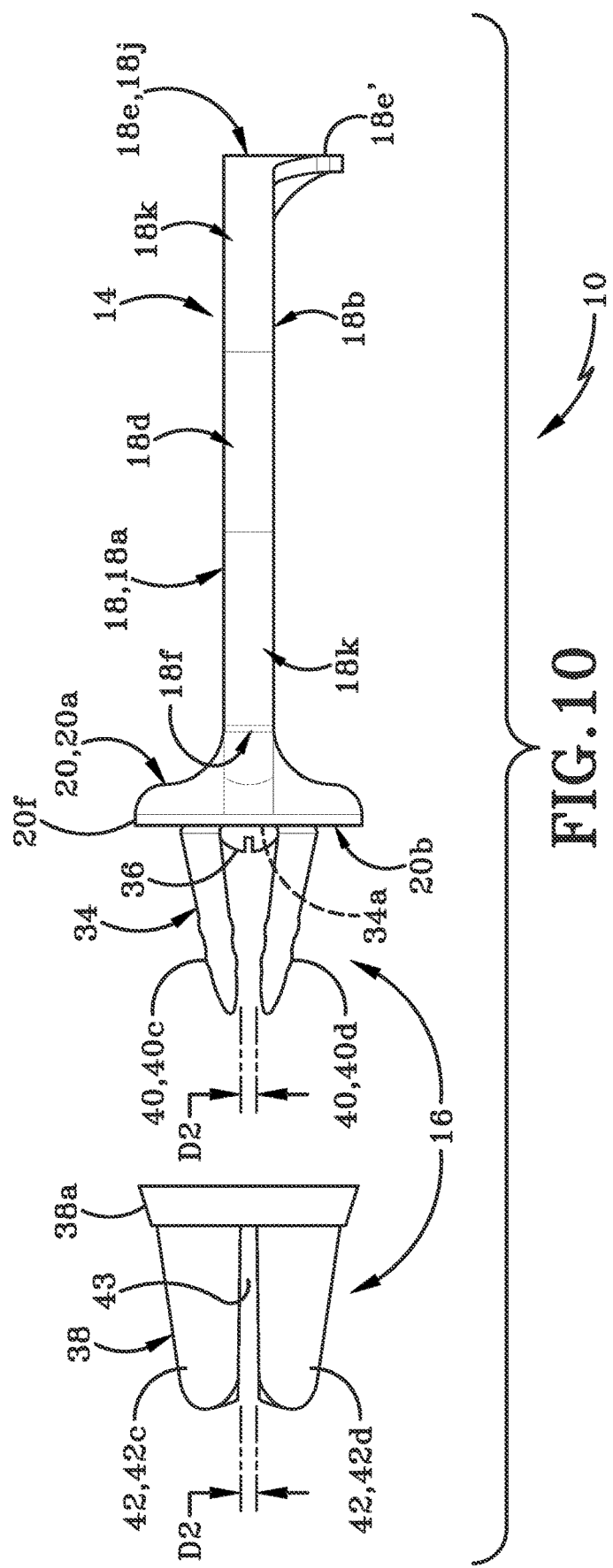
FIG. 10 is a left side elevation view of the condiment holder of FIG. 9.
Figure 12:
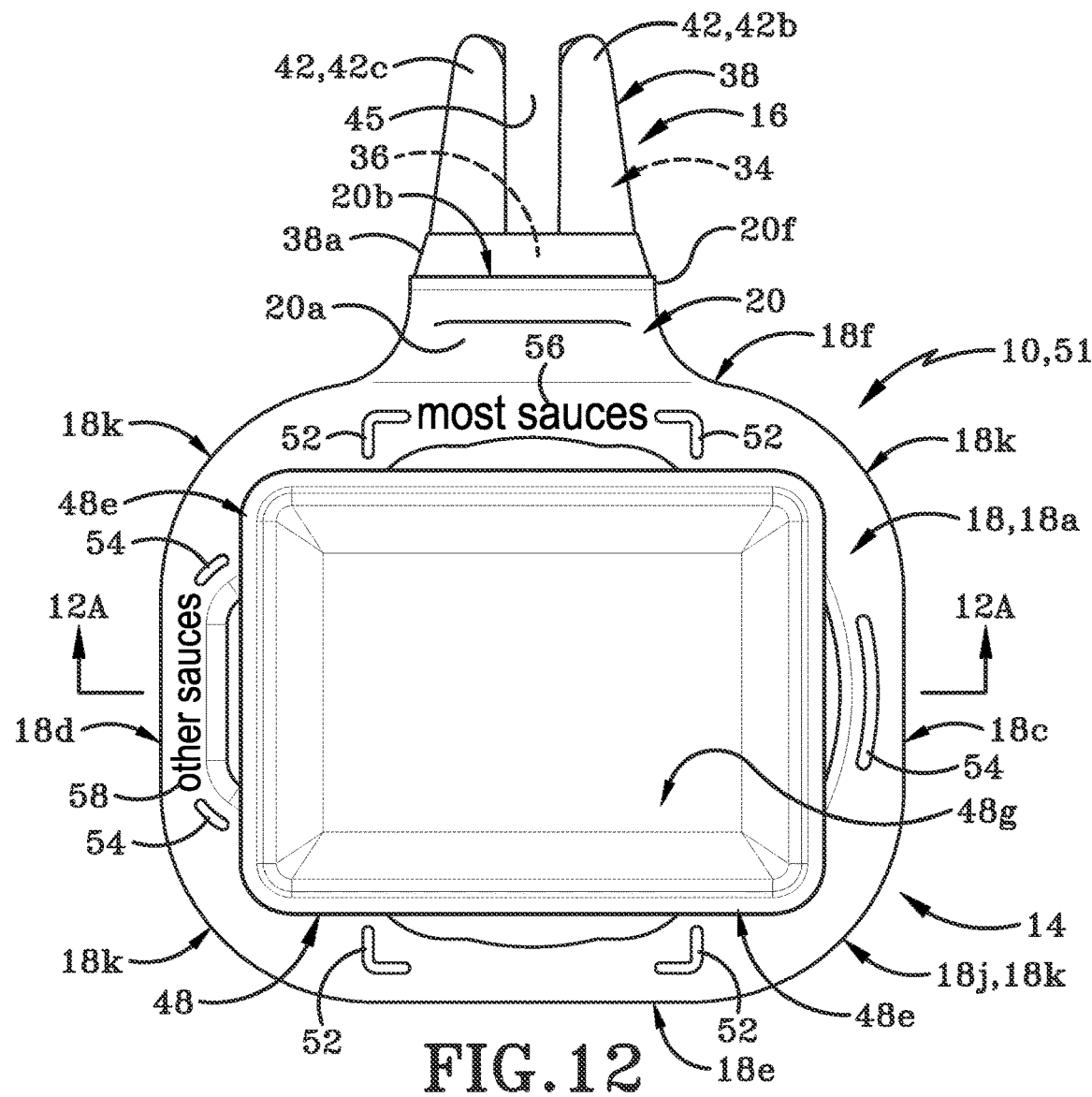
FIG. 12 is a top plan view of a condiment holder kit that comprises a condiment holder of FIG. 1 and a condiment container that is sold to the consumer with the condiment holder; wherein the kit is shown with the receptacle engaged with the condiment holder.
Figure 13:
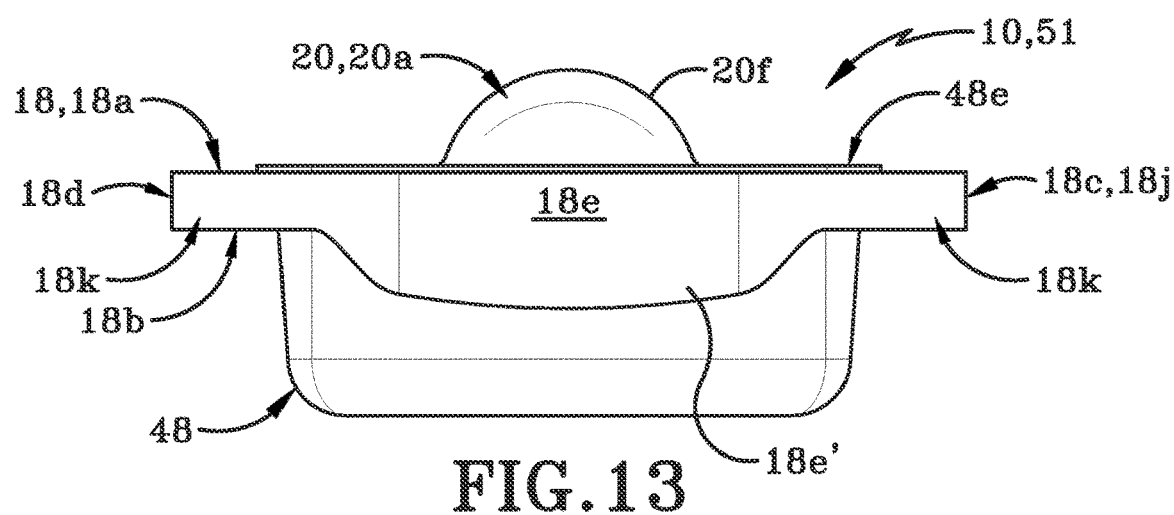
FIG. 13 is a front elevation view of the condiment holder kit of FIG. 12.
Figure 14:
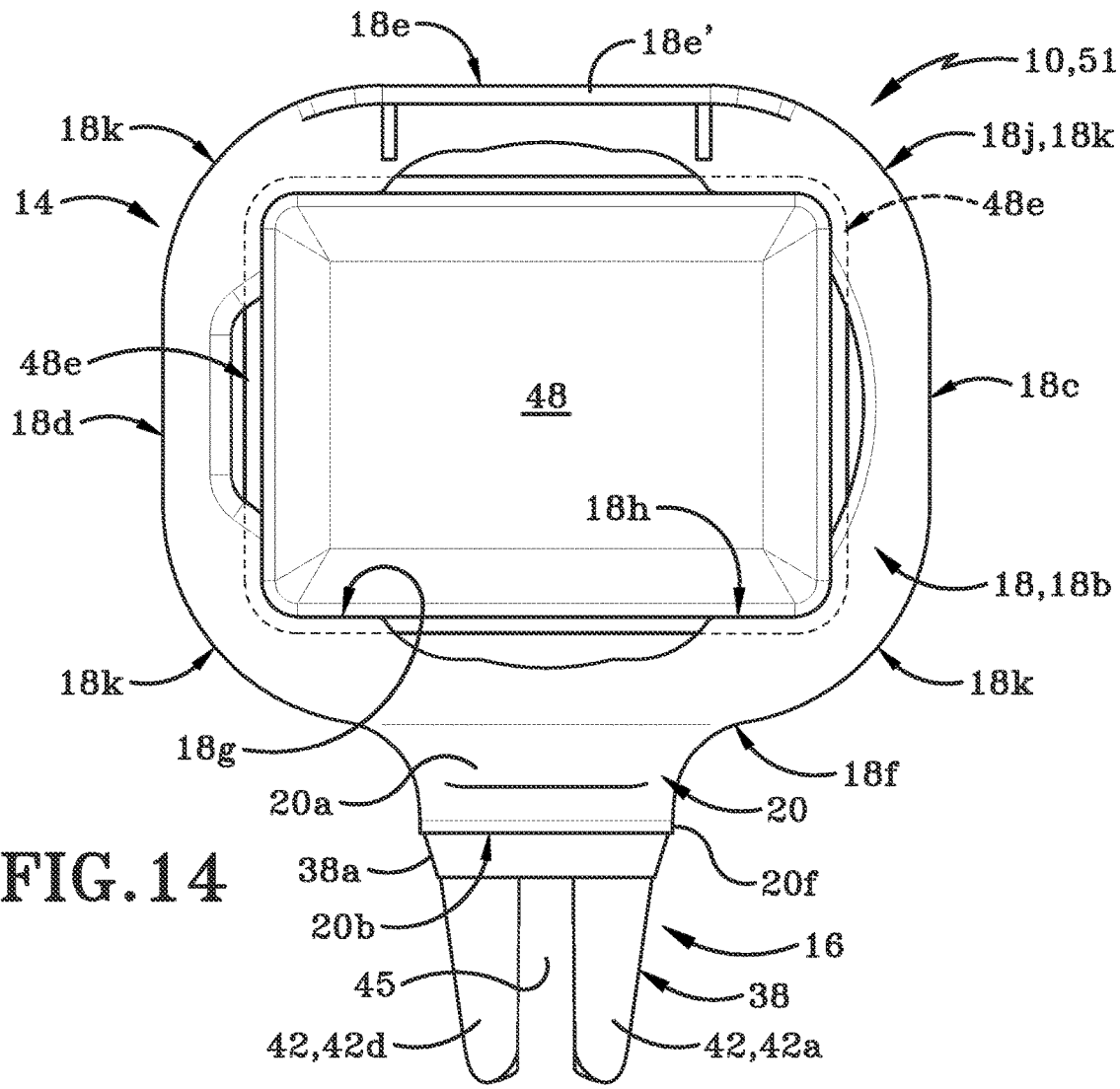
FIG. 14 is a bottom plan view of the condiment holder kit of FIG. 12.
Figure 15:
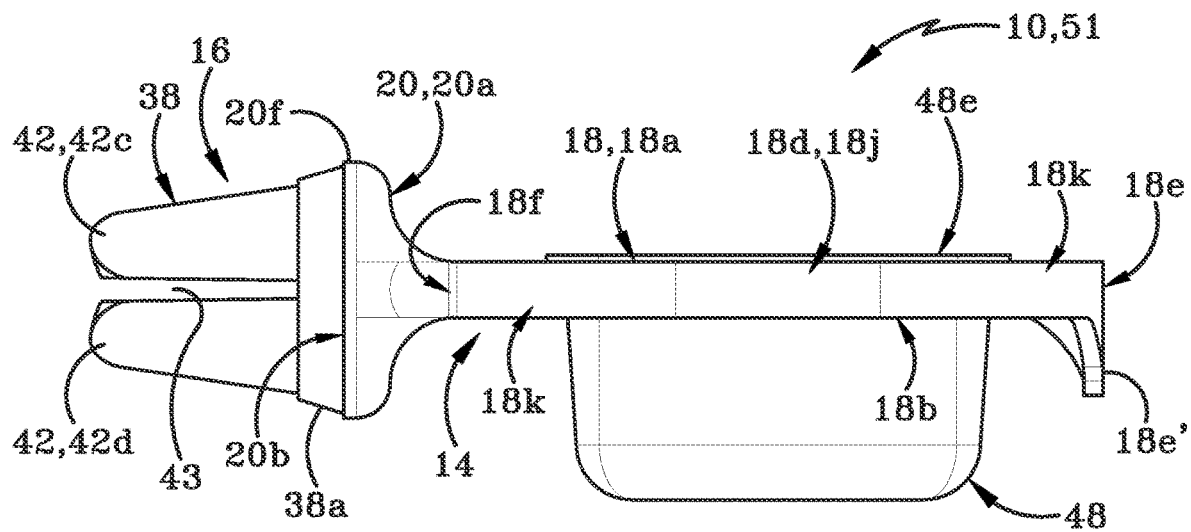
FIG. 15 is a left side elevation view of the condiment holder kit of FIG. 12.

As is evident from FIGS. 9 and 10, tines 40a and 40d are laterally spaced from each other and are located a distance "D1" apart from each other at their free ends. Tines 40b and 40c are also laterally spaced from each other and are located a distance "D1" apart from each other at their free ends. Tines 40c and 40d are spaced a distance "D2" apart from each other at their free ends and it will be understood that tines 40a and 40b are similarly located a distance "D2" apart from each other at their free ends. "D1" is greater than "D2". The spacing "D1" and "D2" between adjacent tines is provided so that different thickness fins on air vents may be engaged by clip 16. The spacing "D1" enables clip 16 to accept a thicker fin of an air vent 12 therein while the spacing "D2" enables clip 16 to accept a thinner fin of an air vent 12 therein. Clip 16 may be rotated relative to base 18 and about an axis that is oriented parallel to a longitudinal direction between front end 18e and rear end 18f of base 18. Clip 16 is rotated relative to base 18 so that the most appropriate tine spacing is selected to engage with the particular fins of air vent 12. Clip 16 is also able to be rotated in order to be engaged with vertically oriented fins of a vehicle air vent or with fins that are oriented at an angle. The ability to rotate clip 16 relative to base 18 enables the condiment holder 10 to be engaged with many different types of air vents while providing the ability for the condiment holder 10 to keep any condiment container retained therein oriented generally horizontal and level. This ensures that any condiment within the condiment container does not spill out of the same.

Rubber cover 38 of clip 16 includes an annular base 38a that is sized and shaped to be complementary to annular rim 20f (FIG. 9) provided at rear end 20b of neck 20. Four tapered sleeves 42 (i.e., sleeves 42a, 42b, 42c, 42d) extend outwardly from annular base 38a. Sleeves 42 are molded such that they each include a hollow passageway shaped and sized to receive one of the metal tines 40 of base 34 therein. Sleeves 42a-42d are positioned relative to each other in a similar manner to the positioning and orientation of tines 40a-40d. Sleeves 42a-42d therefore are oriented in such a way that they angle inwardly toward each other so that their terminal ends are closer to each other than are the regions of the sleeves 42a-42d that connect to annular base 38a. As is evident from FIGS. 9 and 10, the spacing between sleeves 42b and 42c is about equal to distance "D1" between tines 40b and 40c. Similarly, the spacing between sleeves 42a and 42d is about equal to the distance "D1" between tines 40a and 40d. The spacing between sleeves 42c and 42d is about equal to the distance "D2" between tines 40c and 40d and the spacing between sleeves 42a and 42b is also about equal to the distance "D2" between tines 40a and 40b. It should be noted that when condiment holder 10 is engaged on air vent 12, the fin 12b of air vent 12 is received in the gaps between sleeves 42a and 42b and between sleeves 42c and 42d. In other words, the fin 12b is received in the spaces that are "D2" in size. The spaces into which fin 12b is received is identified in FIG. 2 by the reference character 43. The spaces 45 (FIG. 2) are provided to allow the sleeves 42 to flex as fin 12b is engaged. The material used to fabricate cover 38 help clip 16 frictionally grip the fin 12b of air vent 12.

As indicated earlier herein, the various walls sections that comprise peripheral wall 18h make it possible for body 14 to receive and engage any one of a plurality of differently-configured condiment containers therein. FIG. 11A illustrates a first condiment container 44 (shown in dashed lines) received in aperture 18g defined by body 14. First condiment container 44 is illustrated as being generally rectangular in exterior shape. It should be noted that the generally rectangular shape of first condiment container 44 as illustrated in FIG. 11A has been slightly reduced in dimensions in order to more clearly illustrate which of the wall sections of peripheral wall 18h are utilized to frictionally grip first condiment container 44 and retain the same in engagement with body 14. As is evident from FIG. 11A, first walls sections 24a, 24b, 24c, and 24d are utilized to retain first condiment container 44 within aperture 18g of body 14. The wall sections of peripheral wall 18h other than first walls sections 24a, 24b, 24c, 24d do not come into contact with the rectangularly-shaped first condiment container 44 and do not aid in retaining first condiment container 44 within aperture 18g of body 14.

FIG. 11B illustrates a second condiment container 46 (in dashed lines) retained by body 14 and the exterior shape has been reduced in size in a similar manner to first condiment container 44 in FIG. 11A. Second condiment container 46 is contacted and retained in place by fourth wall section 30 and fifth wall section 32. All wall sections of peripheral wall 18h other than fourth wall section 30 and fifth wall section 32 do not come into contact with second condiment container 46 and do not aid in retaining the same within condiment holder 10. Second condiment container 46 may be generally rectangular in configuration but may be of a greater length from a first end 46a to a second end 46b thereof than the length of first condiment container 44 (where the length of first condiment container 44 is measured from first end 44a to second end 44b shown in FIG. 11A). Second condiment container 46 is also of a narrower width as measured from first side 46c to second side 46d thereof than is the width of first condiment container 44 (where the width of first condiment container 44 is measured between first side 44c and second side 44d thereof.) Second condiment container 46 may also be configured so that one end thereof is complementary in shape to fifth wall section 32 of body 14.

FIG. 11C illustrates a third condiment container 48 (in dashed lines and slightly reduced in exterior dimensions) that is retained in body 14. In particular, third condiment container 48 is engaged by third wall sections 28a, 28b, 28c, and 28d of body 14. No wall sections of peripheral wall 18h other than third wall sections 28a, 28b, 28c, and 28d contact and frictionally retain third condiment container 48 in condiment holder 10. Third condiment container 48 is generally rectangular in shape but the length (measured from first end 48a to second end 48b) and the width (measured from first side 48c to second side 48d) are different to the length and width of first condiment container 44 and/or of second condiment container 46.

FIG. 11D illustrates a fourth condiment container 50 (in dashed lines and slightly reduced in exterior dimensions) retained in aperture 18g of body 14. Fourth condiment container 50 is circular in cross-section and is retained in body by second wall sections 26a and 26b. The diameter of the fourth condiment container 50 is substantially equal to the diameter of a circular region within aperture 18g, where the second wall sections 26a, 26b form part of the circumference of that circular region. No wall sections of the peripheral wall 18h other than second wall sections 26a, 26b contact and retain fourth condiment container 50 within aperture 18g of body 14.

When any of the aforementioned condiment containers is engaged with body 14, the consumer may remove a protective closure from the condiment container and thereby gain access to the condiment within the container. The protective closure may be removed before the body 14 is engaged with an air vent 12 or after the body 14 is engaged with the air vent 12. The fins 12b of air vent 12 may be moved upwardly or downwardly (or left or right) as desired, in order to ensure that condiment container is held in an optimum position for dipping of food morsels therein.

Referring again to FIG. 7, base 18 may further include a plurality of first ridges 52 and a plurality of second ridges 54 that extend upwardly and outwardly from top surface 18a. Graphic indicia 56 and 58 may be provided on top surface 18a adjacent first ridges 52 and second ridges 54 specifically. By way of example only, first ridges 52 may be provided on a region of top surface 18a adjacent front end 18e and rear end 18f. Each first ridge 52 may be generally "L-shaped" and identify a region of top surface 18a that will frame a typical condiment container when received in aperture 18g. The first graphic indicia 56 may be associated with the first ridges 52 and may include informational text that will identify to a consumer which orientation a specific shape of condiment container should assume to be retained within aperture 18g. In particular, first indicia 56 include the words "most sauces" by way of example only to indicate a typical orientation of a generally rectangular condiment container (such as condiment container 44 shown in FIG. 11A). Any other graphic or textual indicia 56 may be used instead of the words "most sauces". Similarly, second graphic indicia 58 may be associated with second ridges 54 and may include informational text or pictures that will help to identify to a consumer which orientation a specific shape of condiment container should assemble to be retained within aperture 18g. In particular, second indicia 58 include the words "other sauces" by way of example only to indicate a typical orientation for another shape of condiment container, such as the condiment container 46 shown in FIG. 11B. Any other graphic or textual second indicia 58 may be used instead of the words "other sauces". It will be understood that other graphic images or textual information may be provided on top surface 18a or elsewhere on body 18 to inform the consumer of where and how to engage condiment containers in condiment holder 10.

FIGS. 12 to 16 show a kit 51 that a consumer may purchase. Kit 51 comprises the condiment holder 10 as described above along with a reusable or disposable condiment container that may be selectively engaged with condiment holder 10. The receptacle sold with kit 41 may be of any shape that will be able to be retained in condiment holder 10 by appropriate wall sections of the peripheral wall 18h. The receptacle illustrated as being sold as part of kit 51 is one shaped similarly to third condiment container 48 of FIG. 11C. As is evident, particularly from FIG. 12A, a flange 48e of receptacle 48 overlaps at least a portion of top surface 18a of base 18. This overlapping section of flange 48a helps to ensure that receptacle 48 will not drop through aperture 18g. Similarly, each of the first condiment container 44, second condiment container 46 and fourth condiment container 50 have flange portions that will overlap a portion of the top surface 18a of body 14 to ensure that they do not drop through aperture 18g if these condiment containers are provided as a receptacle and sold as part of kit 51.

The consumer may utilize the kit 51 as follows. Condiment holder 10 is engaged with a vehicle air vent 12 as previously described. Receptacle 48 is engaged in aperture 18g of condiment holder 10 and may be utilized to hold a quantity of condiment, such as ketchup, therein. The condiment may be squeezed out of a flexible plastic pouch and into the chamber 48g before or after receptacle 48 is engaged in condiment holder 10. (Condiment may also be placed in receptacle from a larger dispenser of the condiment provided at a fast-food restaurant or provided by the consumer.) The consumer may then dip their fries or chicken nuggets into the quantity of condiment held within chamber 48g in a similar manner to how the consumer uses one of the condiment containers 44, 46, 48, or 50 provided by a fast-food restaurant.

Figure 16:
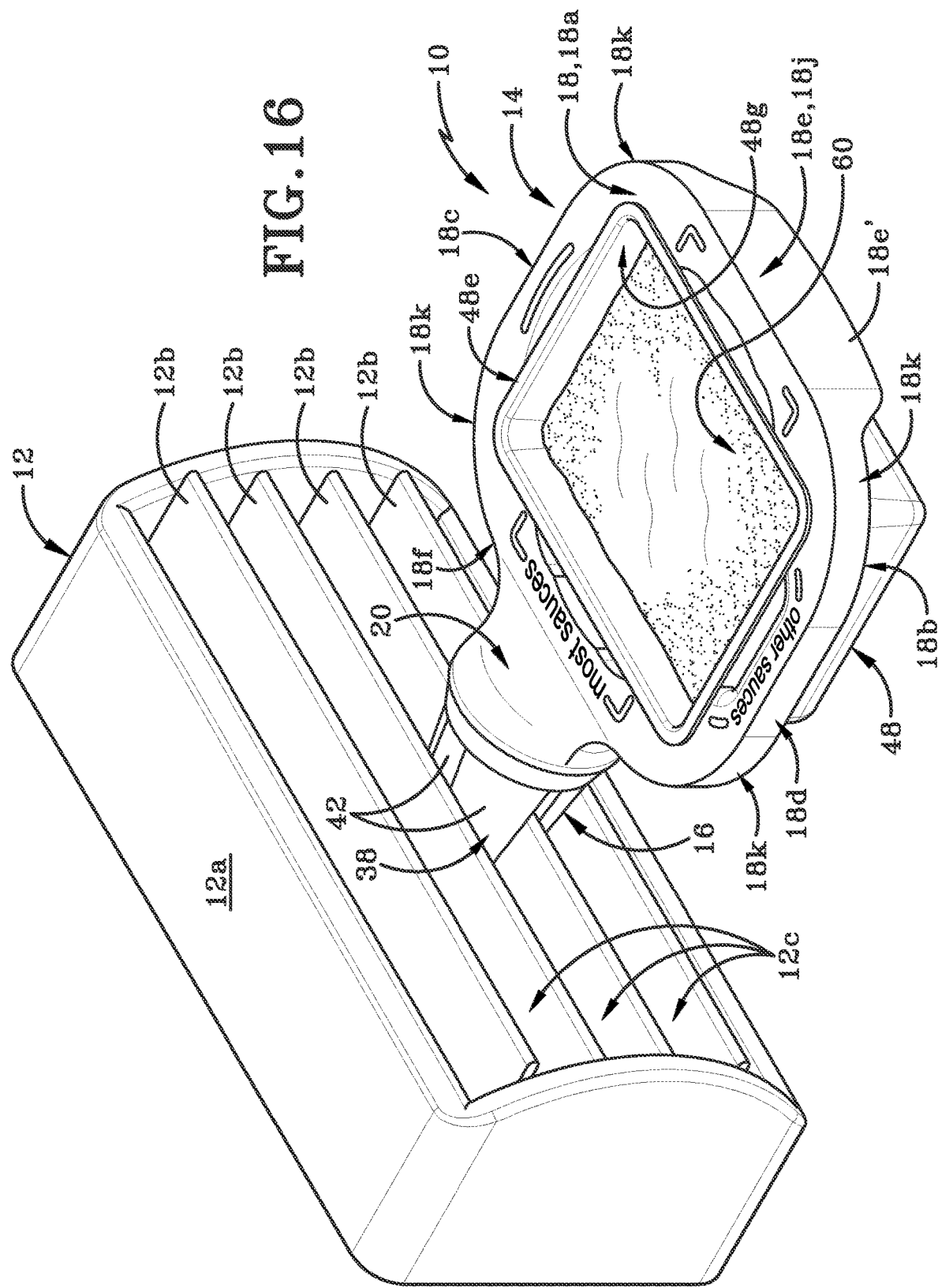
FIG. 16 is a top, front, left side, isometric perspective view of the condiment holder in accordance with the present disclosure shown engaged with a vehicle air vent and showing a quantity of a condiment retained within the condiment container engaged with the condiment holder.

The consumer may utilize condiment holder 10 as follows. Condiment holder 10 is engaged with a vehicle air vent fin 12b using clip 16 as previously described herein. The consumer will have been provided with one of the condiment containers from a fast-food restaurant or will have purchased a kit 51 that includes condiment container 48. In the instance of condiment containers provided by a restaurant, these containers typically include a quantity of condiment that is enclosed in the container by a peelable cover. In the case of the receptacle provided as part of kit 51, a quantity of condiment is placed therein by the consumer. The selected condiment container or receptacle 44, 46, 48 or 50 is engaged in aperture 18g of condiment holder 10 and is secured therein by the appropriate wall sections of peripheral wall 18h as previously described. The angle of the peripheral wall 18h itself will also grip the engaged condiment container 44, 45, 48, 50. When the consumer pushes the selected condiment container or receptacle into aperture 18g, they will typically hear a "click" that confirms the condiment container or receptacle is securely retained by condiment holder 10. In other words each selected condiment container or receptacle is retained within holder 10 by a snap-fitting engagement therewith. The configuration of the holder 10 and of the selected condiment container enables this snap-fitting engagement. The peelable cover, if provided, may then be removed to provide access to the condiment 60 (FIG. 16). The consumer may then dip their fries or chicken nuggets into the quantity of condiment 60 held within the condiment container or receptacle 44, 46, 48 or 50 provided by a fast-food restaurant or by the consumer himself or herself.

Figure 17:
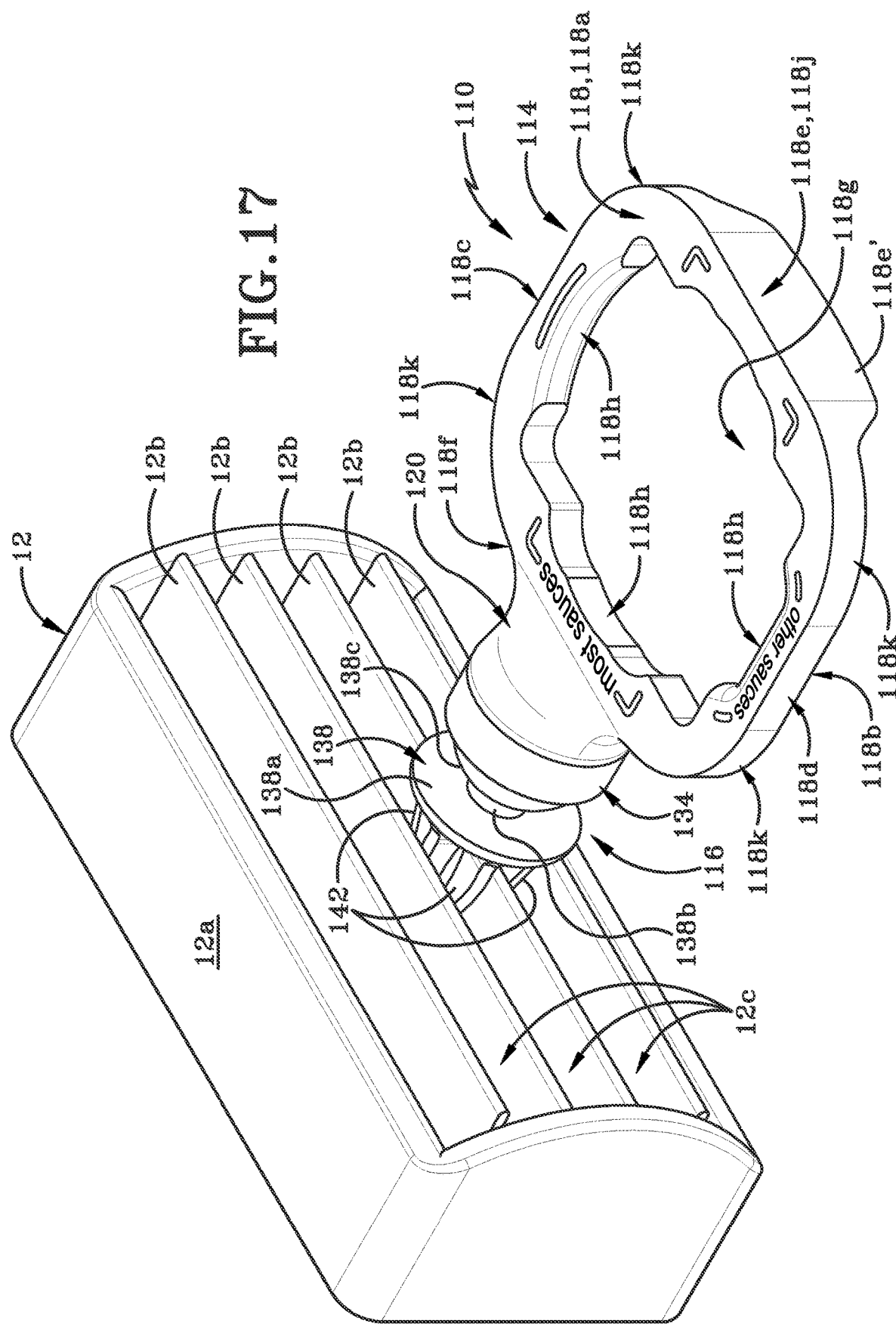
FIG. 17 is a top, front, left side, isometric perspective view of a second embodiment of a condiment holder in accordance with the present disclosure shown engaged with a vehicle air vent.

Referring now to FIGS. 17 to 21 there is shown a second embodiment of a condiment holder, generally indicated at 110. Holder 110 is comprised of a body 114 and a clip 116. Body 114 includes a base 118 and a neck 120, where neck 120 extends rearwardly outwardly from base 118 and is secured to clip 116. Base 118 and neck 120 may be molded from any suitable plastic material as a single, monolithic, unitary component. (In other instances, base 118 and neck 120 may be separately formed and may be secured together by any suitable means such as heat welding.) Base 118 is generally rectangular in shape when viewed from above (FIG. 18) and includes a top surface 118a, a bottom surface 118b, a left side 118c, a right side 118d, a front end 118e, and a rear end 118f. Top surface 118a and bottom surface 118b define a vertical direction therebetween, left side 118c and right side 118d define a lateral or transverse direction therebetween, and front end 118e and rear end 118f define a longitudinal direction therebetween. FIG. 17 shows that front end 118e includes a downwardly extending flange region 118e' that extends downwardly for a distance beyond bottom surface 118b. Flange region 118e' provides a location for an advertising logo to be provided on base 118.

An aperture 118g is bounded and defined by an interior peripheral wall 118h of base 118. Aperture 118g may be generally centrally located in base 118 and extend from top surface 118a through to bottom surface 118b. Aperture 118g is configured to receive any one of a plurality of differently-shaped condiment containers or receptacles therein. Top surface 118a forms a frame that circumscribes aperture 118g and a portion of each of the plurality of differently-shaped condiment containers rests on and is supported by this frame (i.e., by top surface 118a). It will be understood that only one of condiment container is able to be engaged in aperture 118g at any one time. In particular, aperture 118g is configured to be able to selectively receive at least three differently-configured or differently-shaped condiment containers therein. Specifically, peripheral wall 118h and therefore aperture 118g, is configured so that at least four differently-shaped condiment containers are able to be selectively, individually engaged with base 118. The particulars of the differently-configured or shaped condiment containers have been discussed previously herein. It will be understood that the ability to engage a plurality of differently-configured condiment containers in aperture 118g is made possible by the specific shape of the peripheral wall 118h that bounds and defines aperture 118g. The exterior surfaces of left side wall 118c, front end 118e, right side wall 118d and rear wall 118f form an exterior perimeter wall 118j (FIGS. 17 and 18) of base 118. Perimeter wall 118j is located radially outwardly from peripheral wall 118h and includes rounded corners 118k. The rounded corners 118k help to ensure that condiment holder 110 does not present any sharp edges that could cause a minor injury to a consumer during use.

It will be understood that body 118 and, in particular, the peripheral wall 118h that bounds and defines aperture 118g, is substantially identical in structure and function to body 18 and the peripheral wall 18h previously described herein and therefore will not be discussed further.

Referring again to FIG. 18, base 118 may further include a plurality of first ridges 152 and a plurality of second ridges 154 that extend upwardly and outwardly from top surface 118a. Graphic indicia 156 and 158 may be provided on top surface 118a adjacent first ridges 152 and second ridges 154 specifically. By way of example only, first ridges 152 may be provided on a region of top surface 118a adjacent front end 118e and rear end 118f. Each first ridge 152 may be generally "L-shaped" and identify a region of top surface 118a that will frame a typical condiment container when received in aperture 118g. The first graphic indicia 156 may be associated with the first ridges 152 and may include informational text that will identify to a consumer which orientation a specific shape of condiment container should assume to be retained within aperture 118g. In particular, first indicia 156 include the words "most sauces" by way of example only to indicate a typical orientation of a generally rectangular condiment container (such as condiment container 44 shown in FIG. 11A). Any other graphic or textual indicia 156 may be used instead of the words "most sauces". Similarly, second graphic indicia 158 may be associated with second ridges 154 and may include informational text or pictures that will help to identify to a consumer which orientation a specific shape of condiment container should assemble to be retained within aperture 118g. In particular, second indicia 158 include the words "other sauces" by way of example only to indicate a typical orientation for another shape of condiment container, such as the condiment container 46 shown in FIG. 11B. Any other graphic or textual second indicia 158 may be used instead of the words "other sauces". It will be understood that other graphic images or textual information may be provided on top surface 118a or elsewhere on body 118 to inform the consumer of where and how to engage condiment containers in condiment holder 110.

Neck 120, which extends rearwardly from rear end 118f of base 118, includes a circumferential wall 120a (FIG. 19) which originates in rear end 118f of base 118 and terminates in a rear end 120b. Circumferential wall 120a is oriented generally at right angles to top surface 118a of base 118 and wall 120a extends partially above top surface 118a and partially below bottom surface 118b. Wall 120a extends rearwardly and terminates in a rear end 120b. An annular rim 120f is provided around an exterior surface of neck 120 adjacent rear end 120b.

Figure 19:
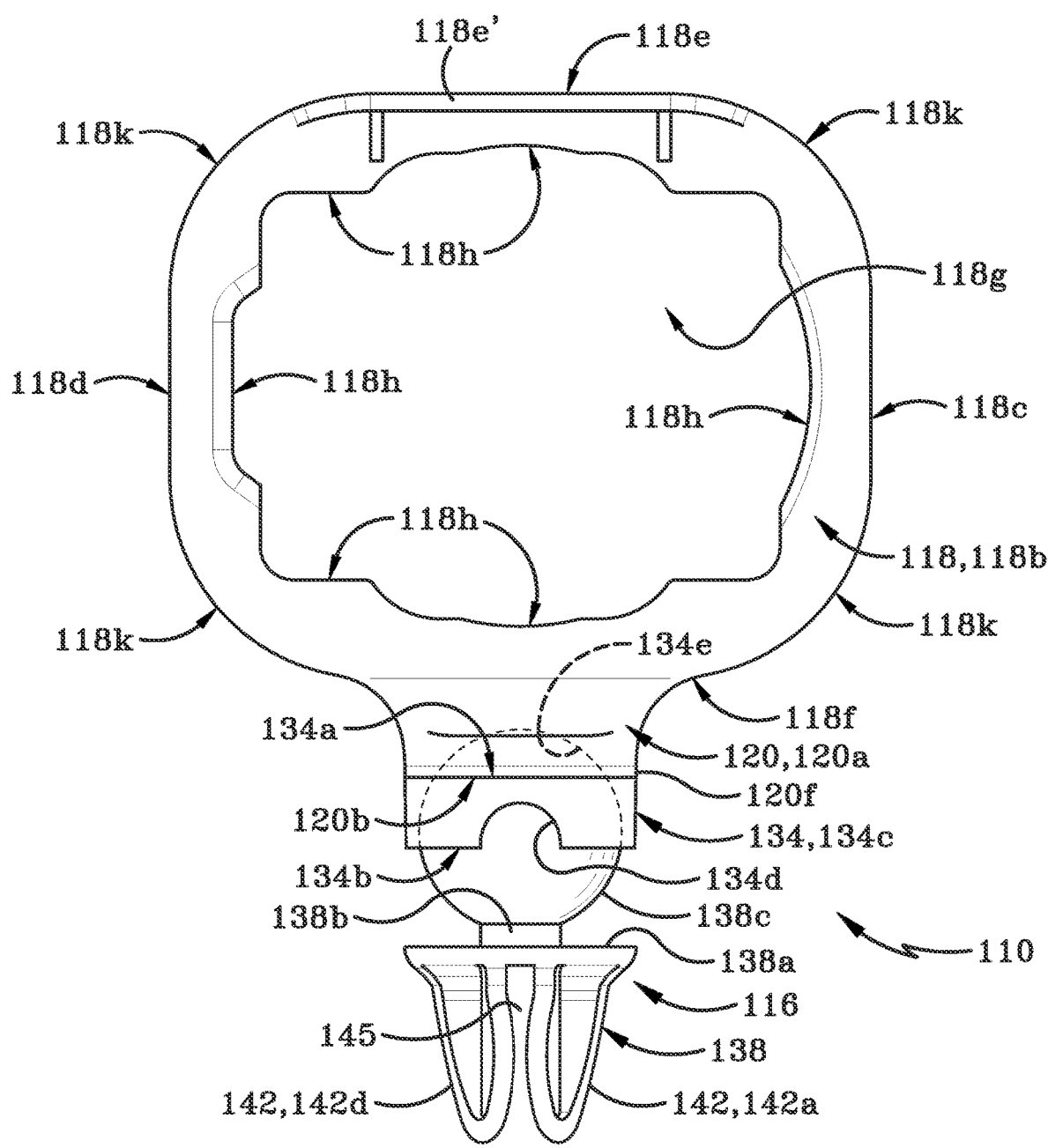
FIG. 19 is a bottom plan view of the condiment holder of FIG. 17.

Neck 120 differs from neck 20 in that instead of an annular ridged ring 20c and a tubular sleeve 20d being molded into rear end 20b of neck 20, an annular ring 134 extends outwardly and rearwardly from rear end 120b of neck 120. A first end 134a of ring 134 is engaged with rear end 120b of neck 120 proximate annular rim 120f and a second end 134b of ring 134 is spaced a distance rearwardly from first end 134a. A circumferential wall 134c of ring 134 extends between first end 134a and second end 134b. As best seen in FIG. 19, a semi-circular recess 134d is defined in second end 134b. Recess 134d may be longitudinally aligned with a lateral midpoint between left side 118c and right side 118d of body 118. (Recess 134d is provided so that body 118 is able to pivot to 90° relative to clip so that a consumer can mount clip 116 and consequently condiment holder 110 to an edge or wall of a fries or chicken nugget box provided by a fast food restaurant.) A socket 134e (i.e. a hemispherical cavity) may be defined by ring 134 and this socket 134e may be accessible through an opening defined in second end 134b. The socket 134e is shown in FIG. 20.

Instead of a plate 34 being connected to a plurality of tines 42, condiment holder 110 includes a plate 138a that has a front surface from which a plurality of tines 142 extend outwardly in a similar manner to tines 42 from plate 34 of holder 10. A stem 138b extends outwardly from plate 138a in a direction opposite to tines 142. A ball 138c is provided on an end of stem 138b. Ball 138c is sized to be received within socket 134e defined by ring 134 on body 118. It will be understood that clip 116 may be fabricated as a unitary, monolithic body. In one example tines 142, plate 138a, stem 138b, and ball 138c may comprise a single component. In particular, this single component may be molded from plastic. In one example ball 138c may be coated with rubber or any other friction increasing material that will increase grip.

Ball 138c is interference fitted within socket 134e. As a result, ball 138c will not move out of engagement with socket 134e. The interference fit between ball 138c and socket 134e is such that ball 138c is rotatable in various directions within socket 134e. In other words, body 118 and clip 116 are secured to each other by a ball-and-socket style joint. The ball-and-socket joint is interposed between body 118 and the portion of the clip 116 that engages a fin of an air vent. Ball 138c allows any direction of movement as well as rotation for any angle of vents and to counteract any tendency of base 118 to move downwardly relative to the vent fin, i.e., to "droop" under the weight of base 118 or the weight of the base 118 and a condiment container held thereby. In particular, the ball-and-socket joint permits the body 118 to pivot downwardly in the direction of arrow "A" (FIG. 21) or upwardly in the direction of arrow "B" as shown in phantom in this figure. The pivotal motion of body 118 in the directions of arrow "A" or "B" is relative to a horizontal position or a horizontally-oriented plane (shown in solid lines in FIG. 21). The ball-and-socket joint also permits the base to move to the left or right relative to a vertically-oriented plane (not illustrated). Because of this pivotal motion afforded by the ball-and-socket style joint, the consumer is able to position body 118 and thereby any condiment container or receptacle retained therein to be positioned at a desirable orientation for dipping. The ball-and-socket joint also permits the condiment holder to be engaged with any style of vent fin regardless of whether that vent fin is horizontally oriented, vertically oriented, or is oriented at an angle, and to hold a condiment container in an optimum horizontal position for dipping. The ball-and-socket joint allows for correct positioning of the condiment container so that condiment will not spill out of a condiment container held by condiment holder 110.

It will be understood that instead of the ball being provided on the clip 116 and the socket being defined in the neck 120 (which is part of base 118), the ball may extend outwardly from base 118 (or from neck 120) and the socket may be defined in the stem of the clip 116.

The tines 142 that extend outwardly from plate 138a may be arranged and spaced in a substantially identical manner to tines 42 and may serve the same function. Tines 142 are shaped in leaf spring like form so they deflect and cause a reaction force to grip the vent fin 12b. In one example tines 142 may be coated with rubber or any other friction increasing material for increased grip on vent fin 12b.

Figure 18:
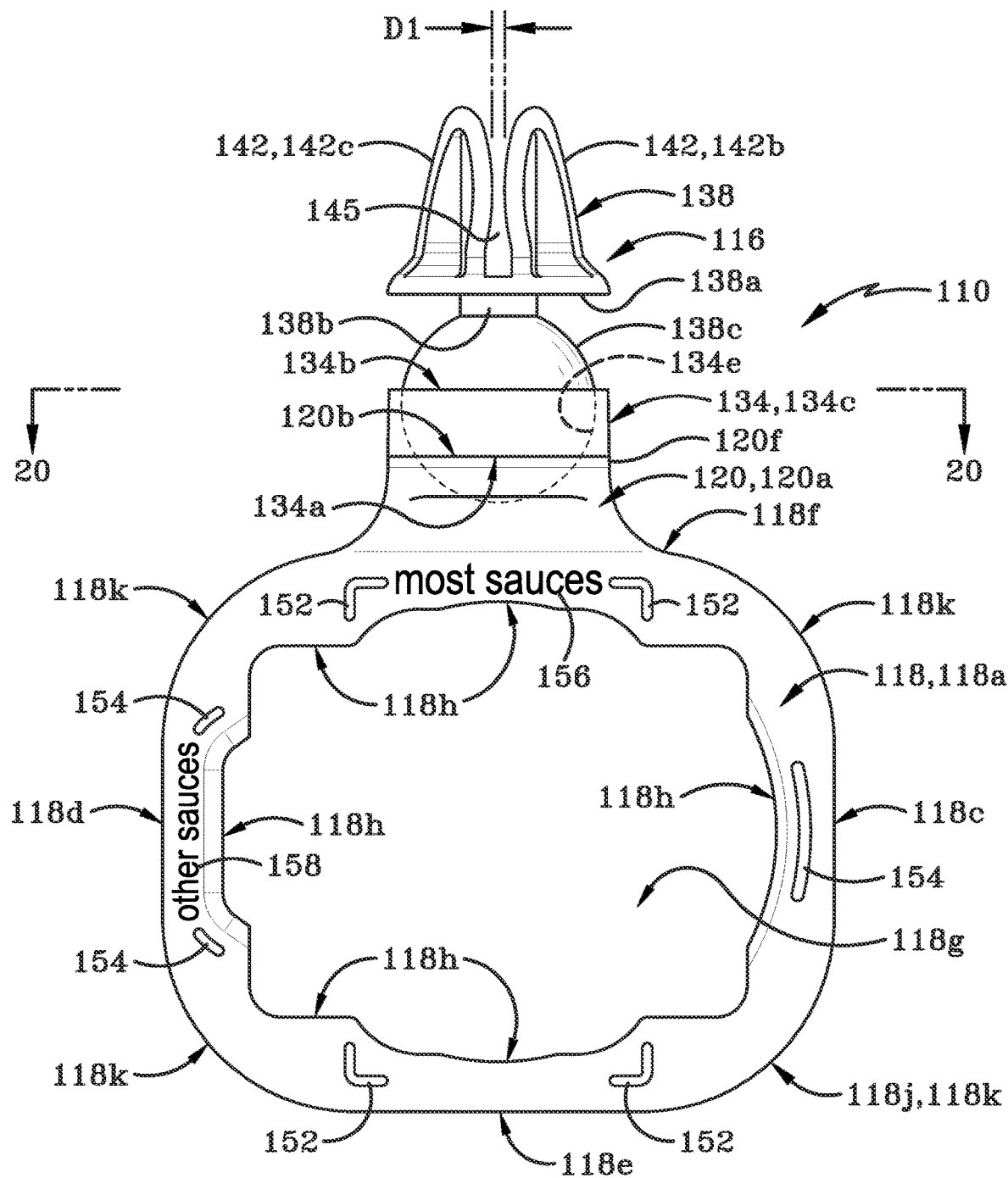
FIG. 18 is a top plan view of the condiment holder of FIG. 17 shown on its own.

The angling, spacing, and functioning of tines 142 may be substantially identical to tines 42 discussed previously herein and there will not be discussed further herein. In other words, condiment holder 110 may include four tines 142a, 142b, 142c, and 142d. As shown in FIG. 18, tines 142b, 142c may be spaced a distance "D1" apart (as are tines 142a and 142d). FIG. 21 shows that tines 142a and 142b may be spaced a distance "D2" apart (as may tines 142c and 142d). The different spacing allows different thickness air vent fins to be grasped by tines 142.

Figure 22:
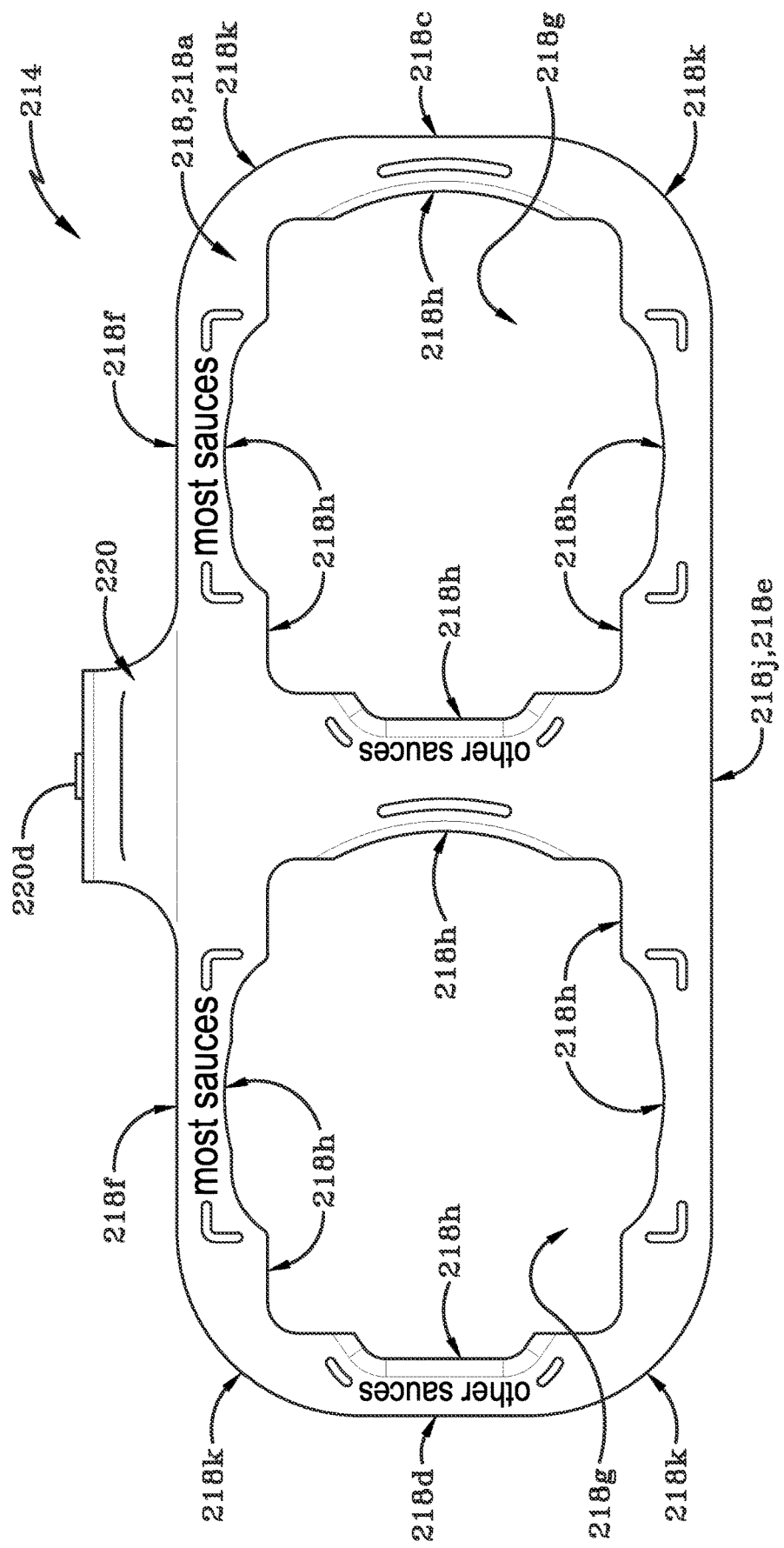
FIG. 22 is a top plan view of a third embodiment of a condiment holder in accordance with the present disclosure.

Referring now to FIG. 22, there is shown a body of a third embodiment of a condiment holder in accordance with the present disclosure, generally indicated at 214. Body 214 includes a base 218 that has a top surface 218a, a bottom surface (not shown), a left side 218c, a right side 218d, a front end 218e, and back end 218f. Base 218 defines more than one aperture 218g therein. Each of the more than one apertures 218g may be identical in configuration to aperture 18g. In other words, the interior peripheral wall 218h is substantially identical to the interior peripheral wall 18h. The perimeter wall 218j is differently shaped to the perimeter wall 18j because there are two regions for holding condiment containers defined in body 214 relative to condiment holder 10. The perimeter wall 218j does include rounded corners 218k substantially identical to corners 18k. It will be understood that body 214 may be engaged with a clip that is utilized to secure the same to a fin of an air vent. The clip may be substantially identical to either of the clips 16 or 116, or may be any other clip suitable for this purpose.

When body 214 is engaged with a clip, such as clip 116, the so-formed condiment holder may be utilized in a substantially identical manner to either of the condiment holders 10 or 110.

In other examples, (not shown), condiment holder 218 may include a first aperture 218g that is substantially identical to aperture 18g and another differently-configured second aperture. The differently-configured second aperture may be shaped to include sets of opposing surfaces that hold only one type of condiment container, or two different types of condiment container, or three different types of condiment container, or more than three different types of condiment container. The particular condiment containers that may be received in this second aperture may not be the same as those that can be received in the first aperture 218g.

It will further be understood that the particular arrangement of the two apertures 218g may be other than that illustrated in FIG. 22. For example, one of the apertures 218g may be oriented at right angles to the other aperture 218g; or the two apertures may be oriented at an acute angle relative to each other. Any other desired number or configuration of apertures 218g for receiving condiment containers therein may be utilized in body 214.

The above description relates to a condiment holder that is configured to have a plurality of sets of opposing wall sections defined by an inner perimeter wall, where each set of wall sections is configured to receive one of a plurality of differently-configured condiment containers therein. It will be understood, however, that in one example only one set of opposing wall sections may be defined by the inner perimeter wall and this particular condiment holder will therefore be suitable for receiving a complementary single style or type of condiment container between the opposing wall sections. In another example, two sets of opposing walls sections may be defined by the inner perimeter wall, with the first of the two sets being configured to receive a complementary first configuration of a condiment holder therein and the second of the two sets being configured to receive a complementary second configuration of a condiment holder therein. In another example, three sets of opposing walls sections may be defined by the inner perimeter wall, with the first of the three sets being configured to receive a complementary first configuration of a condiment holder therein, the second of the three sets being configured to receive a complementary second configuration of a condiment holder therein, and the third of the three sets being configured to receive a complementary third configuration of a condiment holder therein. In another example, one or more additional sets of opposing wall sections in addition to the aforementioned three sets may be defined by the inner perimeter wall, with the first of the sets being configured to receive a complementary first configuration of a condiment holder therein, the second of the sets being configured to receive a complementary second configuration of a condiment holder therein, the third of the sets being configured to receive a complementary third configuration of a condiment holder therein, and the one or more additional sets being configured to receive a complementary one or more configurations of a condiment holder therein.

Figure 23:
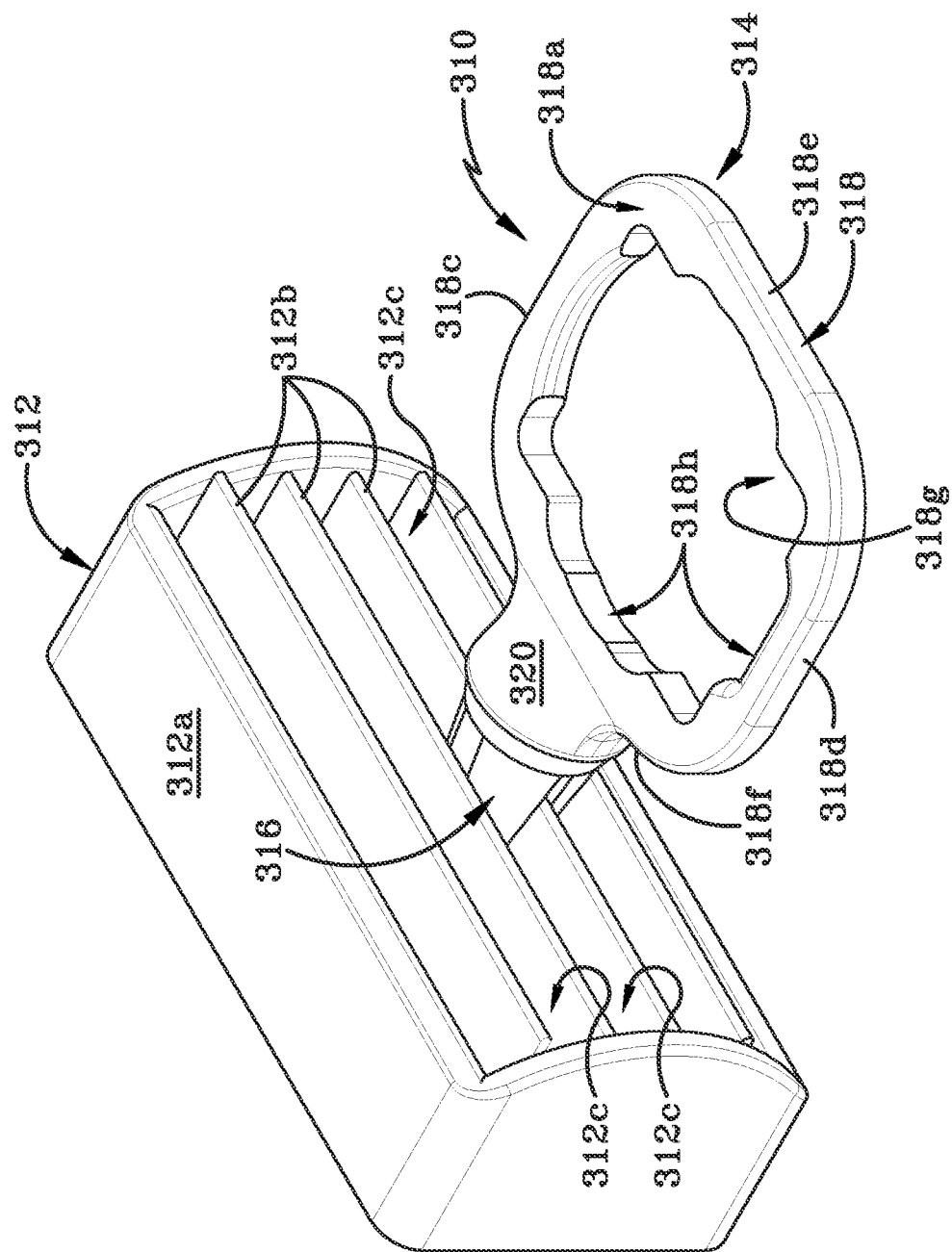
FIG. 23 is a perspective view of a fourth embodiment of a condiment holder in accordance with the present invention shown engaged with a vehicle air vent.

Referring to FIGS. 23-45, a fourth embodiment of a condiment holder in accordance with the present invention is disclosed herein. The condiment holder is generally indicated in FIGS. 23-45 by the reference number 310. Holder 310 is illustrated in FIG. 23 engaged with a vehicle air vent 312. Air vent 312 comprises a housing 312a in which are mounted a plurality of spaced apart fins 312b. Adjacent fins 312b are separated from each other by a gap 312c. In particular, holder 310 is shown engaged with one of the fins 312b of air vent 312.

Holder 310 is comprised of a body member 314 and a clip member 316. Clip member 316 is utilized to selectively secure body member 314 to any selected fin 312b of air vent 312. In other instances, clip member 316 may be utilized to selectively secure body member 314 to at least one fin 312b but may be utilized to engage more than one fin 312b.

Figure 24:
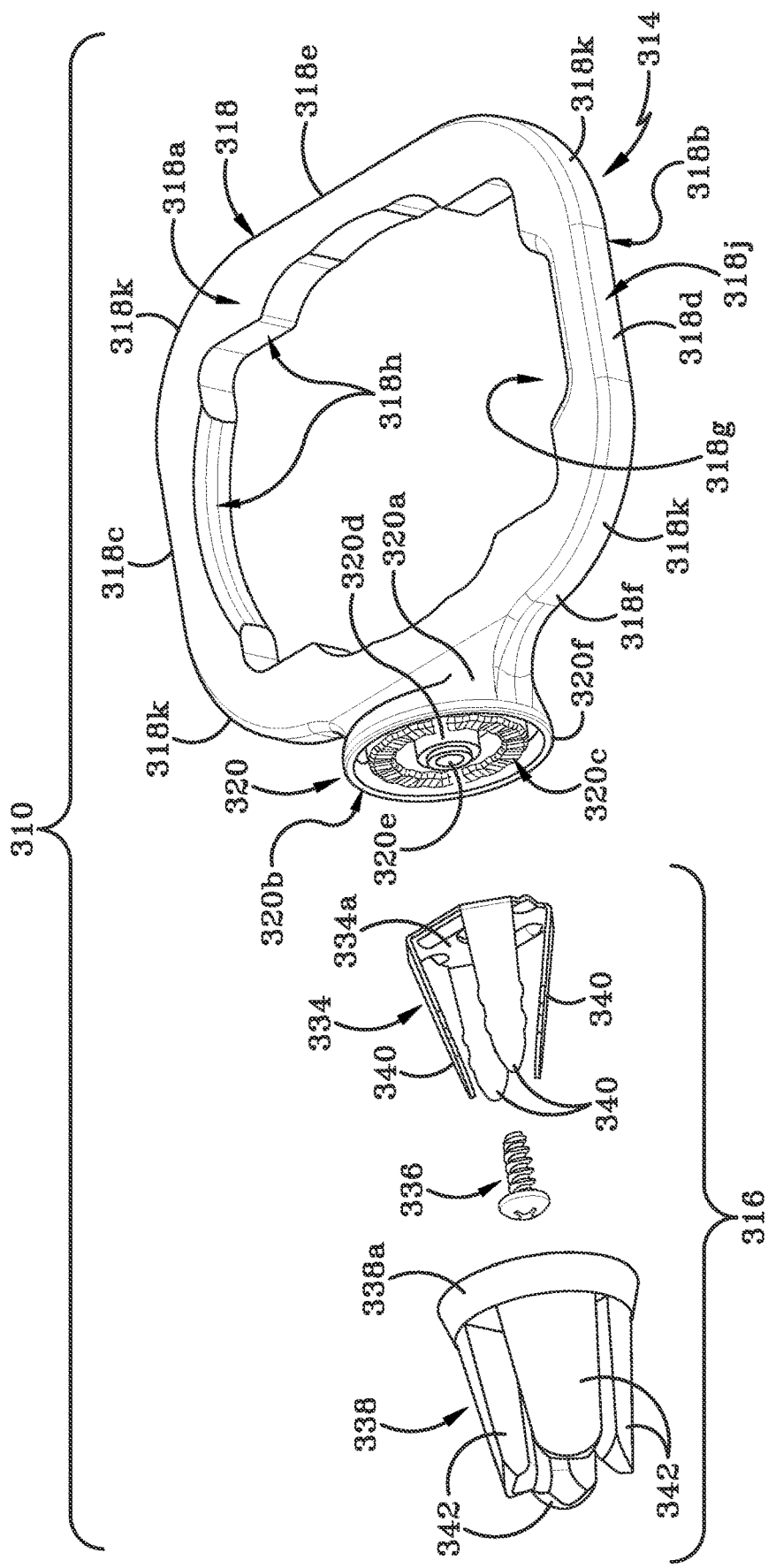
FIG. 24 is an exploded perspective view of the condiment holder of FIG. 23.

FIG. 24 shows holder 310 in an exploded rear perspective view. Body member 314 comprises a planar member 318 and a neck 320 that extends rearwardly outwardly from planar member 318. Planar member 318 and neck 320 may be molded from any suitable plastic material as a monolithic unitary component. Planar member 318 is generally rectangular in shape when viewed from above (FIG. 25) and has a top surface 318a, a bottom surface 318b (FIG. 26), a left side 318c, a right side 318d, a front end 318e and a rear end 318f. An aperture 318g is defined by an interior peripheral wall 318h of planar member 318. Aperture 318g is configured to receive any one of a plurality of differently shaped condiments container therein. (It will be understood that only one of these condiment holders will be engaged in aperture 318g at any one time.) In particular, aperture 318g is configured to be able to receive at least three differently configured condiment containers therein. Specifically, peripheral wall 318h and therefore aperture 318g, is configured so that at least four differently shaped condiment containers are able to be selectively, individually engaged with planar member 318. The particulars of the different condiment holders will be discussed later herein. The ability to engage a plurality of differently configured condiment containers in aperture 318g is made possible by the specific shape of the peripheral wall 318h that bounds and defines aperture 318g. The specifics of peripheral wall 318h will be discussed in detail later herein.

Figure 26:
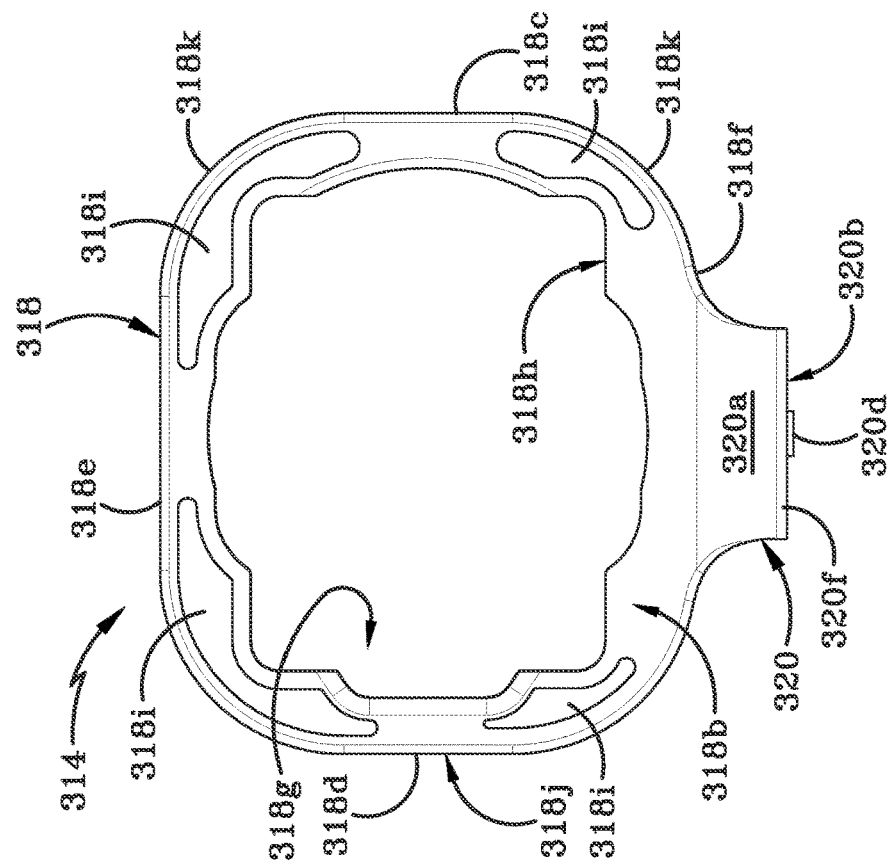
FIG. 26 is a bottom plan view thereof.

FIG. 26 shows that bottom surface 318b of planar member 318 includes reliefs 318i that are formed during plastic molding or injection. The exterior surfaces of left side wall 318c, front end 318e, right side wall 318d and rear wall 318f form an exterior perimeter wall 318j (FIG. 24) of planar member 318. FIG. 24 also shows that the rectangularly shaped planar member 318 has rounded corners that are indicated by the reference character 318k. Rounded corners 318k help to ensure that condiment holder 310 does not present any sharp edges that could cause a minor injury to a consumer during use.

Figure 25:
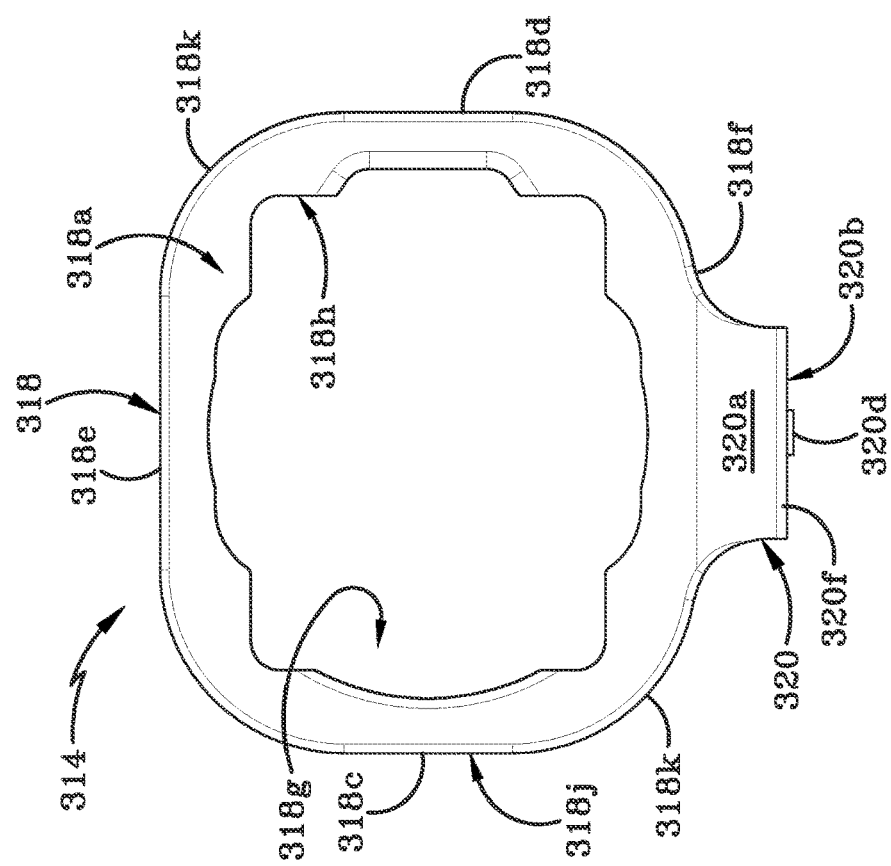
FIG. 25 is a top plan view of the body of the condiment holder shown on its own.
Figure 29:
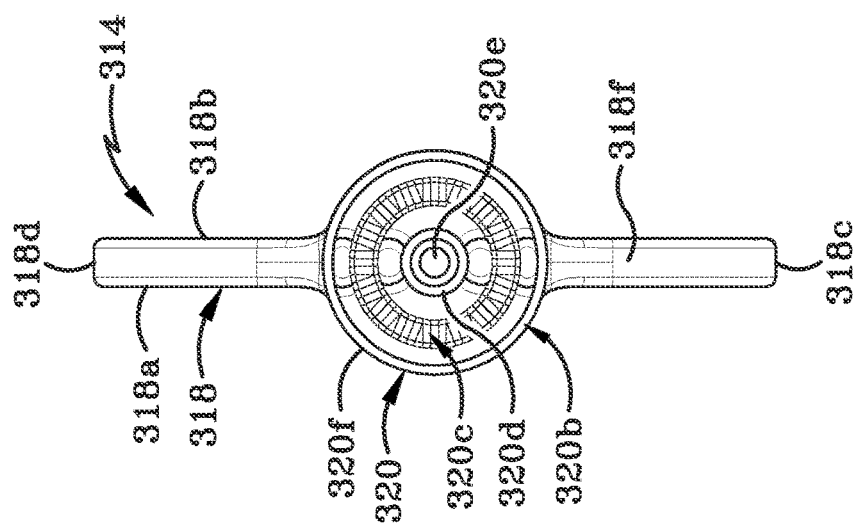
FIG. 29 is a rear elevation view thereof.
Figure 28:
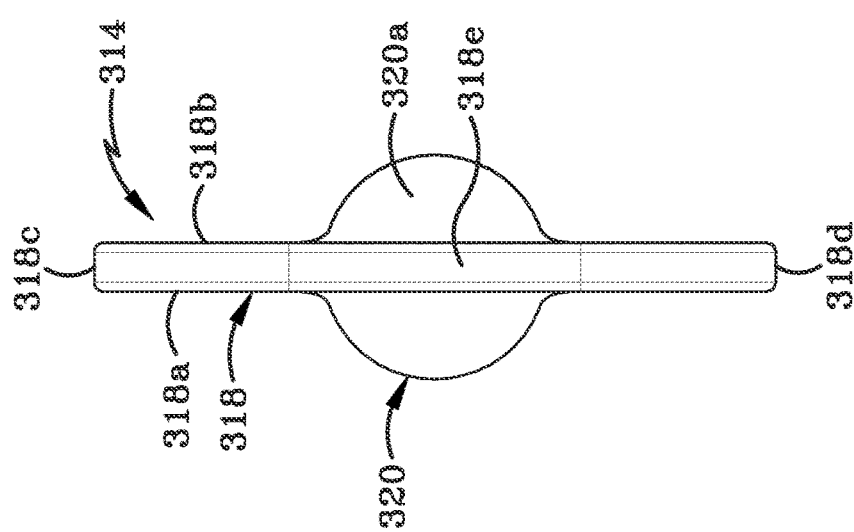
FIG. 28 is a front elevation view of the body of the condiment holder.
Figure 27:
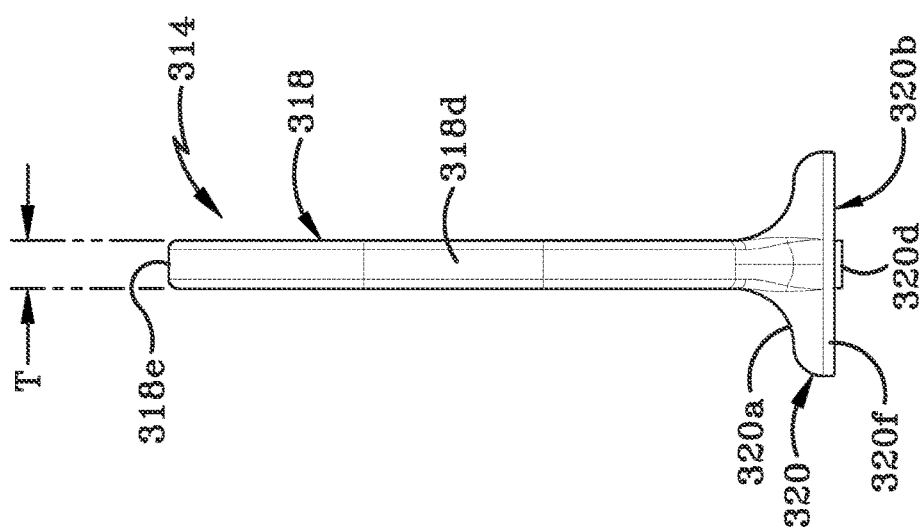
FIG. 27 is a right side elevation view of the body of the condiment holder (the unshown left side elevation view is a mirror image thereof)
Figure 30:
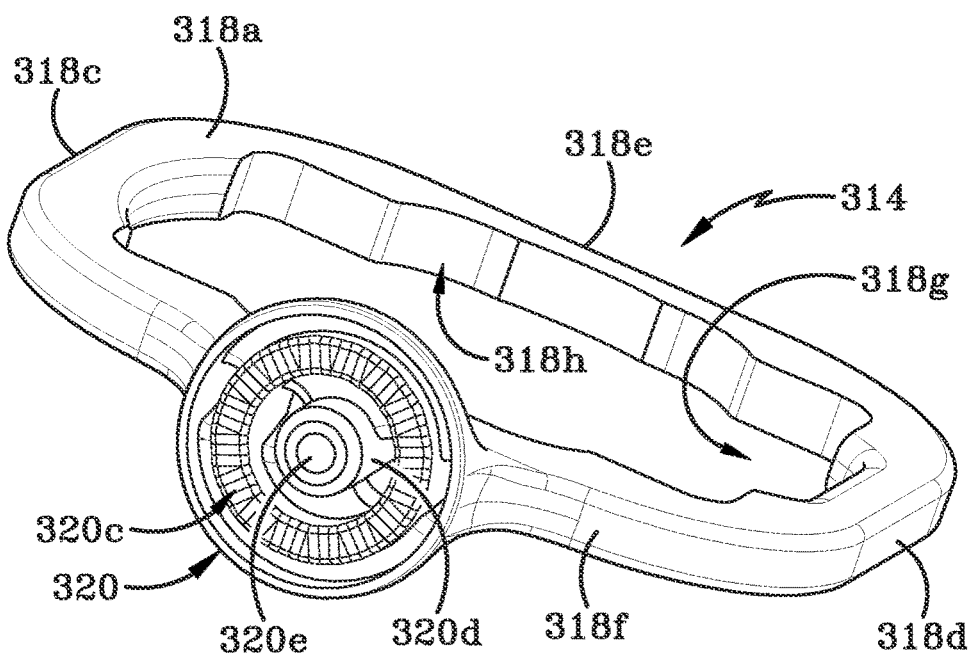
FIG. 30 is a rear perspective view thereof.
Figure 31:
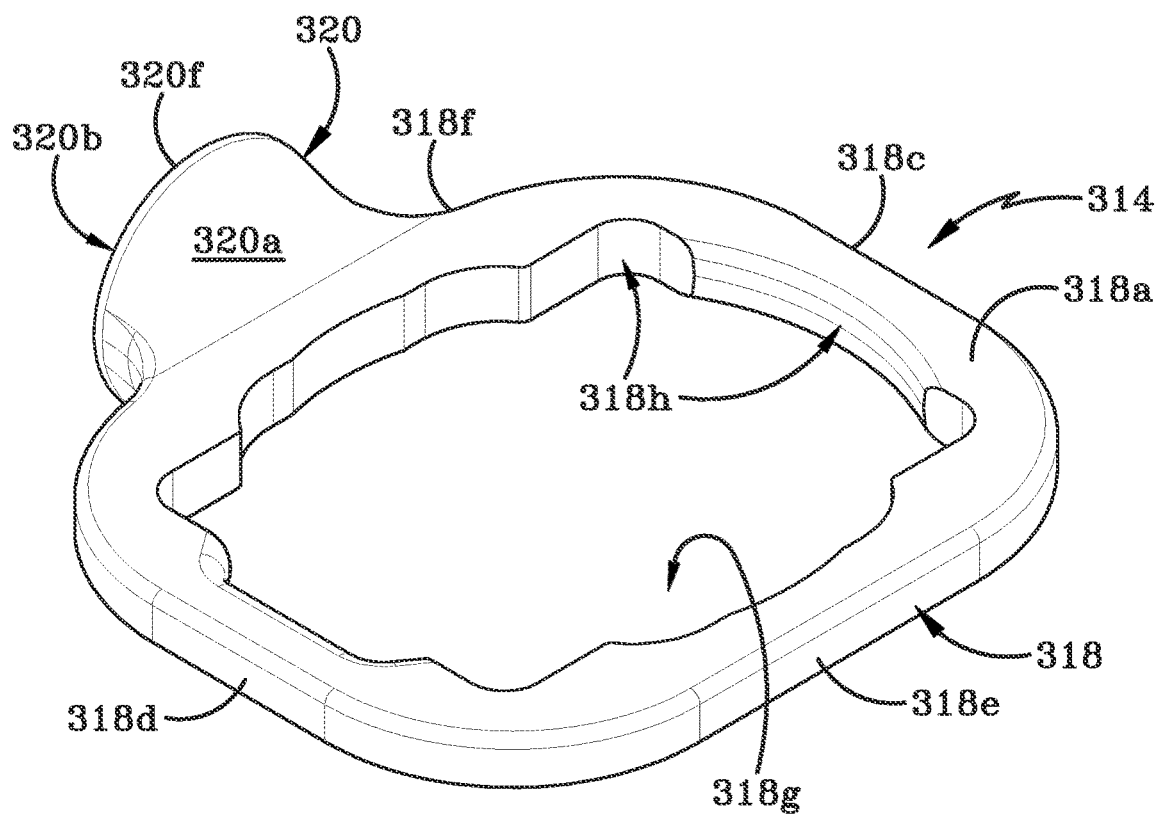
FIG. 31 is a front perspective view thereof.
Figure 32:
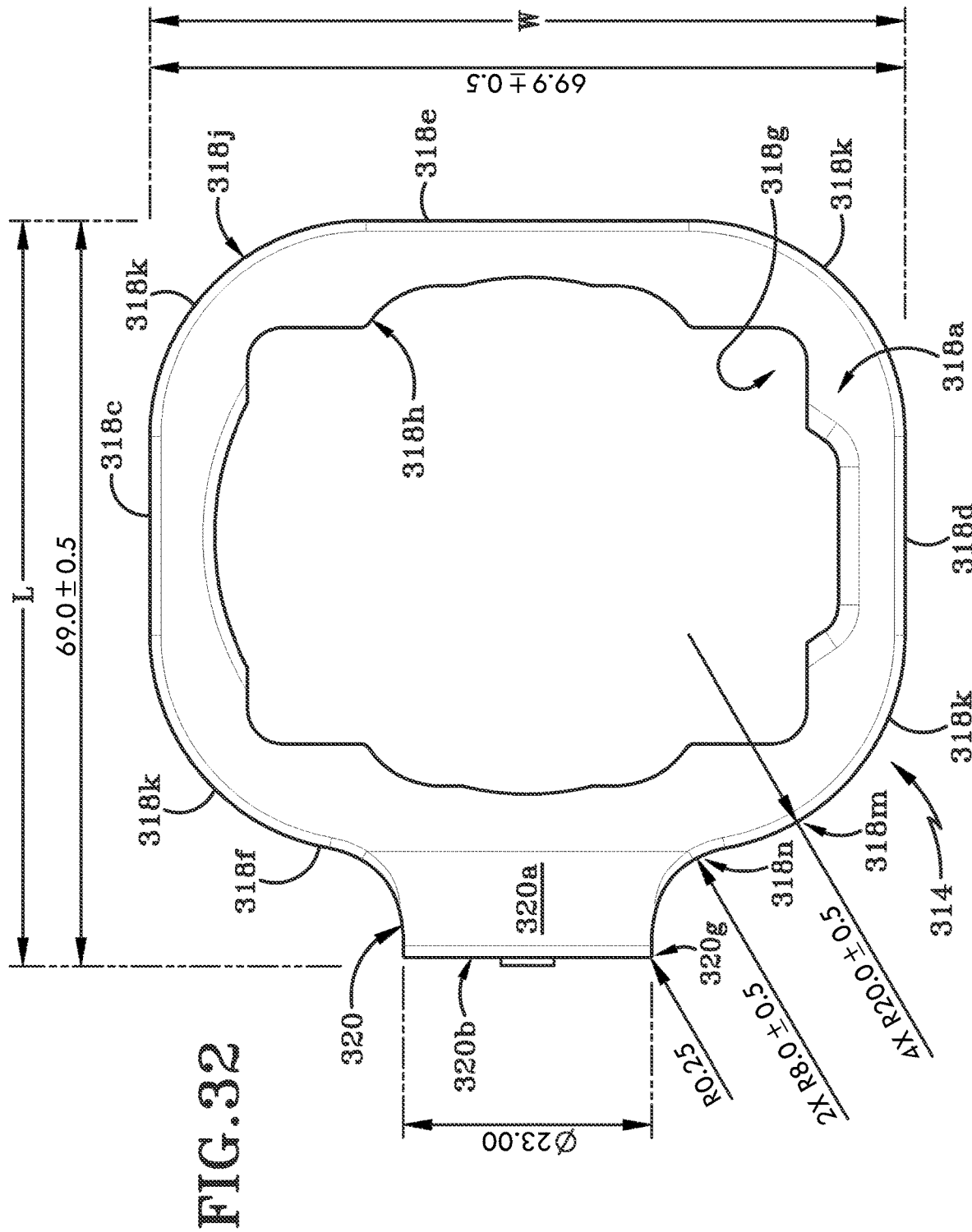
FIG. 32 is a top plan view of the body of the condiment holder showing the dimensions thereof.

Neck 320, that extends rearwardly from rear end 318f of planar member 318, includes a circumferential wall 320a (FIGS. 24 and 31) which originates in rear end 318f of planar member 318 and terminates in a rear end 320b. As best seen in FIGS. 29 and 30, an annular ring 320c and a sleeve 320d are molded into rear end 320b of neck 320. Annular ring 320c circumscribes sleeve 320d. Sleeve 320d defines a bore 320e therein. An annular rim 320f is provided around an exterior surface of neck 320 adjacent rear end 320b. FIG. 25 shows that a portion of sleeve 320d extends outwardly beyond rim 320f.

Referring to FIGS. 24-34, planar member 318 may be of a substantially constant thickness "T" (FIG. 27) where that thickness is measured between top surface 318a and bottom surface 318b. Body member 314 is of a length "L" (FIG. 32) measured from front end 318e of planar member 318 rear end 320b of neck 320. Length "L" is from about 68.5 mm up to about 69.5 mm and preferably is about 69.0 mm. In other words, length "L" is from about 2.69 inches up to about 2.74 inches long; and preferably is about 2.71 inches or 2⅝ inches long.

Body member 314 is of a width "W" (FIG. 32) measured from left side 318c to right side 318d of planar member 318. Width "W" is from about 69.4 mm up to about 70.4 mm wide; and preferably is about 69.9 mm wide. In other words, width "W" is from about 2.73 inches up to about 2.77 inches, and preferably is about 2.75 inches (about 2⅝ inches). The dimensions of body member 314 are therefore generally around 2⅝ inches long by 2⅝ inches wide. Body member 314 is not of a size sufficient to permit condiment holder 310 to rest on an upper rim of a vehicle cup-holder. In order for condiment holder 310 to be of a sufficient size to be supported by the upper rim of a vehicle cup-holder, the condiment holder 310 would have to be fabricated in a larger size. In particular, the condiment holder 310 would have to be between 3.5 inches and 4.5 inches in diameter or from at least 3.5 by 3.5 inches long and wide up to about 4.5 by 4.5 inches long and wide. As indicated above, condiment holder 310 is not this large size but is, instead, smaller than the size required to be supported by on a rim of a cup-holder. If condiment holder 310 were placed onto a cup-holder rim, holder 310 would simply drop into the interior of the cup-holder. Clip 316 extends outwardly from body member 314 and therefore increases the overall size of condiment holder 310. Resting clip 316 on a first part of a rim of a cup-holder and resting the body member 314 on a second part of the rim of a cup-holder might enable condiment holder 310 to be used with the cup-holder. However, utilizing condiment holder 310 in this manner may not provide the most stable way of supporting a condiment container.

As indicated earlier herein, the exterior perimeter wall 318j (FIG. 32) of planar member 318 is comprised of left side 318c, front end 318e, right side 318d and portions of rear end 318f and the rear end 318f transitions into neck 320. The region of exterior perimeter wall 318j extending from each of the rear corners 318k to circumferential wall 320a of neck 320 changes curvature at locations 318m and 318n. The radius of curvature at location 318m is R20.0±0.5 and the radius of curvature at location 318n is R8.0±0.5. The radius of curvature at location 320g on neck is R0.25. Neck 320 has a diameter of about 23.00 mm (i.e., just under 1 inch).

As indicated earlier herein, peripheral wall 318h bounds and defines aperture 318g. Peripheral wall 318h includes a plurality of different sets of wall sections that are selectively configured to engage variously shaped condiment containers, such as those provided by major fast-food restaurant chains. It should be noted that peripheral wall 318h is not configured to substantially conform to the exterior shape of any of the variously shaped condiment containers. Instead, each of the various sets of opposed wall sections discussed hereafter are designed to only contact discrete regions of the exterior shape of one of the plurality of variously shaped condiment containers provided by fast-food chains. This arrangement ensures that more than only one or two shapes of condiment container may be engaged with condiment holder 310.

Figure 33:
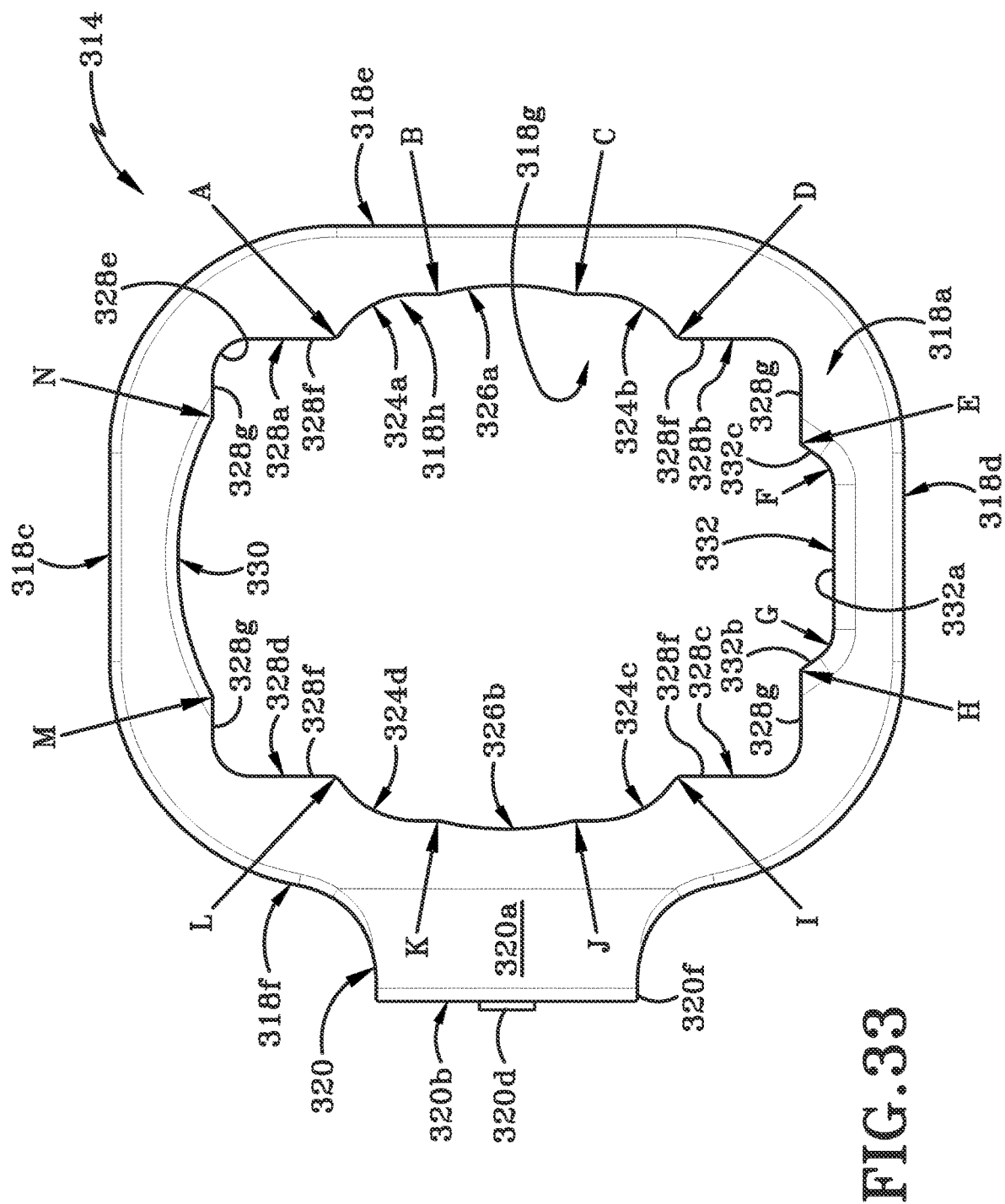
FIG. 33 is a top plan view of the body of the condiment holder in which the various wall sections of the peripheral wall are identified.
Figure 34:
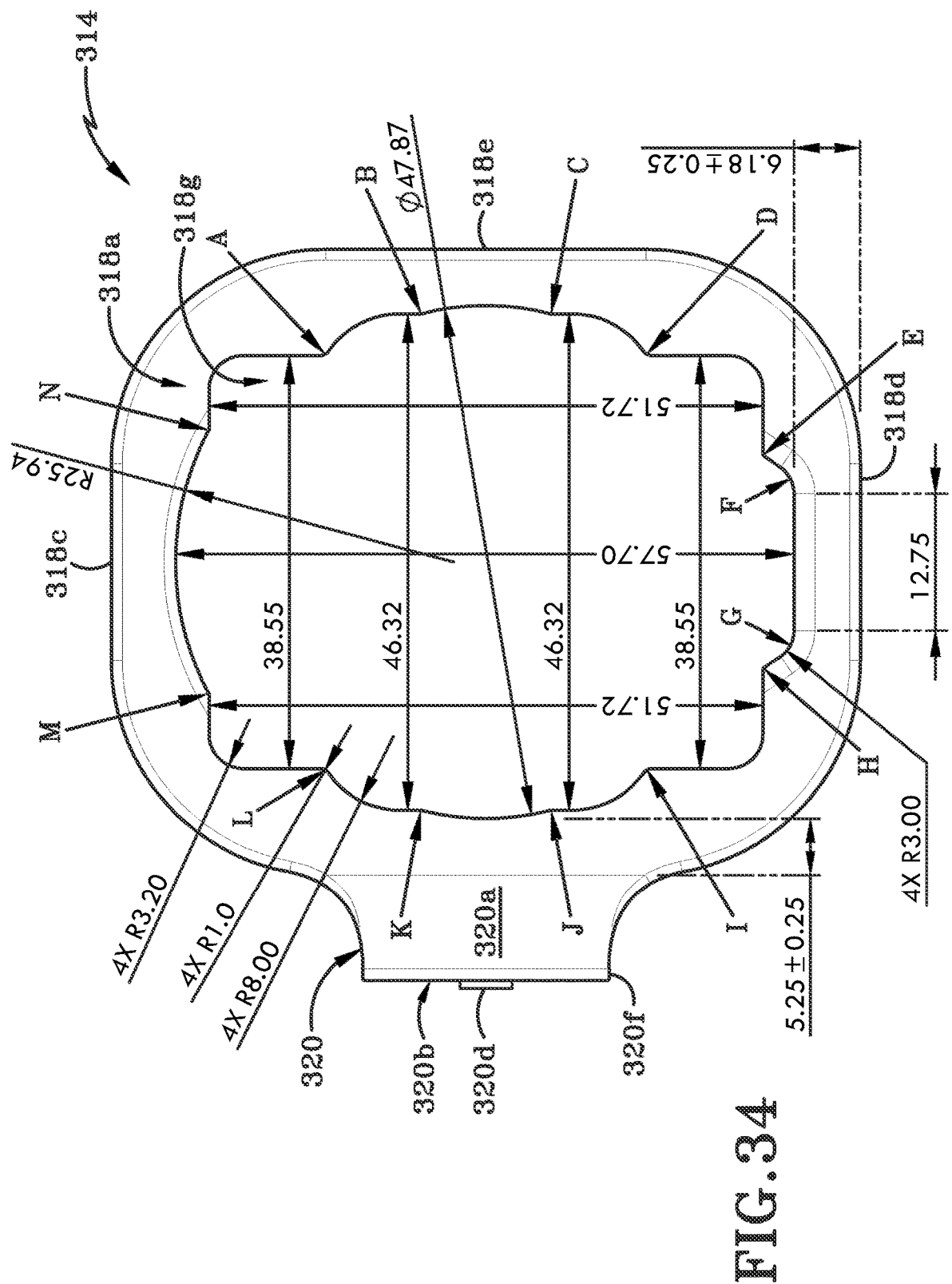
FIG. 34 is a top plan view of the body of the condiment holder showing the dimensions and radii of curvature of the various wall sections of the peripheral wall that defines the aperture in the body.

FIGS. 33 and 34 show body member 314 enlarged for easier reference. FIG. 33 is provided to show that the peripheral wall 318*h* changes direction and curvature in a number of locations. A different letter of the alphabet identifies each of these locations. FIG. 33 identifies fourteen changes in direction in peripheral wall 318*h* using the letters "A" through "N". FIG. 33 also identifies a plurality of different sets of wall sections that together form peripheral wall 318*h*.

A set of first wall sections, having a radius of curvature of R8.00, is identified in FIG. 33 by the reference numbers 324*a*, 324*b*, 324*c*, and 324*d*. First wall section 324*a* extends between location "A" and location "B" on peripheral wall 318*h*. First wall section 324*b* extends between location "C" and location "D" on peripheral wall 318*h*. First wall section 324*c* extends between location "I" and location "J" on peripheral wall 318*h*. First wall section 324*d* extends between location "K" and location "L" on peripheral wall 318*h*. First and second wall sections 324*a*, 324*b* are located proximate front end 318*e* of body member 314. Third and fourth wall sections 324*c*, 324*d* are located proximate rear end 318*f* of body member 314. First and second wall sections 324*a*, 324*b* are spaced laterally relative to each other and third and fourth wall sections 324*c*, 324*d* are spaced laterally from each other. First wall section 324*a* is located longitudinally a distance away from and opposite fourth wall section 324*d*.

FIG. 34 shows the dimensions of various parts of planar member 318. Second wall section 324*b* is located a distance longitudinally away from and opposite third wall section 324*c*. Locations "A" and "L" are spaced longitudinally a distance of about 38.55 mm (about 1½ inches) from each other and locations "D" and "I" are also spaced longitudinally a distance of about 38.55 mm (about 1½ inches) from each other. Locations "B" and "K" are spaced longitudinally a distance of about 46.32 mm (about 1⅞ inches) from each other and locations ""C" and "J" are spaced longitudinally a distance of about 46.32 mm (about 1⅞ inches) from each other.

A set of second wall sections 326*a*, 326*b* is provided as part of peripheral wall 318*h*. Second wall section 326*a* originates at location "B" and terminates at location "C". In other words, second wall section 326*a* is located between first wall section 324*a* and first wall section 324*b*. Second wall section 326*a* has a radius of curvature that differs from the radius of curvature of first wall sections 324*a* to 324*d*. Second wall section 326*a* and second wall section 326*b* are sections of the circumference of a circle having a diameter of 47.87 mm (i.e., Ø 47.87 mm or between 1¾ and 2 inches). Second wall section 326*b* originates at location "J" and terminates at location "K". In other words, second wall section 326*b* is located between first wall section 324*c* and first wall section 324*d*. Second wall section 326*a* is spaced a distance longitudinally from second wall section 326*b* and is opposed to second wall section 326*b*.

A set of third wall sections 328*a*, 328*b*, 328*c*, and 328*d* is provided as part of peripheral wall 318*h*. Third wall section 328*a* originates at location "N" and terminates at location "A". First wall section 324*a* is located between third wall section 328*a* and second wall section 326*a*. Third wall section 328*b* originates at location "D" and terminates at location "E". First wall section 324*b* is located between third wall section 328*b* and second wall section 326*a*. Third wall section 328*c* originates at location "H" and terminates at location "I". First wall section 324*c* is located between third wall section 328*c* and second wall section 326*b*. Third wall section 328*d* originates at location "L" and terminates at location "M". First wall section 324*d* is located between third wall section 328*d* and second wall section 326*b*. Each of the third wall sections 328*a*-328*d* includes a curved central region 328*e* and two straight regions 328*f* and 328*g* that extend outwardly from the curved central region. The straight regions 328*f* and 328*g* are oriented generally at right angles relative to each other. The curved central region 328*e* has a radius of curvature of R3.20. Third section 328*a* is spaced laterally from third section 328*b* and longitudinally from third section 328*d*. Third section 328*b* is spaced laterally from third section 328*a* and longitudinally from third section 328*c*. Third section 328*c* and third section 328*d* are spaced laterally from each other. The straight regions 328*f*, 328*f* of third section 328*a* and third section 328*d* are located a longitudinal distance of about 38.55 mm (about 1½ inches) away from each other. (Similarly, the straight sections 328*f*, 328*f* of third sections 328*b* and 328*c* are located a longitudinal distance of about 38.55 mm (about 1½ inches) away from each other.) The straight sections 328*g* of third section 328*a* and third section 328*b* are located a lateral distance of about 51.72 mm (about 2 inches) away from each other. (Similarly, the straight sections 328*g*, 328*g* of third sections 328*c* and 328*d* are located a lateral distance of about 51.72 mm (about 2 inches) away from each other.)

Peripheral wall 318*h* also includes a fourth wall section 330 that originates at location "M" and terminates at location "N". Fourth wall section 330 is located between third wall section 328*a* and third wall section 328*d*. Fourth wall section 330 has a radius of curvature of about R25.94.

Peripheral wall 318*h* also includes a fifth wall section 332 that originates at location "E" and terminates at location "H" and is located a spaced distance laterally from and opposite to fourth wall section 330. Fifth wall section 332 includes a straight region 332*a* that extends between location "G" and location "F" and has a length of about 12.75 mm (about ½ inch). Fifth wall section 332 includes a first curved region 332*b* and a second curved region 332*c* that are located on opposite sides of straight region 332*a* from each other. First and second curved regions 332*b*, 332*c* each have a radius of curvature of R3.00. First curved region 332*b* is located between third wall section 328*c* and straight region 332*a*. Second curved region 332*c* is located between third wall section 328*b* and straight region 332*a*. Straight region 332*a* is located about 57.70 mm (about 2¼ inches) laterally away from a midpoint of fourth wall section 330. The midpoint is located midway between location "F" and location "G".

A midpoint of second wall section 326*b* is located from about 5.0 mm up to about 5.5 mm (about ¼ inch) away from a first region of neck 320 (or rear end 318*f* of body member 314). (The midpoint of second wall section 326*b* is located midway between location "J" and location "K".) Similarly, a midpoint of second wall section 326*a* is located from about 5.0 mm up to about 5.5 mm (about ¼ inch) away from front end 318*e* of body member 314. (The midpoint of second wall section 326*a* is located midway between location "B" and location "C".) The interior surface of straight region 332*a* of fifth wall section 332 is about 5.83 mm up to about 6.43 mm (about ¼ inch) from right side 318*d* of body member 314. Similarly, the midpoint of fourth wall section 330 is located about 5.83 mm up to about 6.43 mm (about ¼ inch) from left side 318*c* of body member 314. (The midpoint of fourth wall section 330 is located midway between location "M" and location "N".)

In accordance with an aspect of the present disclosure, peripheral wall 318h is not oriented exactly at ninety degrees relative to top surface 318a. Instead, peripheral wall 318h may be slightly offset from ninety degrees. In particular, peripheral wall 318h may be angled so that the interior perimeter of peripheral wall 318h at top surface 318a is either slightly larger or slightly smaller than the interior perimeter of peripheral wall 318h at bottom surface 318b. The difference between the interior perimeter of peripheral wall 318h at top surface 318a relative to the interior perimeter of peripheral wall 318h at bottom surface 318b is sufficient to enable peripheral wall 318h capture to and retain a condiment container relatively tightly within aperture 318g.

Figure 39:
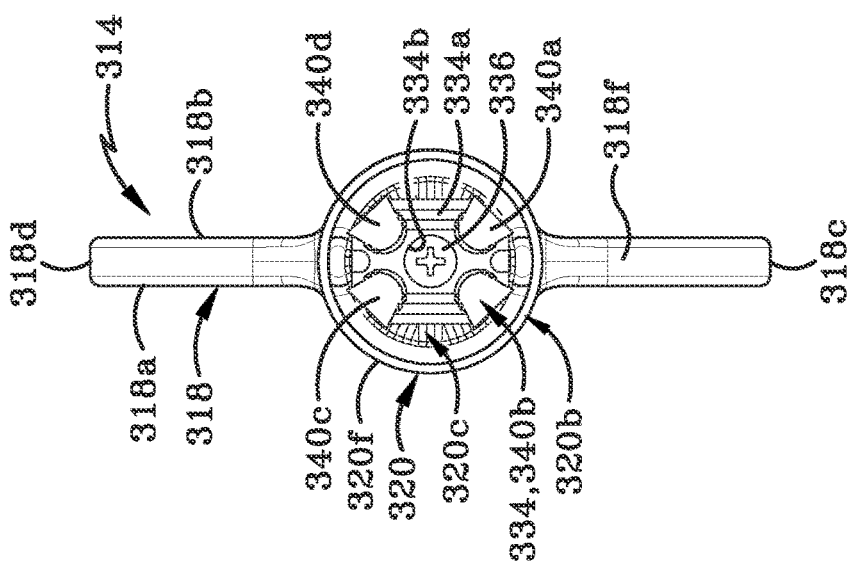
FIG. 39 is a rear elevation view thereof.
Figure 38:
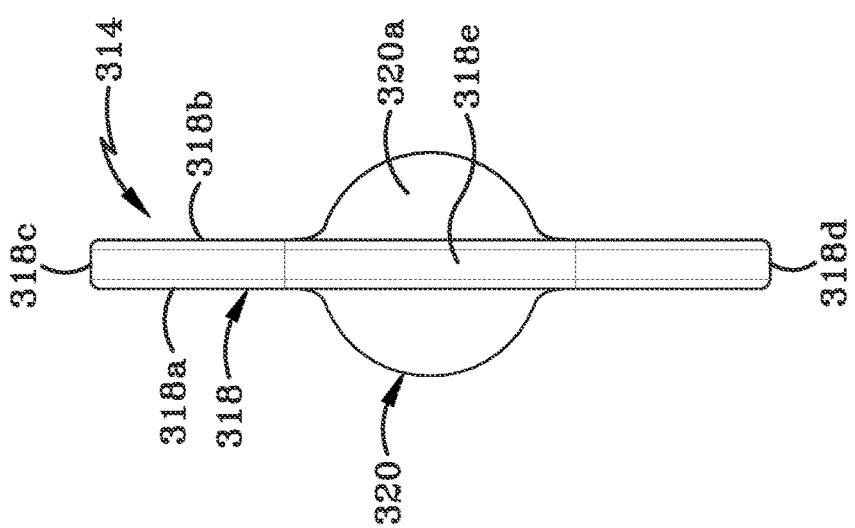
FIG. 38 is a front elevation view of the condiment holder.
Figure 37:
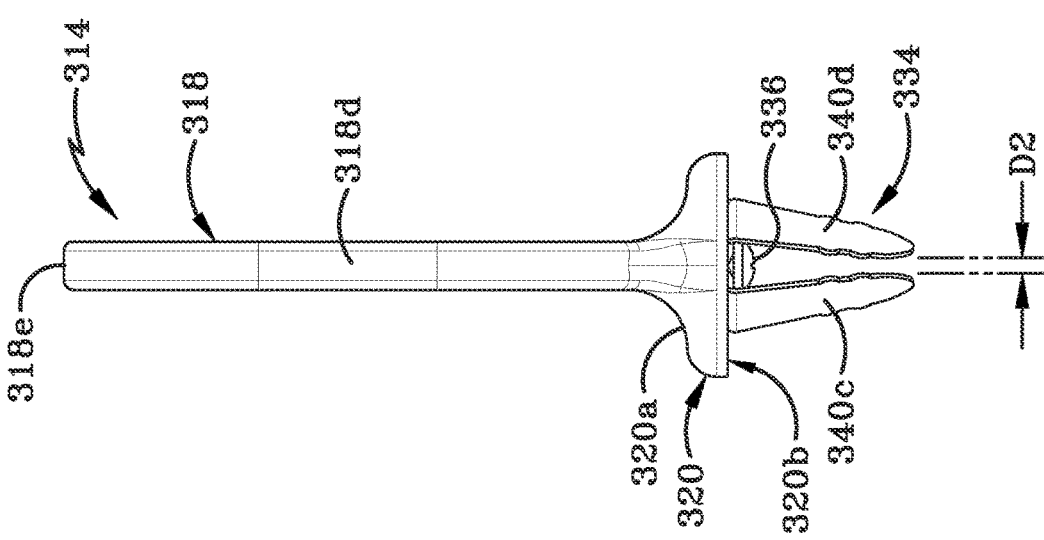
FIG. 37 is a right side elevation view of the condiment holder (the unshown left side elevation view is a mirror image thereof)
Figure 41:
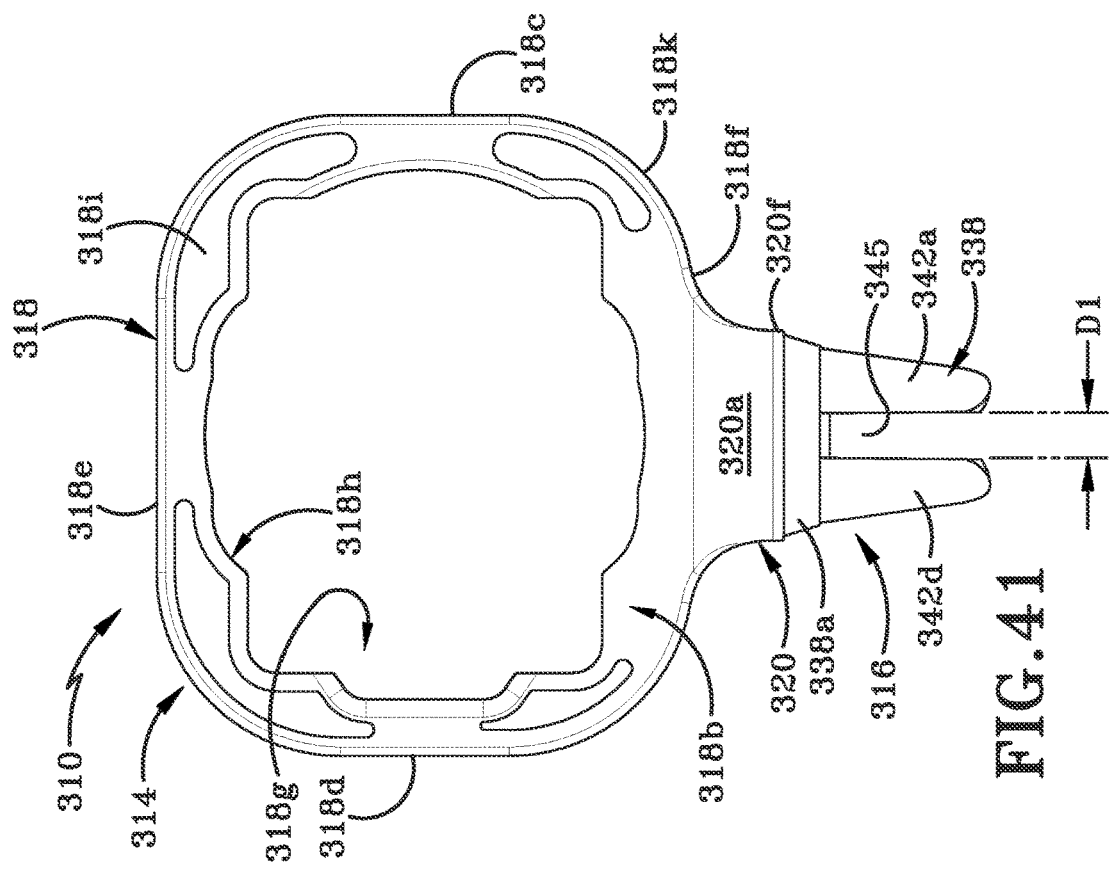
FIG. 41 is a bottom plan view thereof.
Figure 40:
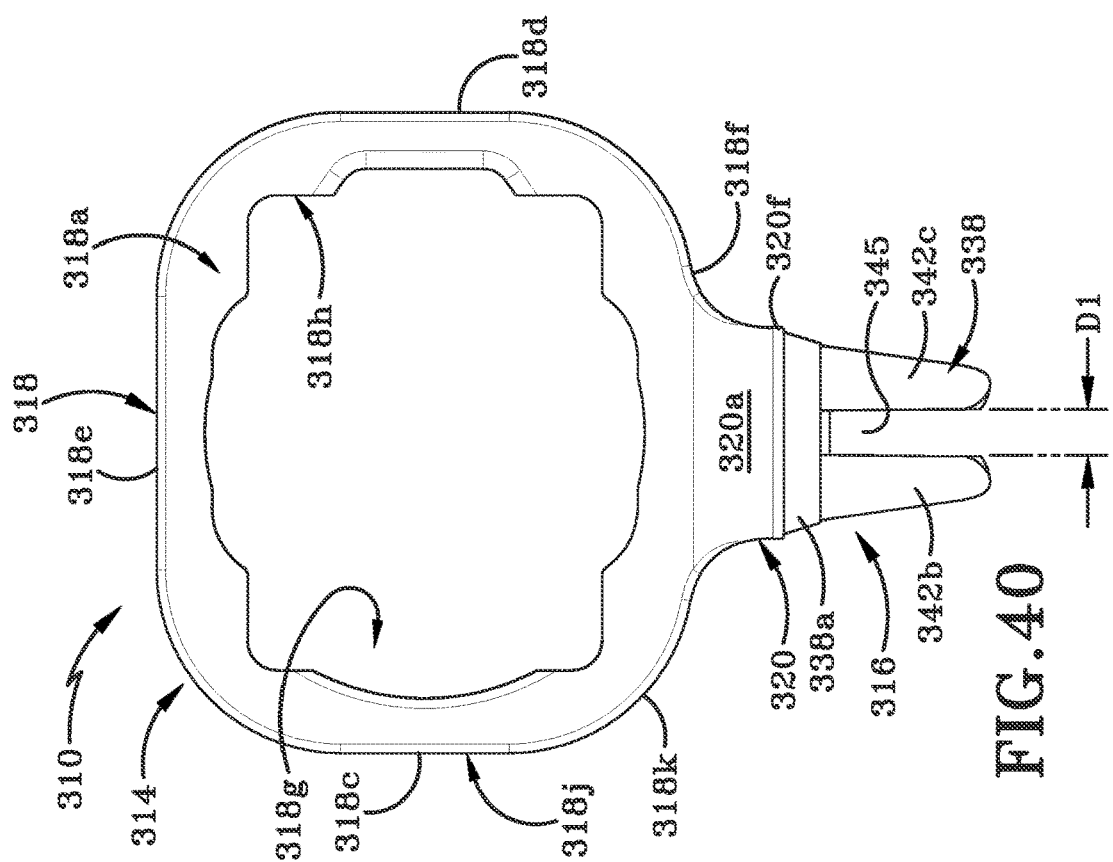
FIG. 40 is a top plan view of the condiment holder of FIG. 23.
Figure 44:
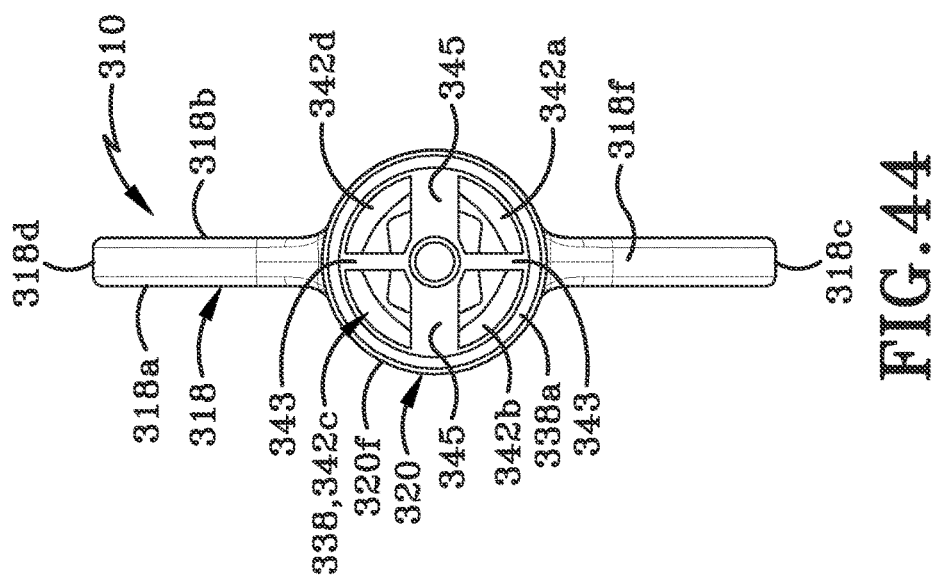
FIG. 44 is a rear elevation view thereof.
Figure 43:
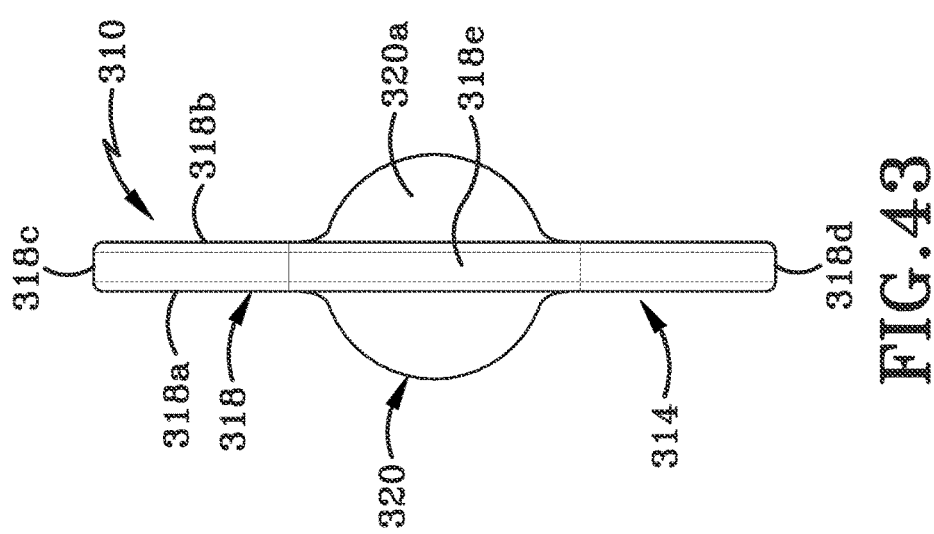
FIG. 43 is a front elevation view of the condiment holder.
Figure 42:
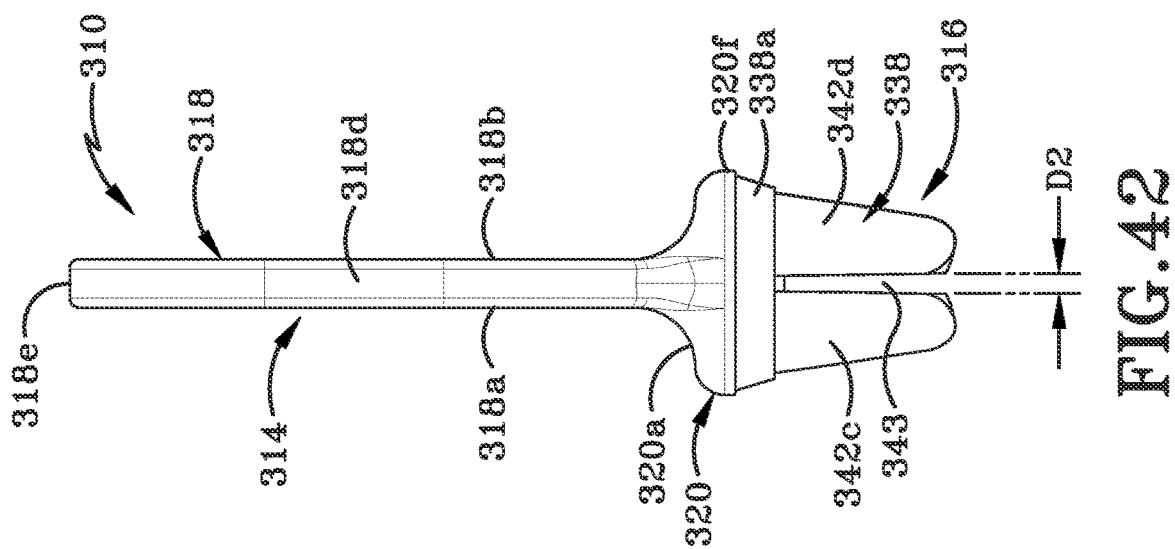
FIG. 42 is a right side elevation view of the condiment holder (the unshown left side elevation view being a mirror image thereof)
Figure 45:
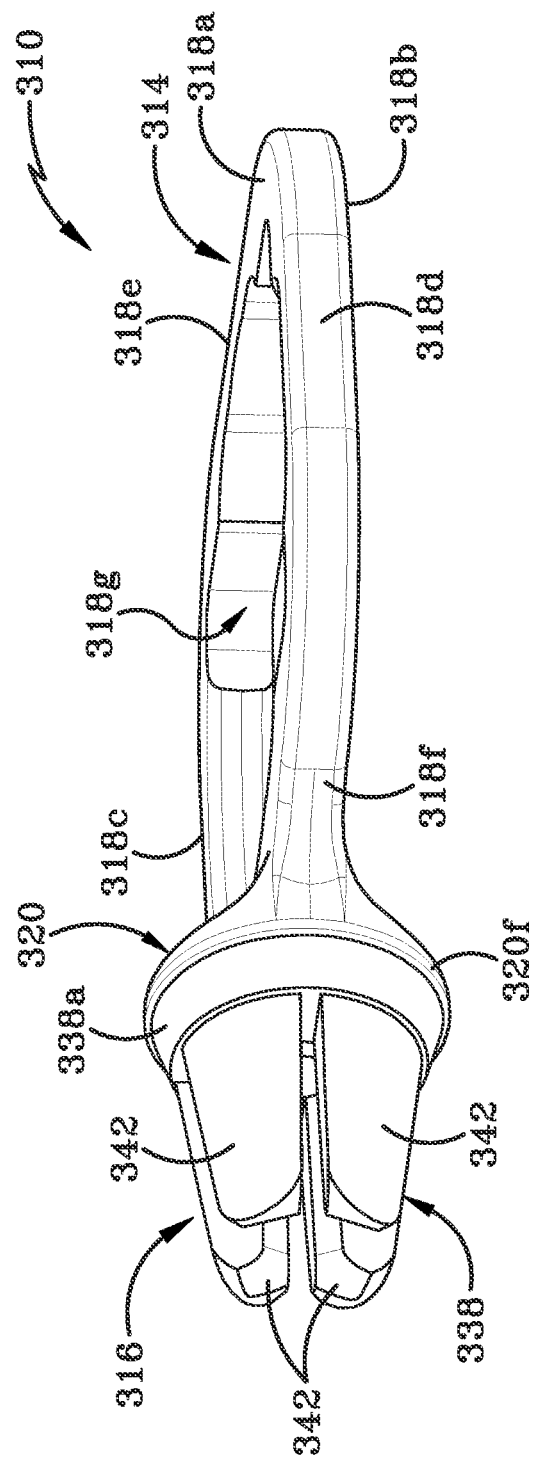
FIG. 45 is a rear perspective view thereof.

As indicated earlier herein, condiment holder 310 includes clip 316 that is used to secure body member 314 to air vent 312 in a vehicle. FIGS. 24 and 34-39 disclose details of clip 316. Clip 316 comprises a base 334, a fastener 336 and a rubber cover 338. Base 334 includes a base plate 334a and a plurality of tines 340 that extend outwardly from base plate 334a. Base plate 334a is shaped and sized to be engaged with rear end 320b of neck 320. In particular, base plate 334a is positioned over annular ring 320c on neck 320 and defines an aperture 334b (FIG. 39) therein that is sized to receive a portion of sleeve 320d therein thereby enabling fastener 336 to be inserted into bore 320e to secure base plate 334a to neck 320. FIG. 39 shows base plate 334a positioned adjacent the rear end 320b of neck 320 with fastener 336 threadably securing base plate 334a to neck 320.

As is evident from FIGS. 24, 34-37 and 39, the tines 340 extend outwardly from base plate 334a. Tines 340 include a first tine 340a, a second tine 340b, a third tine 340c, and a fourth tine 340d. Each tine 340 originates in base plate 334a and terminates in a free end remote from base plate 334a. Each tine 340 tapers in width from base plate 334a to the free end of the respective tine. Adjacent tines, such as tine 340a and 340b, for example, or 340b and 340c, are positioned on base plate 334a in such a way that they are angled relative to each other. Tines 340 also angle slightly inwardly moving away from base plate 334a and towards a center point located intermediate the free ends of the four tines. Tines 340a and 340c are located diametrically opposite each other and tines 340b and 340d are located diametrically opposite each other.

As is evident from FIGS. 34-37, tines 340a and 340d are laterally spaced from each other and are located a distance "D1" apart from each other at their free ends. Tines 340b and 340c are also laterally spaced from each other and are located a distance "D1" apart from each other at their free ends. Tines 340c and 340d are spaced a distance "D2" apart from each other at their free ends and it will be understood that tines 340a and 340b are similarly located a distance "D2" apart from each other at their free ends. "D1" is greater than "D2". It should be noted that parts of clip 316 may be rotated so that condiment holder 310 may be engaged with vertically oriented air vent fins. Additionally, spaces "D1" and "D2" are provided to accept thicker fins or thinner fins of different air vents 312 therein or to receive one or more fins therein. Clip 316 may be rotated so that condiment holder 310 can receive a thicker air vent fin in spaces "D1" or can receive a thinner air vent fin in spaces "D2" or can receive more than one fin therein.

Rubber cover 338 comprises an annular base 338a that is sized and shaped to be complementary to annular rim 320f (FIG. 34) provided at rear end 320b of neck 320. Four tapered sleeves 342 (i.e., sleeves 342a, 342b, 342c, 342d) extend outwardly from annular base 338a. Sleeves 342 are molded such that they each include a hollow passageway shaped and sized to receive one of the metal tines 340 of base 334 therein. Sleeves 342a-342d are positioned relative to each other in a similar manner to the positioning and orientation of tines 340a-340d. Sleeves 342a-342d therefore are oriented in such a way that they angle inwardly toward each other so that their terminal ends are closer to each other than are the regions of the sleeves 342a-342d that connect to annular base 338a. As is evident from FIGS. 40-42, the spacing between sleeves 342b and 342c is about equal to distance "D1" between tines 340b and 340c. Similarly, the spacing between sleeves 342a and 342d is about equal to the distance "D1" between tines 340a and 340d. The spacing between sleeves 342c and 342d is about equal to the distance "D2" between tines 340c and 340d and the spacing between sleeves 342a and 342b is also about equal to the distance "D2" between tines 340a and 40b. It should be noted that when condiment holder 310 is engaged on air vent 312, the fin 312b of air vent 312 is received in the gaps between sleeves 342a and 342b and between sleeves 342c and 342d. In other words, the fin 312b is received in the spaces that are "D2" in size. The spaces into which fin 312b is received is identified in FIGS. 42 and 44 by the reference character 343. The spaces 345 (FIGS. 40 and 44) are provided to allow the sleeves 342 to flex as fin 312b is engaged.

Figure 46:
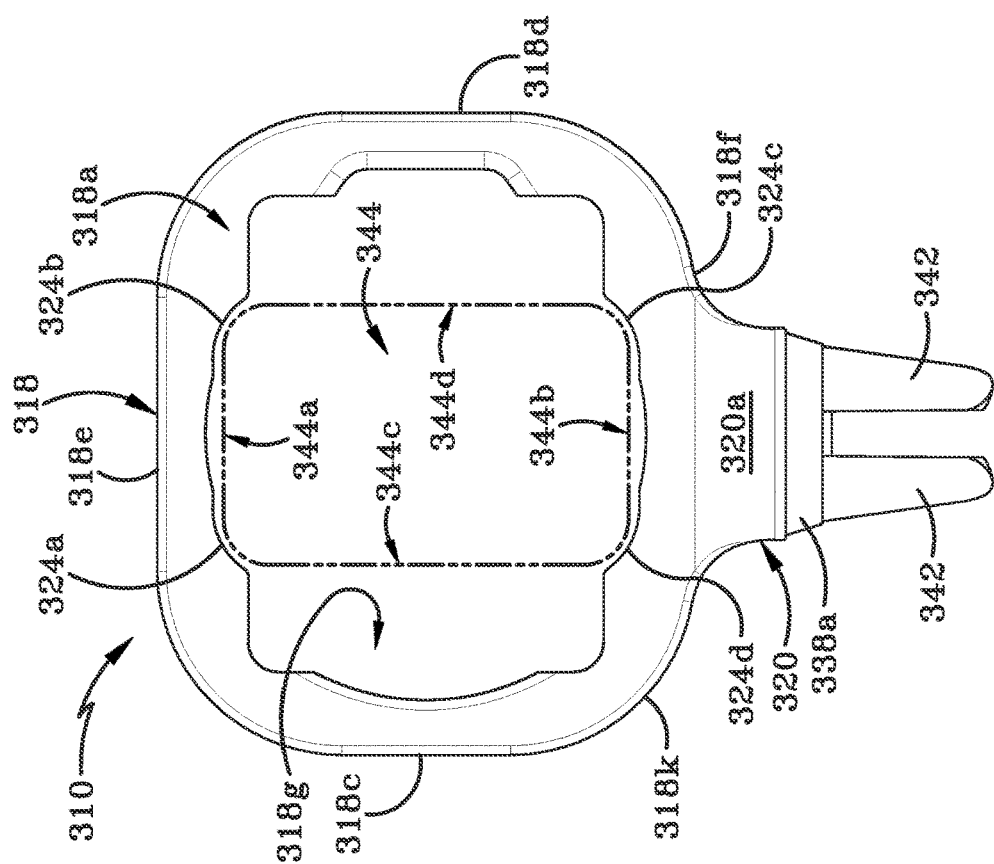
FIG. 46 is a top plan view of the condiment holder with a dashed outline of a portion of a first condiment container being engaged therewith.
Figure 51:
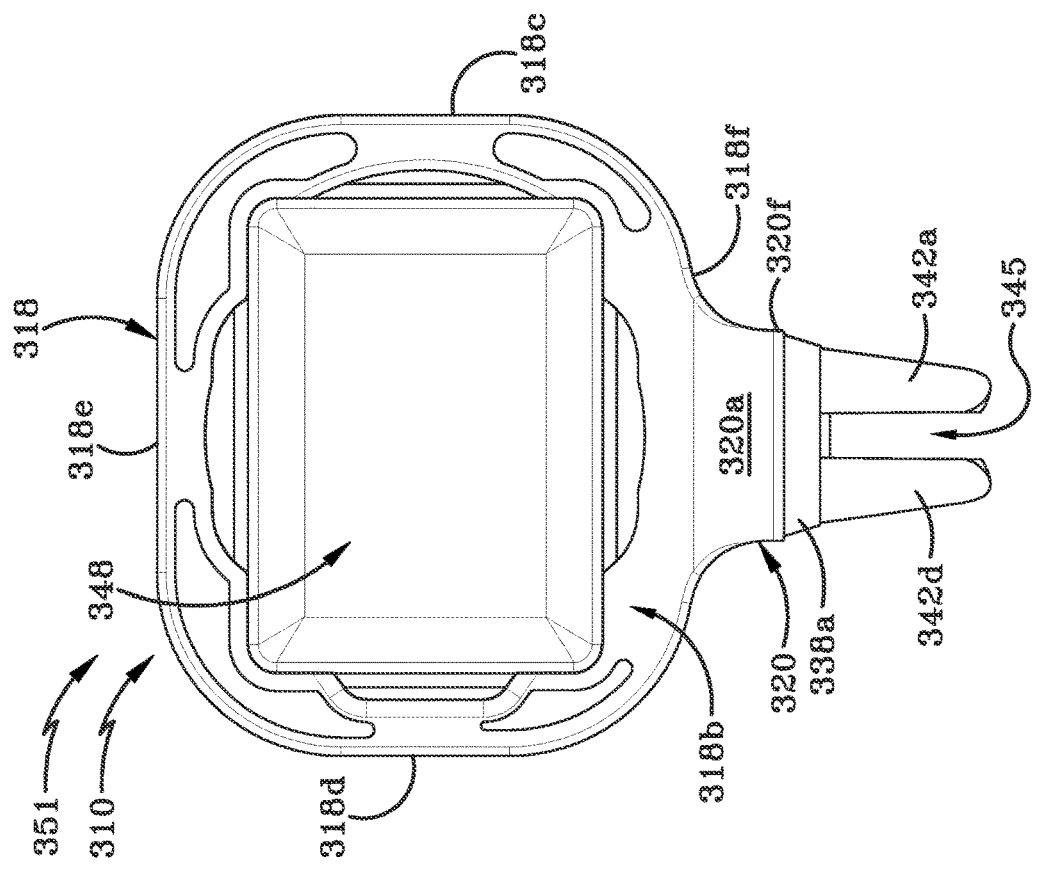
FIG. 51 is a bottom plan view of the kit of FIG. 50.
Figure 50:
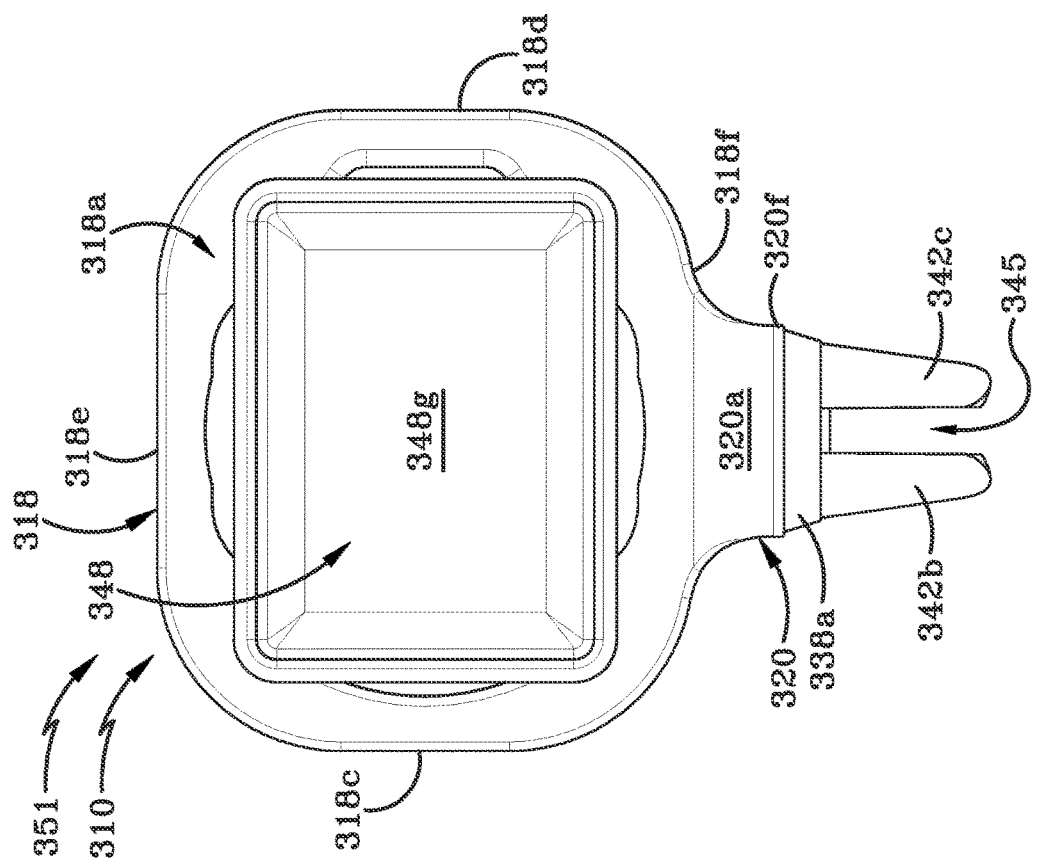
FIG. 50 is a top plan view of a condiment holder kit that comprises a condiment holder of FIG. 23 and a condiment receptacle that is sold to the consumer with the condiment holder; wherein the kit is shown with the receptacle engaged with the condiment holder.
Figure 55:
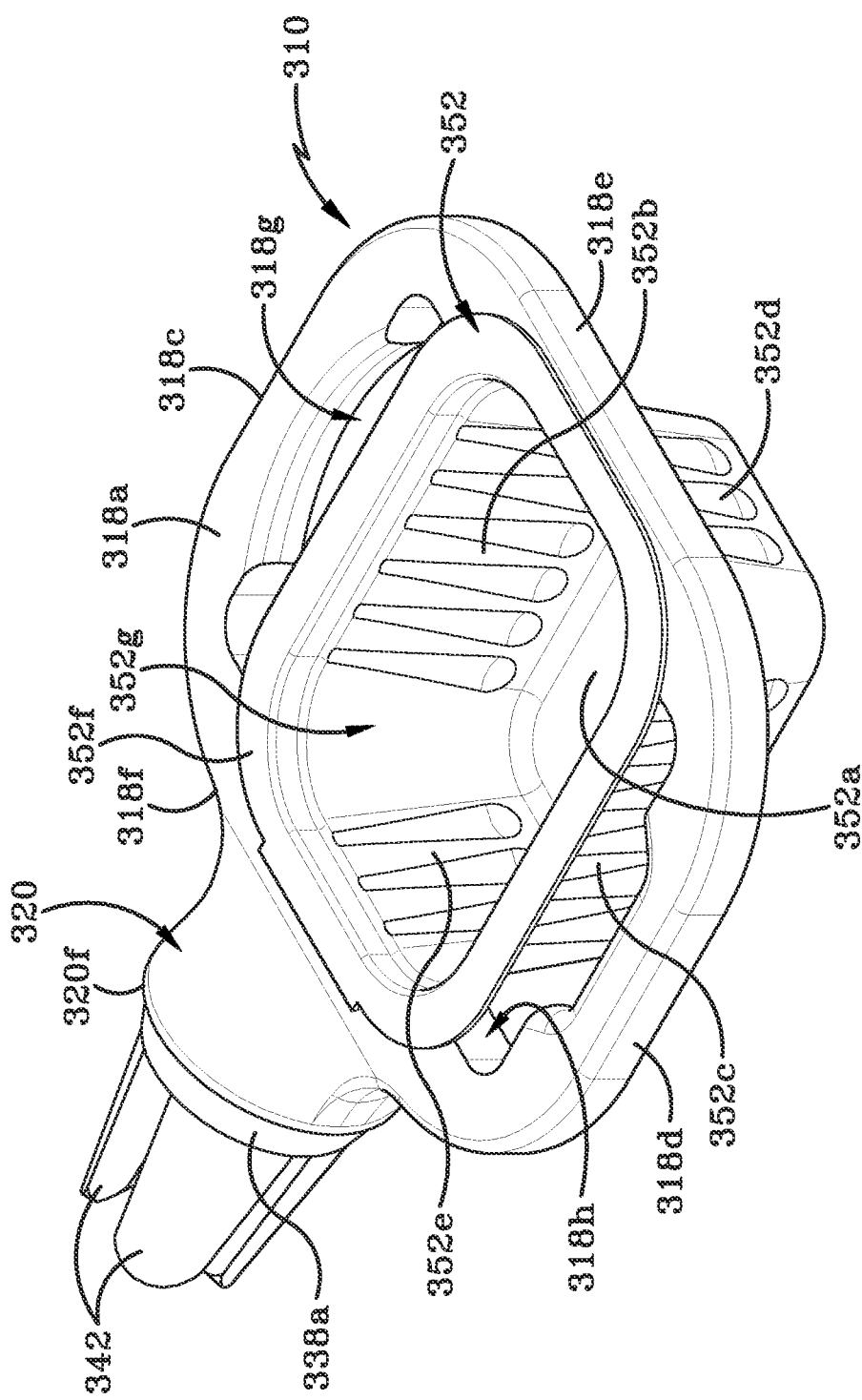
FIG. 55 is a front perspective view of the condiment holder in which an open and empty condiment holder is engaged.
Figure 60:
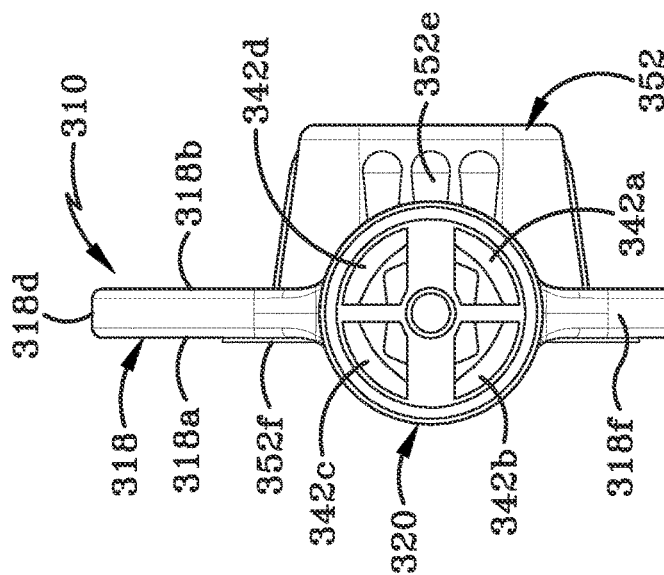
FIG. 60 is a rear elevation view thereof.
Figure 59:
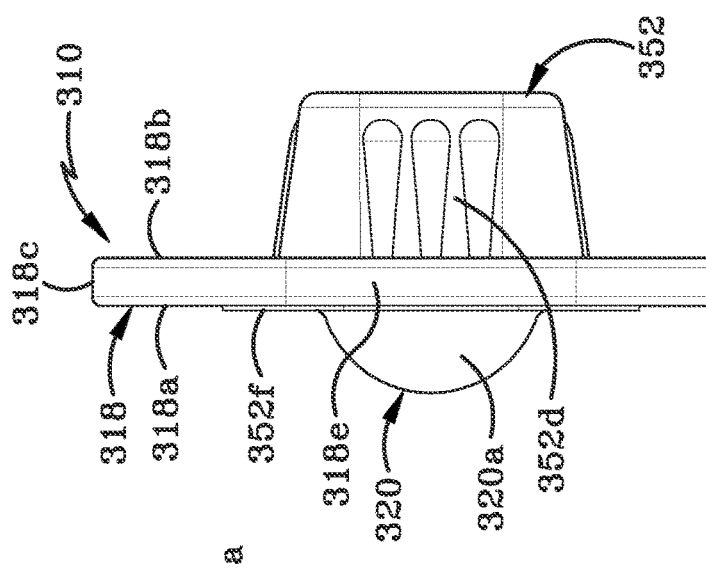
FIG. 59 is a front elevation view of the condiment holder and condiment container of FIG. 55.
Figure 58:
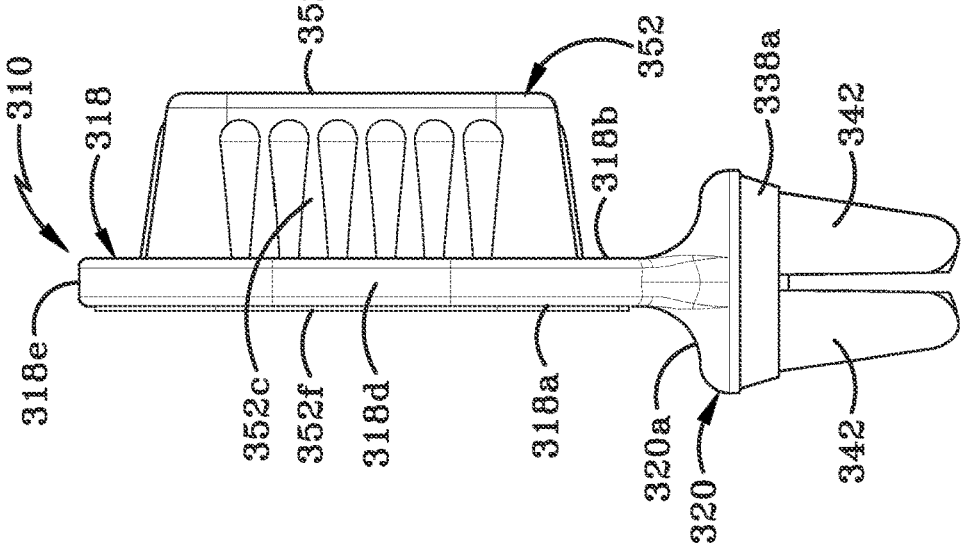
FIG. 58 is a right side elevation view thereof (the unshown left side elevation view being a mirror image thereof)

The various walls sections that comprise peripheral wall 318h make it possible for body member 314 to receive and engage any one of a plurality of differently configured condiment containers therein. FIG. 46 illustrates a first condiment container 344 (shown in dashed lines) received in aperture 318g of body member 314. First condiment container 344 is generally rectangular in exterior shape. It should be noted that the rectangular shape of first condiment container 344 as illustrated in FIG. 46 has been slightly reduced in dimensions in order to more clearly illustrate which of the wall sections of peripheral wall 318h are utilized to grip first condiment container 344 and retain the same in engagement with body member 314. As is evident from FIG. 46, first walls sections 324a, 324b, 324c and 324d are utilized to retain first condiment container 344 within aperture 318g of body member 314. The wall sections of peripheral wall 318h other than first walls sections 324a, 324b, 324c, 324d do not come into contact with the rectangularly shaped first condiment container 344 and do not aid in retaining first condiment container 344 within aperture 318g of body member 314.

Figure 47:
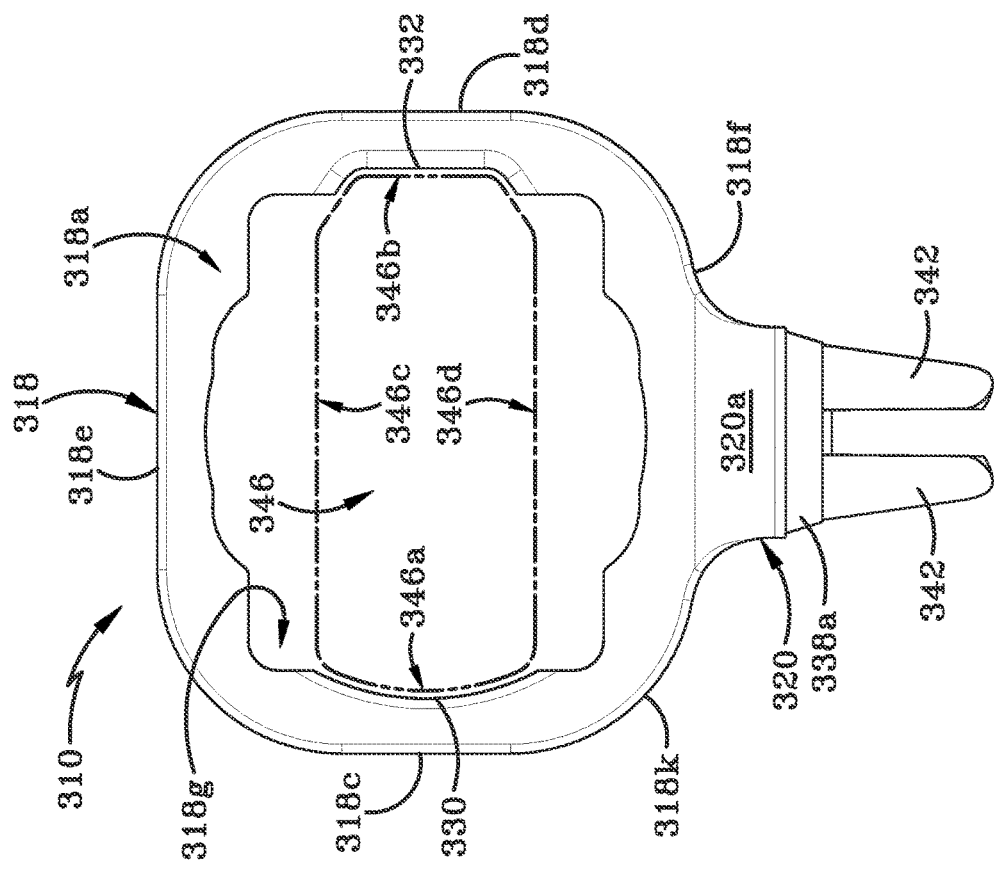
FIG. 47 is a top plan view of the condiment holder with a dashed outline of a portion of a second condiment container being engaged therewith.

FIG. 47 illustrates a second condiment container 346 (in dashed lines) retained by body member 314 and the exterior shape has been reduced in size in a similar way to first condiment container 344. In particular, second condiment container 346 is retained by fourth wall section 330 and fifth wall section 332. All wall sections of peripheral wall 318h other than fourth wall section 330 and fifth wall section 332 do not come into contact with second condiment container 346 and do not aid in retaining the same within condiment holder 310. Second condiment container 346 may be generally rectangular in configuration but is of a greater length from a first end 346a to a second end 346b thereof than the length of first condiment container 344 (where the length of first condiment container 344 is measured from first end 344a (FIG. 46) to second end 344b). Second condiment container 346 is of a narrower width as measured from first side 346c to second side 346d thereof than the width of first condiment container 344 (where the width of first condiment container 344 is measured between first side 344c and second side 344d thereof.) Second condiment container 346 is also configured so that one end thereof is complementary in shape to fifth wall section 332 of body member 314.

FIG. 48 illustrates a third condiment container 348 (in dashed lines and slightly reduced in exterior dimensions) retained in body member 314. In particular, third condiment container 348 is engaged by third wall sections 328a, 328b, 328c, and 328d of body member 314. No wall sections of peripheral wall 318h other than third wall sections 328a, 328b, 328c, and 328d contact and retain third condiment container 348 in condiment holder 310. Third condiment container 348 is rectangular in shape but the length (measured from first end 348a to second end 348b) and width (measured from first side 348c to second side 348d) are different to the length and width of first condiment container 344 or of second condiment container 346.

FIG. 49 illustrates a fourth condiment container 350 (in dashed lines and slightly reduced in exterior dimensions) retained in aperture 318g of body member 314. Fourth condiment container 350 is circular in cross-section and is retained in body by second wall sections 326a and 326b. The diameter of the fourth condiment container 350 is substantially equal to the diameter of a circular region within aperture 318g, where the second wall sections 326a, 326b form part of the circumference of that circular region. No wall sections of the peripheral wall 318h other than second wall sections 326a, 326b contact and retain fourth condiment container 350 within aperture 318g of body member 314.

FIGS. 50-54 show a kit 351 that a consumer may purchase. Kit 351 comprises the condiment holder 310 as described above along with a reusable or disposable condiment receptacle that may be selectively engaged with condiment holder 310. The receptacle sold with kit 351 may be of any shape that will be able to be retained in condiment holder 310 by appropriate wall sections of the peripheral wall 318h. The receptacle illustrated as being sold as part of kit 351 is one shaped like third condiment container 348. As is evident, particularly from FIGS. 50 and 52, a flange 348a of receptacle 348 overlaps at least a portion of top surface 318a of body member 314. This overlapping section of flange 348a helps to ensure that receptacle 348 will not drop through aperture 318g. Similarly, each of the first condiment container 344, second condiment container 346 and fourth condiment container 350 have flange portions that will overlap a portion of the top surface 318a of body member 314 to ensure that they do not drop through aperture 318g if these condiment containers are provided as a receptacle and sold as part of kit 351.

The consumer may utilize the kit 351 as follows. Condiment holder 310 is engaged with a vehicle air vent 312 as previously described. Receptacle 348 is engaged in aperture 318g of condiment holder 310 and may be utilized to hold a quantity of condiment, such as ketchup, therein. The condiment may be squeezed out of a flexible plastic pouch and into the chamber 348g before or after receptacle 348 is engaged in condiment holder 310. (Condiment may also be placed in receptacle from a larger dispenser of the condiment provided at a fast-food restaurant or provided by the consumer.) The consumer may then dip their fries or chicken nuggets into the quantity of condiment held within chamber 348g in a similar manner to how the consumer uses one of the condiment containers 344, 346, 348, or 350 provided by a fast-food restaurant.

The consumer may utilize condiment holder 310 as follows. Condiment holder 310 is engaged with a vehicle air vent fin 312b using clip 316 as previously described herein. The consumer will have been provided with one of the condiment containers from a fast-food restaurant or will have purchased a kit 351 that includes receptacle 348. In the instance of condiment containers provided by a restaurant, these containers typically include a quantity of condiment that is enclosed in the container by a peelable cover. In the case of the receptacle provided as part of kit 351, a quantity of condiment is placed therein by the consumer. The selected condiment container or receptacle 344, 346, 348 or 350 is engaged in aperture 318g of condiment holder 310 and is secured therein by the appropriate wall sections of peripheral wall 318h as previously described. The angle of the peripheral wall 318h itself will also grip the engaged condiment container 344, 346, 348, 350. When the consumer pushes the selected condiment container into aperture 318g that will typically hear a "click" that confirms the condiment container or receptacle is securely retained by condiment holder 310. In other words each selected condiment container or receptacle is retained within holder 310 by a snap-fitting engagement therewith. The configuration of the holder 310 and of the selected condiment container enables this snap-fitting engagement. The peelable cover, if provided, may then be removed to provide access to the condiment. The consumer may then dip their fries or chicken nuggets into the quantity of condiment held within the condiment container or receptacle 344, 346, 348 or 350 provided by a fast-food restaurant or by the consumer himself or herself.

FIGS. 55-60 show an empty condiment container 352 that is engaged with condiment holder 310. Container 352 includes a bottom wall 352a, and a side wall that extends upwardly from bottom wall 352a. The side wall may be comprised of first wall 352b, second wall 352c, first end 352d, and second end 352e. A flange 352f extends laterally outwardly from upper ends of the first wall 352b, second wall 352c, first end 352d, and second end 352e. Flange 352f may be oriented substantially parallel to bottom wall 352a. Bottom wall 352a, first and second walls 352b, 352c and first and second ends 352d, 352e bound and define a chamber 352g. Container 352 is engaged in aperture 318g of condiment holder 310 as illustrated, i.e., where flange 352f rests on a portion of top surface 318a of body member 314. Additionally, the second wall sections 326a, 326b (not shown) contact the exterior surfaces of first end 352d and second end 352e of container 352 and thereby grippingly retain container 352 in aperture 318g.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A condiment holder for selectively supporting any of three or more differently configured condiment containers therein, said condiment holder comprising:
   a body having a top surface and a bottom surface;
   a member extending outwardly from the body and arranged to orient the body such that the top surface thereof is generally horizontal;
   an interior peripheral wall provided on the body, said interior peripheral wall including:
     a first side and an opposed second side that are substantially identical to one another and arranged as mirror images of one another;
     a third side and an opposed fourth side extending between the first side and the second side, wherein the third side is dissimilar to the fourth side; and
   a common aperture bounded and defined by the first side, the second side, the third side and the fourth side of the interior peripheral wall, said common aperture adapted to individually receive any of the three or more differently configured condiment containers therein;
   wherein each of the first side and the second side of the interior peripheral wall comprises:
     a first wall section, a second wall section, and another first wall section; wherein the first wall section and the another first wall section are identical to one another and are arranged as mirror images of one another, and the second wall section is interposed between the first wall section and the another first wall section;
   wherein a third wall section extends between each first wall section and a respective one of the third side and the fourth side; and
   wherein a further third wall section extends between each of the another first wall section and the other respective one of the third side and the fourth side.

2. The condiment holder as defined in claim 1, wherein the body is one of substantially square and substantially rectangular in shape when viewed from above and the top surface of the body circumscribes the aperture.

3. The condiment holder as defined in claim 1, wherein the body has a length measured between a front end and a rear end of around 2⅝ inches and a width measured between a left side and a right side of around 2⅝ inches.

4. The condiment holder as defined in claim 1, further comprising:
   a clip extending outwardly from the body; said clip being adapted to engage at least one fin of a vehicle air vent.

5. The condiment holder as defined in claim 4, wherein the clip is selectively rotatable about an axis oriented at right angles to a rear end of the body.

6. The condiment holder as defined in claim 4, further comprising a ball-and-socket joint that operatively engages the clip to the body.

7. The condiment holder as defined in claim 6, wherein one of a portion of the body and a portion of the clip defines a socket of the ball-and-socket joint and the other of the portion of the body and the portion of the clip includes a ball of the ball-and-socket joint and the ball and is received in the socket.

8. The condiment holder as defined in claim 6, wherein the ball-and-socket joint allows the body to selectively pivot in a first direction or in a second direction relative to a horizontally-oriented plane.

9. The condiment holder as defined in claim 4, wherein the clip comprises at least two tines separated by a space; wherein the tines are adapted to be received in gaps defined between adjacent air vent fins; and the space is adapted to receive at least one air vent fin therein.

10. The condiment holder as defined in claim 1, wherein the interior peripheral wall is oriented at an angle other than 90 degrees relative to the top surface of the body.

11. The condiment holder as defined in claim 1, further comprising a flange region extending downwardly from a front end of the body.

12. The condiment container as defined in claim 1, wherein the body is substantially planar.

13. The condiment holder according to claim 1, wherein said second wall section is differently configured from the first wall section and the another first wall section.

14. The condiment holder according to claim 1, wherein the third wall section and the further third wall section are substantially identical and arranged as a mirror each of one another.

15. The condiment holder according to claim 1, wherein the first wall section and the another first wall section of the opposed first and second sides are adapted to retain a first condiment container of a first configuration therebetween.

16. The condiment holder according to claim 1, wherein the second wall sections are configured to retain a second condiment container therebetween, where the second condiment container differs in configuration from the first condiment container.

17. The condiment holder according to claim 1, wherein the third wall sections are configured to retain a third condiment container therebetween, and the third condiment container differs in configuration from both of the first condiment container and the second condiment container.

18. The condiment holder according to claim 1, wherein the third side and fourth side are dissimilar from the first and second sides and are configured to retain a fourth condiment container therebetween, wherein the fourth condiment container differs in configuration from all of the first condiment container, the second condiment container, and the third condiment container.

19. The condiment holder according to claim 1, wherein the third side comprises an arcuate fourth wall section that extends between two opposed third wall sections.

20. The condiment holder according to claim 1, wherein the fourth side comprises a generally U-shaped fifth wall section that extends between two opposed further third wall sections.

21. The condiment holder according to claim 1, wherein the second wall section is recessed relative to the first wall section and the another first wall section.

22. The condiment holder according to claim 1, wherein the first wall section and the another first wall section are recessed relative to the third wall section and the further third wall section.

23. The condiment holder according to claim 1, further comprising a second aperture defined in the body, said second aperture extending between the top surface and the bottom surface and being adapted to retain a further condiment container therein.

24. The condiment holder as defined in claim 1, further comprising a fastener mechanism provided on the body, said fastener mechanism being adapted to secure the body to part of a vehicle.

25. A condiment holder for supporting a condiment container, said condiment holder comprising:
   a body having a top surface and a bottom surface; and
   an aperture defined by an interior peripheral wall of the body, said aperture extending between the top and bottom surfaces; wherein the peripheral wall includes a plurality of sets of opposed wall sections and each set of opposed wall sections is adapted to engage one of a plurality of differently-configured condiment containers; and wherein the peripheral wall includes at least:
      a first set of opposed first wall sections configured to be complementary to at least part of a first exterior shape of a first condiment container, wherein each of the first wall sections includes a generally U-shaped depression, and the generally U-shaped depressions of the opposed first wall sections are arranged as mirror images of one another;
      a second set of opposed second wall sections configured to be complementary to at least part of a second exterior shape of a second condiment container, wherein the second exterior shape is different from the first exterior shape; wherein the second wall sections are arranged as mirror images of one another; and
      a third set of opposed third wall sections configured to be complementary to at least a part of a third exterior shape of a third condiment container, wherein the third exterior shape is different from the first exterior shape and from the second exterior shape; and wherein the third opposed wall sections differ in configuration from one another;
   a second aperture defined by a portion of the interior peripheral wall of the body, said second aperture extending between the top and bottom surfaces; wherein the second aperture is adapted to receive at least one condiment container therein; and
   a clip extending outwardly from the body; said clip being adapted to engage at least one fin of a vehicle air vent.

26. The condiment holder as defined in claim 25, wherein the portion of the interior peripheral wall that defines the second aperture includes a plurality of sets of opposed wall sections and each set of opposed wall sections is adapted to engage one of a plurality of differently-configured condiment containers therein.

27. A kit for holding condiments; said kit comprising:
   a condiment holder comprising:
      a body having a top surface and a bottom surface;
      an aperture defined by an interior peripheral wall of the body and extending between the top and bottom surfaces; wherein the peripheral wall includes at least three sets of opposed wall sections and the body is thereby adapted to selectively engage at least three differently-configured condiment containers;
      and wherein the at least three sets of opposed wall sections includes:
         a first set of opposed first wall sections configured to be complementary to at least part of a first exterior shape of a first condiment container, wherein each of the first wall sections includes a generally U-shaped indentation, and the generally U-shaped indentations of the opposed first wall sections are arranged as mirror images of one another;
         a second set of opposed second wall sections configured to be complementary to at least part of a second exterior shape of a second condiment container, wherein the second exterior shape is different from the first exterior shape; wherein the second wall sections are arranged as mirror images of one another; and
         a third set of opposed third wall sections configured to be complementary to at least a part of a third exterior shape of a third condiment container, wherein the third exterior shape is different from the first exterior shape and from the second exterior shape; and wherein the third opposed wall sections differ in configuration from one another;
      a fastener mechanism provided on the body and being adapted to secure the body to a part of a vehicle; and
   at least one condiment container sized to be received in the aperture defined by the body of the condiment holder.

28. The kit as defined in claim 27, wherein the fastener mechanism includes clip having a first pair of tines spaced a first distance apart and a second pair of tines spaced a second distance apart; wherein the first pair of tines is adapted to selectively receive a first fin of the vehicle air vent therein and the first fin is of a first thickness; and the second pair of tines is adapted to selectively receive a second fin of the vehicle air vent therein, wherein the second fin is of a second thickness, and wherein the first pair of tines and the second pair of tines are oriented at right angles to each other.

29. The kit as defined in claim 27, wherein the fastener mechanism includes a ball-and-socket joint interposed between a clip and the body.

30. The kit as defined in claim 27, wherein the body is rotatable relative to the fastener mechanism.

31. A condiment holder for supporting a condiment container, said condiment holder comprising:
  a body having a front, a back, a left side, a right side, a top surface, and a bottom surface; wherein the front and back are opposed to one another and the left side and right side extend between the front and the back; wherein the top surface of the body comprises an upper surface of each of the front, the back, the left side and the right side; and the bottom surface of the body comprises a lower surface of each of the front, the back, the left side and the right side; wherein a region of the front extends downwardly for a distance beyond the lower surfaces of each of the back, the left side, and the right side; and a generally cylindrical neck extends rearwardly from the back of the body; and
  an aperture bounded and defined by an interior peripheral wall of the front, back, left side and right side of the body and extending between the top and bottom surfaces thereof; wherein the peripheral wall includes a plurality of sets of opposed wall sections that comprise at least:
    a first set of opposed wall sections configured to be complementary to a first exterior shape of a first condiment container;
    a second set of opposed wall sections configured to be complementary to a second exterior shape of a second condiment container, wherein the second exterior shape is different from the first exterior shape; and
    a third set of opposed wall sections configured to be complementary to a third exterior shape of a third condiment container, wherein the third exterior shape is different from the first exterior shape and from the second exterior shape.

32. A method of presenting condiments for use while seated in a vehicle; said method comprising:
  providing a condiment holder according to claim 1;
  engaging a fastener mechanism on the condiment holder with a part of the vehicle;
  orienting the body of the condiment holder such that the top surface thereof is generally horizontal;
  selecting one of the three or more differently configured condiment containers for engagement in the common aperture of the condiment holder;
  orienting the selected condiment container to align with an appropriate set of one of the first wall sections, the second wall sections, and the third walls sections that is configured to secure the selected container in the common aperture;
  placing a flange of the selected condiment container on the top surface of the body; and
  retaining the selected condiment container in the common aperture with the appropriate set of the one of the first wall sections, the second wall sections, and the third wall sections.

\* \* \* \* \*